United States Patent [19]

Morley et al.

[11] 3,930,233

[45] Dec. 30, 1975

[54] DATA TRANSFER AND MANIPULATION APPARATUS FOR INDUSTRIAL COMPUTER CONTROLLERS

[75] Inventors: Richard E. Morley, Mason; Charles C. Schelberg, Jr., Milford, both of N.H.

[73] Assignee: Modicon Corporation, Andover, Mass.

[22] Filed: Apr. 11, 1974

[21] Appl. No.: 460,081

[52] U.S. Cl. .............................................. 340/172.5
[51] Int. Cl.² ........................ G06F 3/02; G06F 15/46
[58] Field of Search .................................. 340/172.5

[56] References Cited

UNITED STATES PATENTS

| | | | |
|---|---|---|---|
| 3,686,639 | 8/1972 | Fletcher | 340/172.5 |
| 3,829,842 | 8/1974 | Langdon et al. | 340/172.5 |

*Primary Examiner*—Eugene G. Botz
*Attorney, Agent, or Firm*—Mattern, Ware and Davis

[57] ABSTRACT

A programming panel incorporates means to manually command an industrial computer controller to perform non-relay logic data manipulation operations on selected circuit lines. The industrial computer controller is provided with a plurality of registers capable of storing data and with an executive program that incorporates various data manipulation function modules. Modules are disclosed that move data from a table of registers to another register, that move data from one register to a table of other registers, that move data from one table of registers to another table of registers, that stack data into a table of registers from another register on a first-in/first-out basis, and that remove data stacked in a table of registers to another register on a first-in/first-out basis. Another module is disclosed that drives a programmable printer as disclosed in U.S. patent application Ser. No. 443,329, without appreciably affecting the overall sweep time of the industrial computer controller.

40 Claims, 32 Drawing Figures

DATA TRANSFER AND MANIPULATION APPARATUS FOR INDUSTRIAL COMPUTER CONTROLLERS

BACKGROUND OF THE INVENTION

The use of industrial computer controllers to control industrial processes such as machine tools, textile machinery, packaging machines, and product testing, has undergone rapid development within the last several years. Industrial computer controllers, such as Modicon Model 084, manufactured by Modicon Corporation, Andover, Massachusetts, have been very successful in simulating relay type logic commonly encountered in the control of industrial equipment. Such controllers simulate electric circuit lines comprising conventional electrical circuit elements preceding a relay coil which is energized when the elements are conditioned so that the circuit line conducts. These elements have commonly been a normally open switch, a normally closed switch, a normally open parallel switch, and a normally closed parallel switch. In addition, such industrial computer controllers, commonly referred to as "programmable controllers," include timing and counting simulating modules which may be placed in an electrical circuit line. When in such a line, a timing or counting module causes the coil within the electrical circuit line to conduct when a time or count has been obtained equal to a preselectable time or count.

It is therefore apparent that such programmable controllers do not provide readily accessible means to obtain data within the controller, nor do they provide a readily accessible means for manipulating data within the controller.

The present invention adds a new dimension to present-day programmable controllers by allowing such controllers to manipulate and transfer data within the controller to other regions of the controller for retrieval by an external device or for further manipulation and transfer by the controller. This data manipulation and transfer is performed by the computer controller during its updating of the electrical circuit lines and thus does not appreciably alter the response time of the controller.

The present invention allows the programmable controllers to perform various control functions previously unobtainable with such controllers, as well as allowing such controllers to generate information useful in various applications, such as machine monitoring, inventory control and malfunction signaling and alarming.

In addition, the present invention discloses a printer data transfer module which is compatible with programmable printers, such Modicon's programmable printer, manufactured by Modicon Corporation, Andover, Massachusetts. When used in conjunction with such printers, this module allows a computer controller to initiate the printing of pre-stored messages within the printer, which in turn are able to obtain variable data from the computer controller via the same module. This printer module also allows the computer controller to retrieve and transfer pre-formated variable data from within the controller to the programmable printer wherein the variable data is printed in accordance with the selected format.

It is therefore apparent that a printer module, in conjunction with a programmable printer, not only allows a programmable controller to visually display various production monitoring information, including part counts, running time, and machine malfunctions, but also allows a controller to generate self-diagnostic messages within the programmable printer when various conditions occur within the controlled industrial equipment or process.

SUMMARY OF THE INVENTION

The present invention allows an industrial computer controller similar in theory to U.S. Pat. No. 3,686,639, entitled "Digital Computer-Industrial Controller System and Apparatus," to perform data manipulation and transfer functions. A general purpose digital computer or a digital computer as disclosed in U.S. Pat. Nos. 3,740,722 and 3,761,893 is utilized to perform the functions of data manipulation and transfer in addition to the functions of an industrial controller previously performed by logic timers and counters connected in a ladder-type electrical control circuit. The digital computer incorporates an executive program having modular portions for simulating the relay logic timers and counters, and additional modular portions for transferring and manipulating data within the digital computer. A special purpose control program as disclosed in U.S. Pat. No. 3,686,639, includes means for generating electrical circuit lines. These electrical circuit lines, by use of the data manipulation transfer portions of the executive program as well as a background program, may represent various data manipulation and data functions instead of relay-logic functions. A programming panel is utilized to enter the desired data transfer function within the digital computer for any of a number of electrical circuit lines. In addition to the programmable controller's connections to apparatus to be controlled, the controller is also connected to any peripheral device, such as a programmable printer, that is used to accept transferred data from within the digital computer. Such a device may also be controlled by the computer controller.

The present invention utilizes the schematic electrical circuit ladder diagram disclosed in U.S. Pat. No. 3,686,639 to generate data manipulation and data transfer lines. In the preferred embodiment of the present invention, four nodes are utilized per electrical circuit line to generate one data transfer or data manipulation line. The first node of the circuit line comprises a normally opened or a normally closed electrically simulated switch. This switch, as disclosed in U.S. Pat. No. 3,686,639, is referenced to a coil of some other electrical circuit line in order to determine the state of that particular electrical element.

When the particular node is found by the digital computer to have a particular history, the remainder of that particular electrical circuit line is activated. In the preferred embodiment of the present invention, the third or C node contains the particular type of data manipulation or transfer function desired. The executive program performs the desired data transfer whereby the data is retrieved from one or more computer registers related to a number in the second or B node and deposits this data in one or more computer registers related to a number in the fourth of D node.

Some data transfer operations, due to the length of time involved in performing the operation, may not be completed by the digital computer the first time it ascertains that the A node of the particular electrical circuit line of the electrical ladder network has a proper history. However, since the executive program repeatedly runs through this network, the desired data transfer function is repeatedly acted upon until the entire set of data has been properly transferred to the desired destination register. Thus, if the printer data transfer function is desired, the executive program or foreground program of the digital computer repeatedly switches to a background computer program; i.e., the printer driver program, for a short period of time. This background program performs the desired data transfer with the computer controller. Using this foreground-background programming technique, the computer controller maintains continuous control of the apparatus to be controlled while also performing the desired data transfer to the programmable printer.

The output coil of the printer data transfer electrical circuit line is activated when the particular data transfer line has made a request for printing. This output coil remains on until the desired data has been printed by the programmable printer. Other data transfer functions, such as a data transfer from a table of registers to a single register, activates the output coil when the desired data has been completely transferred to the desired register.

OBJECTS OF THE INVENTION

It is therefore an object of the present invention to provide a data manipulation and transfer apparatus for industrial computer controllers that is capable of retrieving data, manipulating the retrieved data, and transferring the manipulated data to a deposit area.

It is another object of the present invention to provide a data manipulation and transfer apparatus for industrial computer controllers that is capable of being programmed by the controller's programmable panel by non-technical operators.

A further object of the present invention is to provide a data manipulation and transfer apparatus that will not appreciably affect the controlling operation of the industrial computer controller.

It is another object of the present invention to provide a data manipulation and transfer apparatus that is capable of transferring data in sequential fashion from a table of registers within the controller to a single register within the controller.

Another object of the present invention is to provide a data manipulation and transfer apparatus that is capable of transferring data in sequential fashion from one register within an industrial computer controller to a table of registers in the controller.

It is a further object of the present invention to provide a data manipulation and transfer apparatus that is able to store and retrieve data from a set of registers within the industrial computer controller in a first-in/first-out basis.

It is another object of the present invention to provide a data manipulation and transfer apparatus for industrial computer controllers that is capable of driving programmable printers in order to provide such printers with desired data generated by the computer controller, as well as initiating pre-stored message print-out within the programmable printer.

A further object of the present invention is to provide a data manipulation and transfer apparatus for industrial computer controllers that is easy to operate and troubleshoot.

Other objects will in part be obvious and will in part appear hereinafter.

THE DRAWINGS

Figures 1, 2:
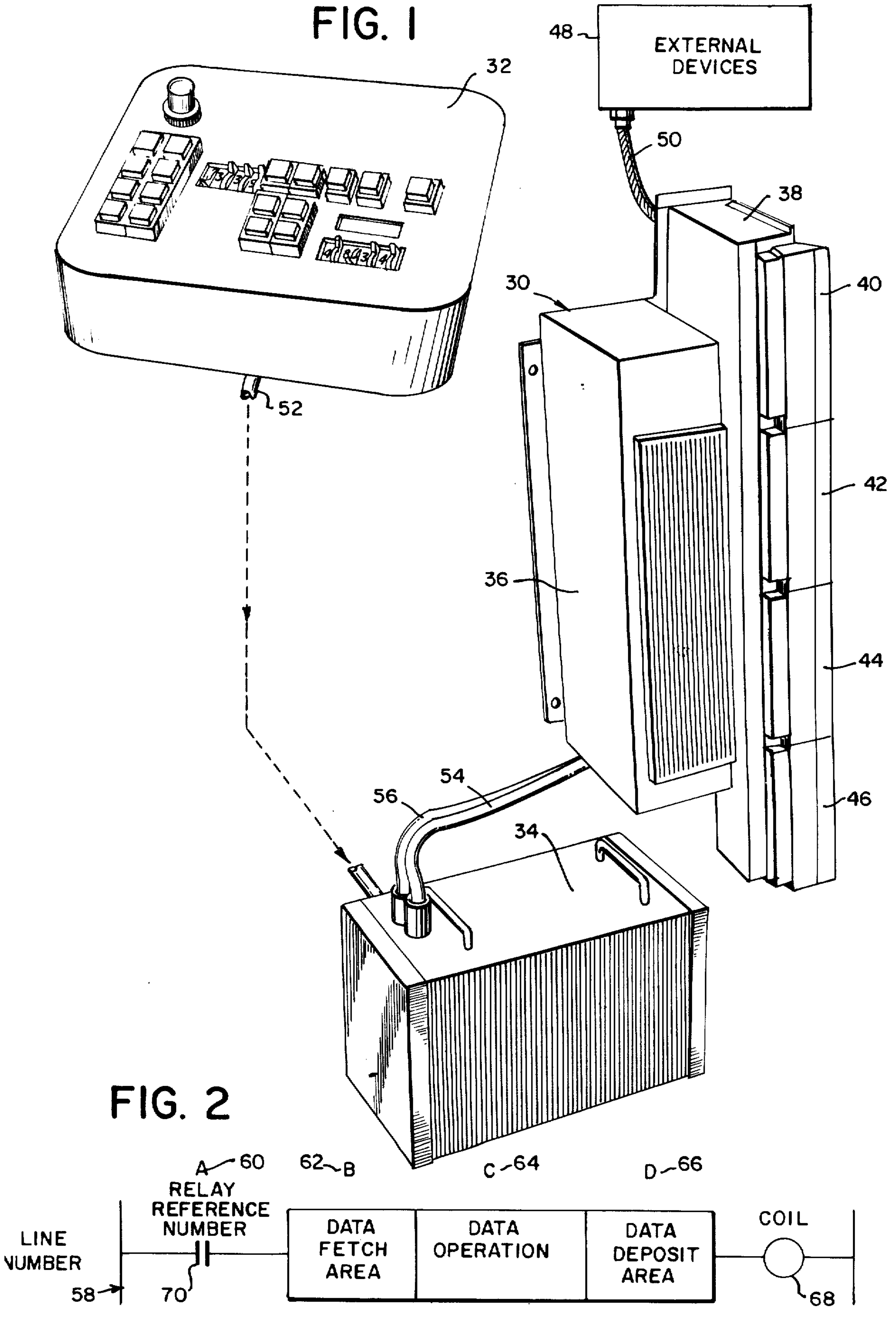
FIG. 1 is a perspective diagrammatic view of a computer controller system according to the present invention.
FIG. 2 is a diagrammatic representation of a typical data transfer electrical circuit line generated by the computer controller system of FIG. 1.
Figure 9:
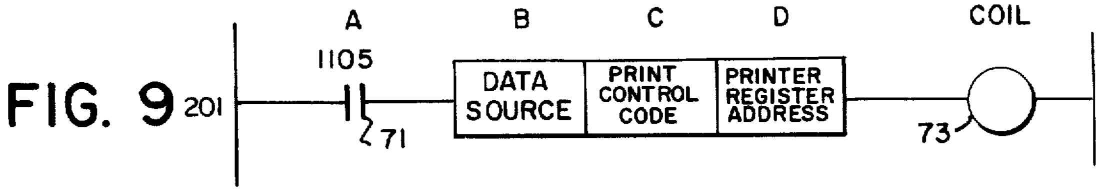
Figure 10:
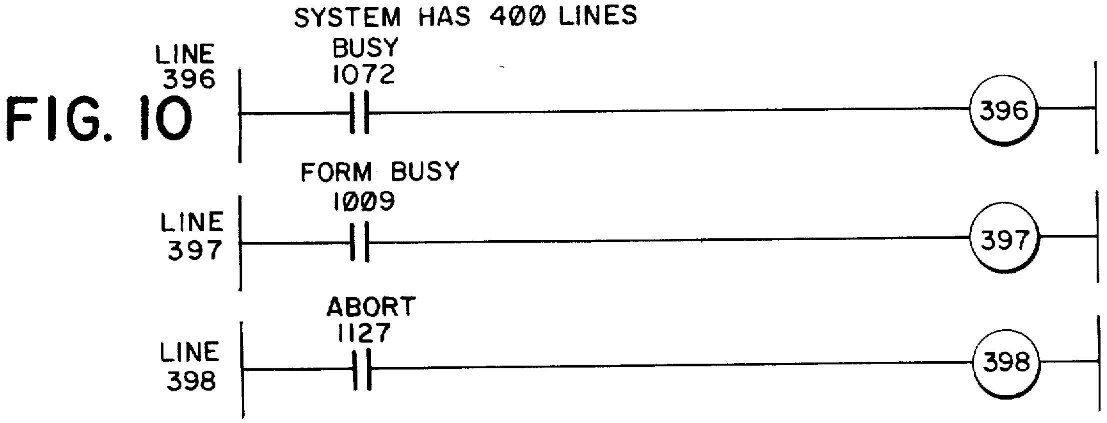
Figure 11:
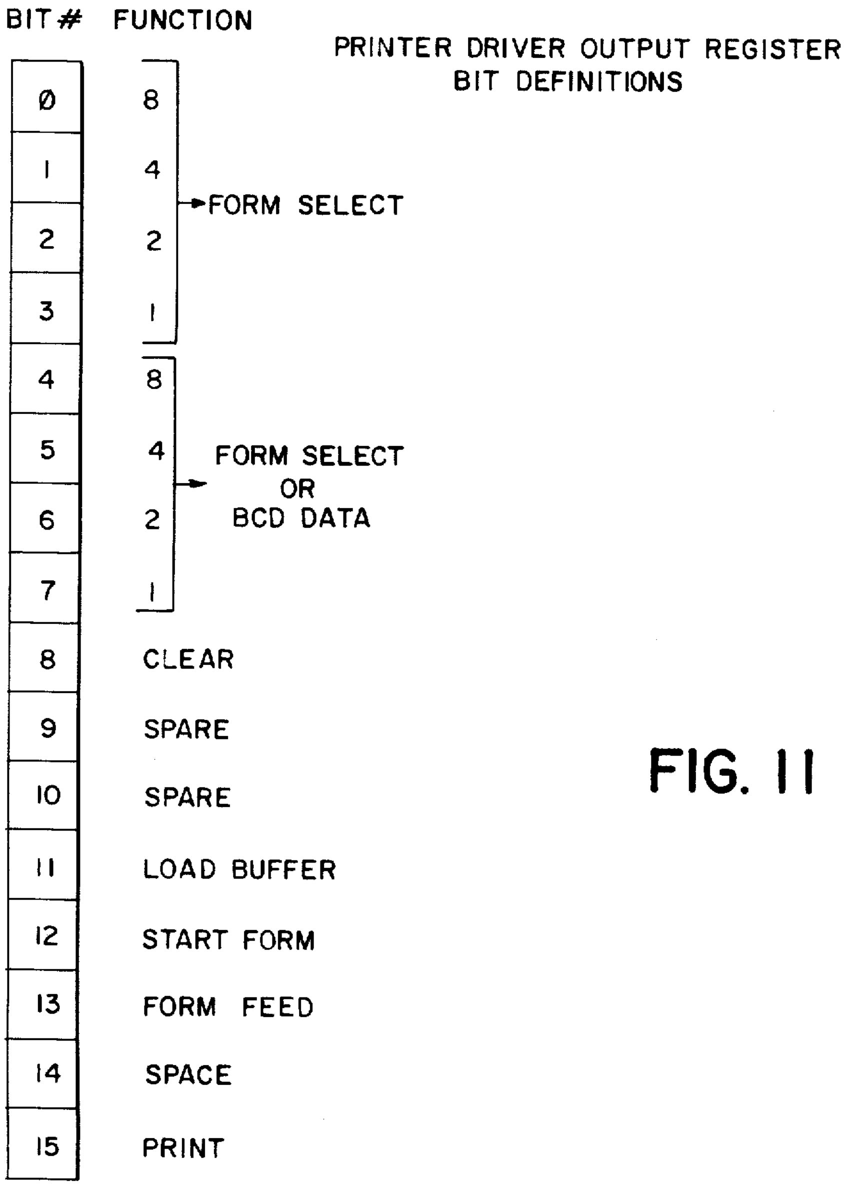
Figures 12A, 12C:
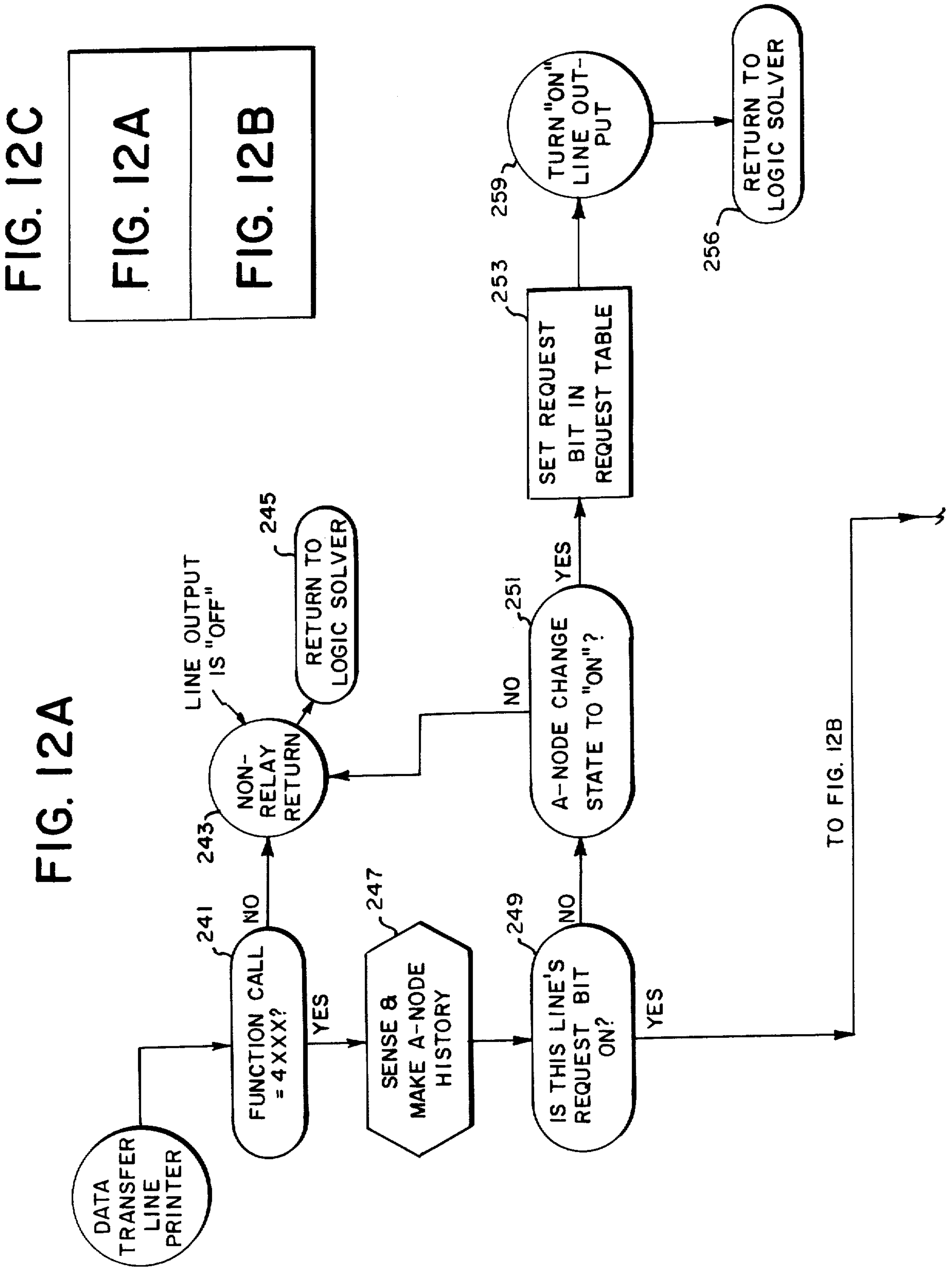
Figure 12B:
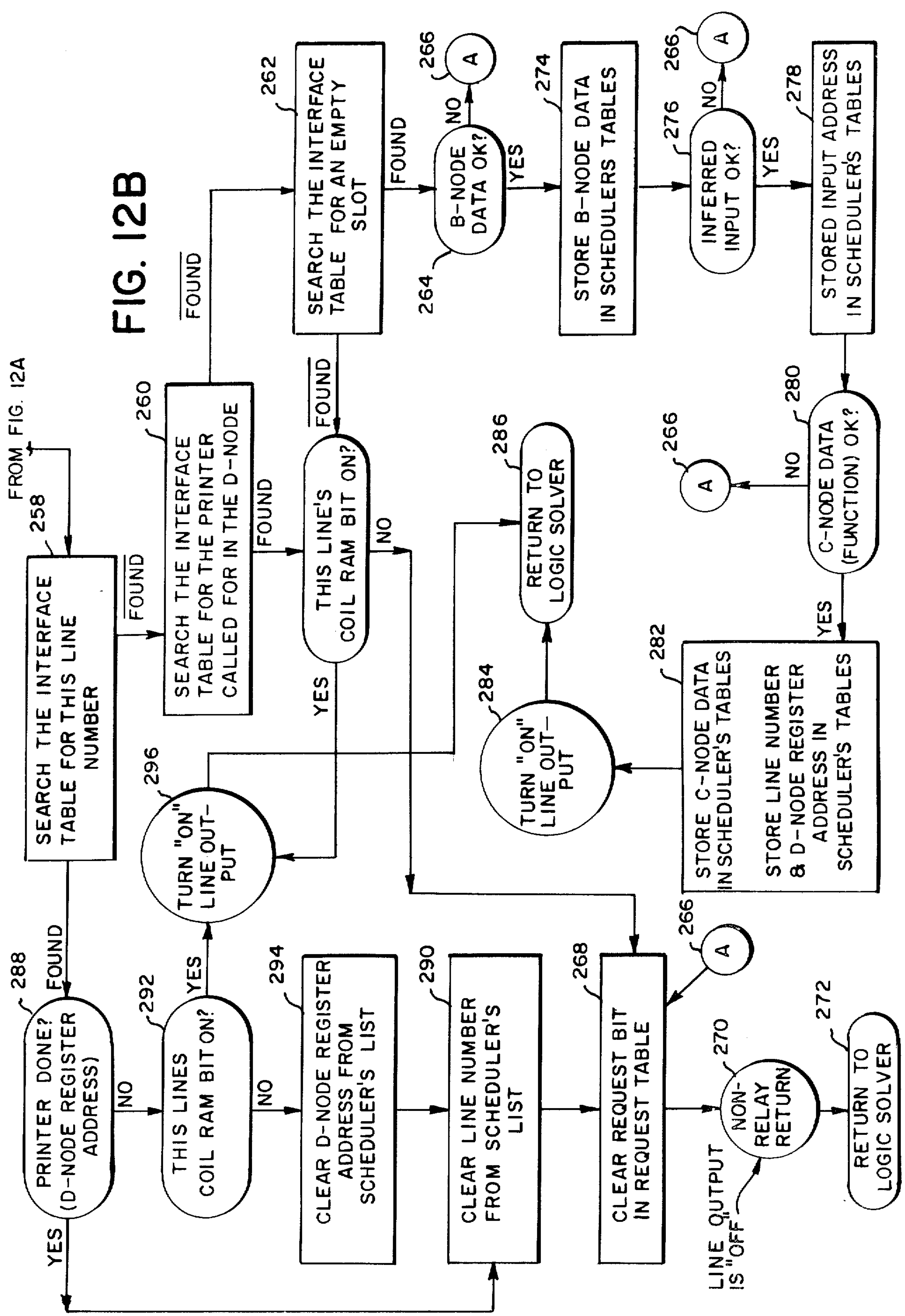
Figure 13:
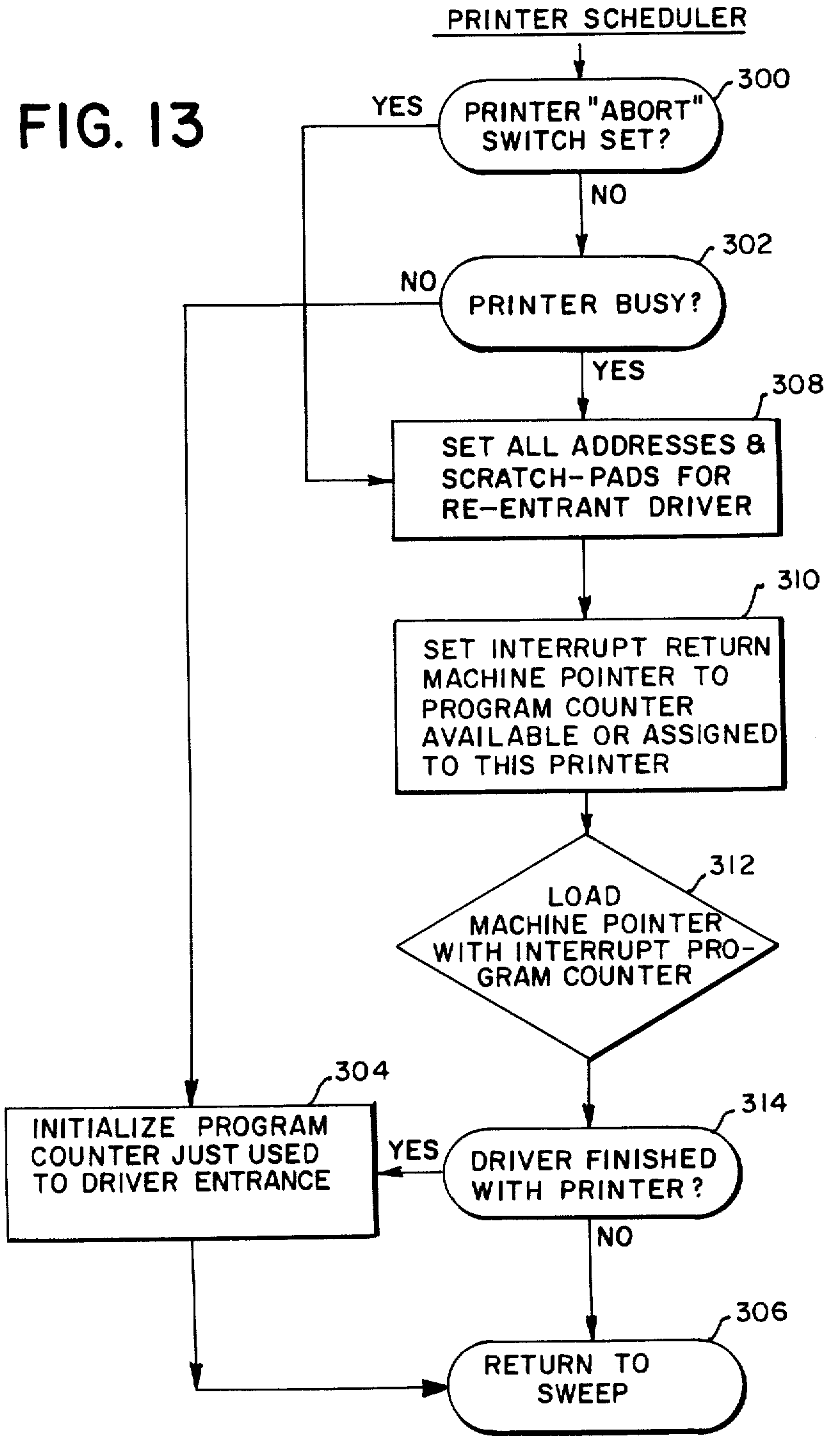
Figure 14:
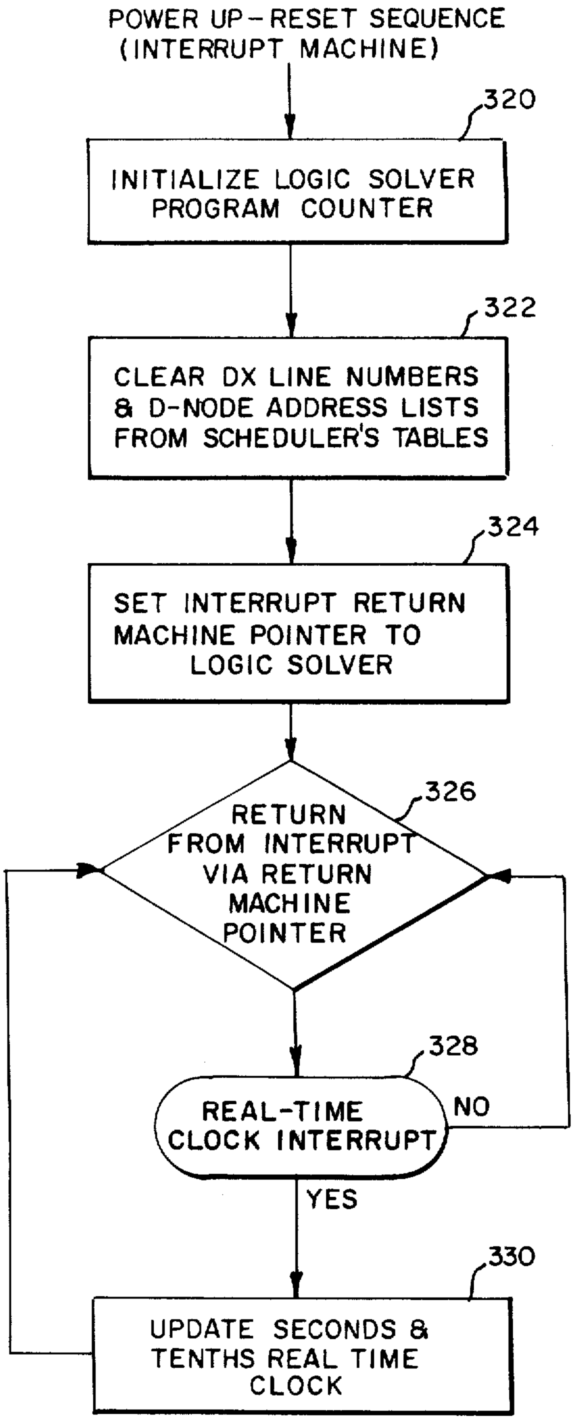
Figure 15A:
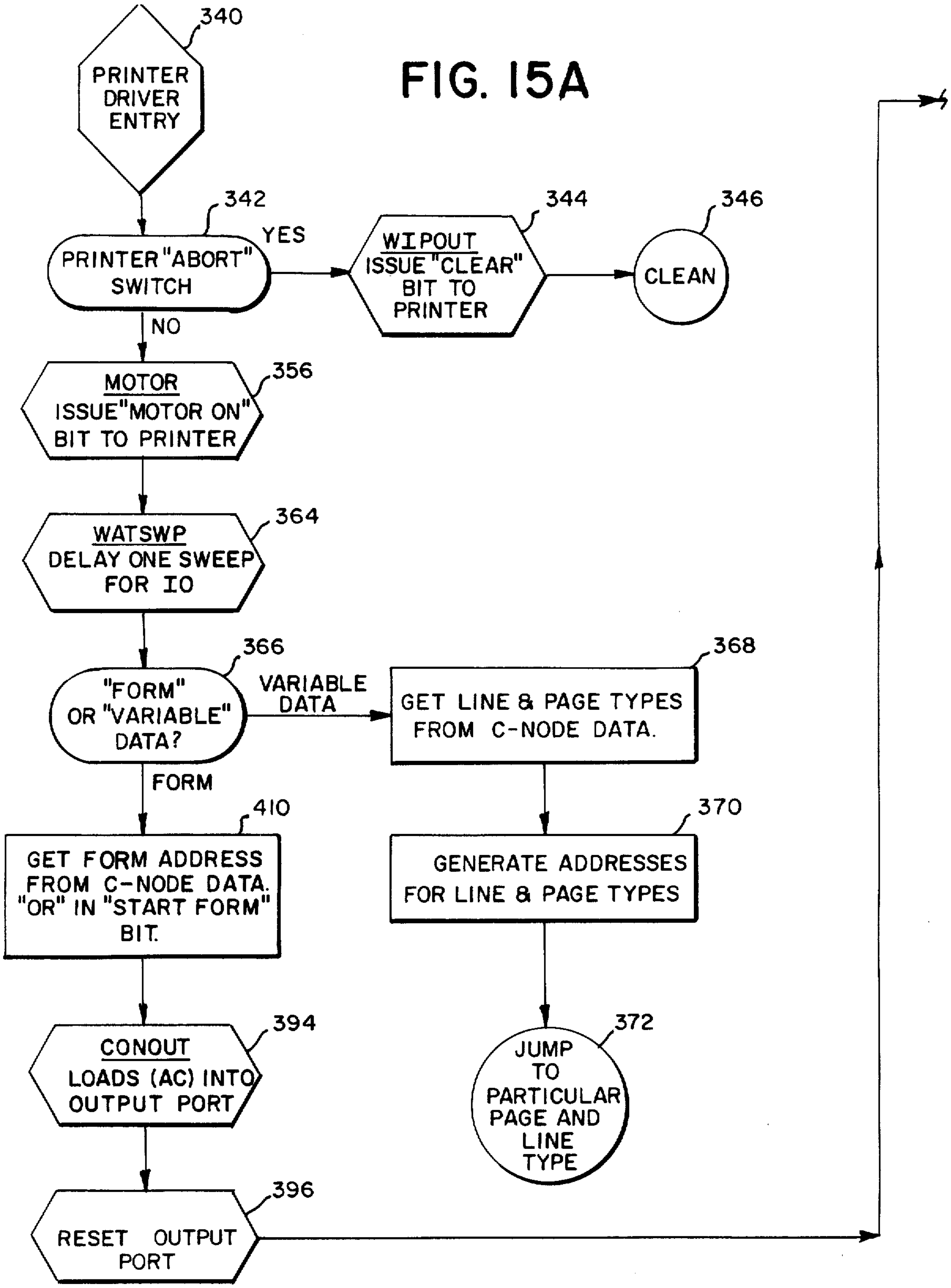
Figures 15B, 15C:
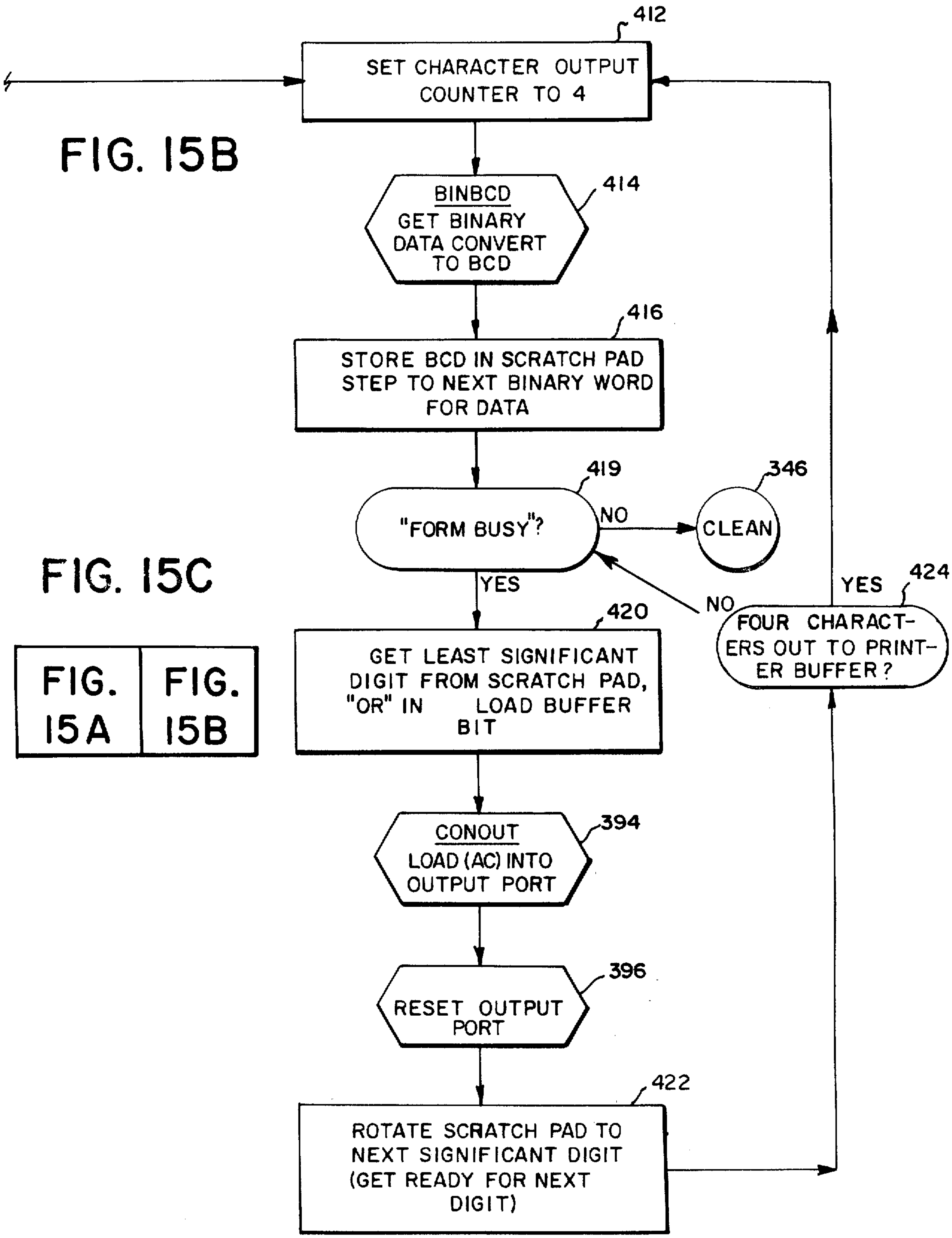

FIG. 7 comprising FIGS. 7A, 7B, 7C, and 7D, is an overall flow chart of a "MOVE" subroutine used by the executive program of the computer controller system of FIG. 1;

FIG. 8 comprising FIGS. 8A, 8B, 8C, 8D, 8E, 8F and 8G is a set of diagrammatic representations of various "MOVE" data transfer electrical circuit lines generated by the computer controller system of FIG. 1 showing the manner in which data is transferred;

FIG. 9 is a diagrammatic representation of a printer data transfer electrical circuit line generated by the computer controller system of FIG. 1;

FIG. 10 is a diagrammatic representation of three input electrical circuit lines of the computer controller system of FIG. 1;

FIG. 11 is a diagram of an output register port of a computer controller system of FIG. 1, showing its interrelationship with various inputs of a programmable printer;

FIG. 12 comprising FIGS. 12A and 12B is a flow chart of a non-relay logic printer data transfer line subroutine of the executive program of the computer controller system of FIG. 1;

FIG. 12C is a diagram showing how FIGS. 12A and 12B are put together to form FIG. 12;

FIG. 13 is a flow chart of a printer scheduler subroutine used by the computer controller system of FIG. 1;

FIG. 14 is a flow chart of a power-up subroutine of the executive program of the computer controller system of FIG. 1;

FIG. 15 comprising FIGS. 15A and 15B is a flow chart of a printer driver background subroutine of the computer controller system of FIG. 1;

FIG. 15C is a diagram showing how FIGS. 15A and 15B are put together to form FIG. 15; and FIG. 16 comprising 16A, 16B, 16C, and 16D is a set of flow charts of the subroutines used by the printer driver background subroutine of the computer controller system of FIG. 1.

DETAILED DESCRIPTION

BASIC OPERATION

As can best be seen in FIG. 1, a computer controller system 30 incorporates a programming panel 32, a central processor 34, a power supply 36, an input/output housing 38, and input/output modules 40, 42, 44, and 46. External devices 48 are controlled by and can communicate with the controller system via cable 50 interconnected to housing 38. A cable 52 connects the programming panel 32 to the central processor 34, while cables 54 and 56 connect the central processor to the power supply 36 and input/output housing 38.

As disclosed in U.S. Pat. No. 3,686,639, entitled "Digital Computer-Industrial Controller System and Apparatus," a computer controller system is capable of controlling external devices by entering into the central processor 32 various electrical circuit lines that represent the manner in which the external devices are controlled by switches, timers and counters. As described in U.S. Pat. No. 3,686,639, these circuit lines cause a simulated relay coil to be energized when there is simulated electrical continuity between both ends of the electrical circuit line. The energization of the electrical circuit line relay coil may then be used to drive external devices or as a reference for simulated electrical elements in other electrical circuit lines.

The electrical circuit lines disclosed in U.S. Pat. No. 3,686,639 consist of four nodes with a coil following the lattermost node, thus when these simulated electrical elements close, continuity is obtained throughout the line. The central processor interprets this continuity by energizing the simulated relay coil. Similarly, when the desired time has been reached in a timer entered in an electrical circuit line, the relay coil is energized. Similar energization occurs when a counter is entered into an electrical circuit line and the number of counts recorded equals the preset count of the counter.

Thus it can be seen that the present-day computer controller systems are able to control external devices such as machine tools, chemical batch processing and conveyor systems, by use of logic lines that represent electrical devices such as normally open switches, normally closed switches, timers and counters. Those skilled in the art will realize that these logic lines represent a Boolean algebraic technique of generating logical AND functions and logical OR functions.

The present invention utilizes the techniques disclosed in U.S. Pat. No. 3,686,639 with regard to generation of logical electrical circuit lines and the control of external devices and electrical circuit elements in other electrical circuit lines by the energization of simulated electrical relay coils. More particularly, the present invention utilizes a central processor 34 that incorporates a small general purpose computer as described in U.S. Pat. No. 3,686,639 or a digital computer as described in U.S. Pat. Nos. 3,740,722 and 3,761,893. The central processor in the preferred embodiment incorporates a multiplicity of 16 bit registers for the receipt and transfer of information. In addition, the present invention uses the techniques disclosed in U.S. Pat. No. 3,686,639 with regard to generating electrical circuit lines within the central processor via a programming panel 32 as well as solving these lines by means of an executive program stored in the computer. Furthermore, the techniques described in U.S. Pat. No. 3,686,639 regarding the central processor's communication with an input/output housing and input/output modules are similarly incorporated in the present invention.

As can best be seen in FIG. 2, the present invention adds a new dimension to present-day computer controller systems by allowing some of the logical electrical circuit lines to represent data transfer and data manipulation lines that are capable of retrieving data from within the central processor, acting upon this data, and depositing this data in other regions of the central processor. Once the electrical circuit line representing a data transfer function is energized, the actual transfer of the data may be made in response to commands from an external device.

As seen in FIG. 2, an electrical circuit line 58 illustrating a data transfer function incorporates four positions or nodes 60, 62, 64 and 66 and one simulated relay coil 68. The A-node 60 of the data transfer line 58 may comprise a normally open switch 70 or a normally closed switch (not shown); the initial condition of either element being referenced to a relay coil of another electrical circuit line. The technique involved for generating such electrical elements and the use of a relay coil to reference the initial condition of that electrical element is fully described in U.S. Pat. No. 3,686,639.

The B-node 62 of the data transfer line contains a register number referring to a register within the central processor 34 where data may be retrieved. Depending on the type of data transfer function, as will be discussed more fully later, the register number contained in the B-node may refer to one register or a first register of several registers where data may be retrieved. It is therefore possible to retrieve data from a single register or sequentially from a table of registers found within the central processor.

The C-node 64 of the data transfer line 58 specifies the type of data transfer function that is to be performed by the computer controller system. The C-node consists of a four digit decimal number. The most significant digit of this number represents the type of transfer function chosen. Thus a 1 in the most significant digit represents a "MOVE" function while a 4 represents a "PRINTER" function (both to be described more fully later) with a programmable printer as described in U.S. patent application Ser. No. 443,329.

The second most significant digit of the number placed in the C-node, represents the sub-type of the data transfer function. More particularly, if a "MOVE" function is desired, the second most significant digit represents what particular type of data movement is desired. Table number 1 describes these various "MOVE" sub-types. Similarly if a "PRINTER" function is desired, the second most significant digit represents whether pre-stored messages are to be printed by the programmable printer or whether only variable data from within the central processor 34 is to be printed by the programmable printer. Table number 2 describes these various "PRINTER" sub-types.

Lastly, the two least significant digits of the number stored in the C-node represent parameters that need to be defined with regard to a particular data transfer function. Thus, with respect to a "MOVE" function the two least significant digits represent the length of the table of data to be moved. If a pre-stored message is to be printed by a "PRINTER" function, the two least significant digits represent a particular message within the programmable printer. If only variable data is to be printed, the two least significant digits specify the format to be utilized by the printer.

When a "MOVE" data transfer function is selected, the D-node 66 contains the register number which in turn holds a number equal to the number of data registers moved from the B-node.

TABLE NO. 1

| C-NODE | MOVE SUB-TYPE |
|---|---|
| 10XX | Moves one register from a table of registers into a single register every time the A-node closes. The registers are taken in sequence from the table. The data in the table is not destroyed by this process. The numbers in "XX" determine the size of the table. |
| 11XX | Moves data from one register in a table into a single register continuously at the rate of one register transfer per sweep cycle when the A-node is closed. The registers are taken in sequence from the table. The data stored in the table is not destroyed by this process. |
| 12XX | Moves data from a single register into a table of registers every time the A-node closes. The table of registers is loaded in sequence. |
| 13XX | Moves data from a single register into a table of registers at a rate of one register per sweep cycle when the A-node is closed. The table of registers is loaded in sequence. |
| 14XX | Moves one register from a table of registers to another table of registers when the A-node closes. The registers are moved in sequence. |
| 15XX | "First in" side of a first in/first out data stack. The data is loaded into the lowest available (highest register number) register position. If, for example, the stack is empty, the data from one register is loaded into the bottom register of the stack. The length of the stack equals the numbers in "XX". |
| 16XX | "First out" side of a first in/first out data stack. The data unloads from the bottom of the stack. Each time the bottom stack unloads data, the remaining data registers slide down one register. |
| 17XX | Moves one register from a table of registers to another table of registers at a rate of one register transfer per sweep cycle when the A-node is closed. The table of registers is loaded in sequence. The two least significant digits specify the length of the table (0–99). |

TABLE NO. 2

| C-NODE | PRINTER SUB-TYPE |
|---|---|
| 40XX | Causes the printing of numeric variable data only. The two least significant digits specify the page and line type formats. |
| 41XX | Causes the printing of pre-stored messages within the programmable printer. The two least significant digits specify the desired message. |
| 4200 | Causes the printing of pre-stored messages within the programmable printer. The two least significant digits within the B-node register specify the desired message. |

This register is called the bookkeeping register. The register represented by a number equal to the D-node number plus 1 is the register within the central processor where data is to be transferred. Depending on the particular sub-type of "MOVE" function desired, this register is either the only register to receive data from the B-node register or registers or is the first of a table of registers to receive data in a sequential fashion.

When a "PRINTER" data function is desired, the D-node represents the output register of the central processor that is connected to the programmable printer via the input/output housing 38 and one of the output modules 40, 42, 44 or 46. This number thus represents the register within the central processor where data is deposited. As will be discussed more fully later, an inferred input register with a register number equal to the D-node number minus 1,000, is the register used by the central processor to receive command information from the programmable printer.

PROGRAMMING AND STORING A DATA TRANSFER LINE

Figure 3:
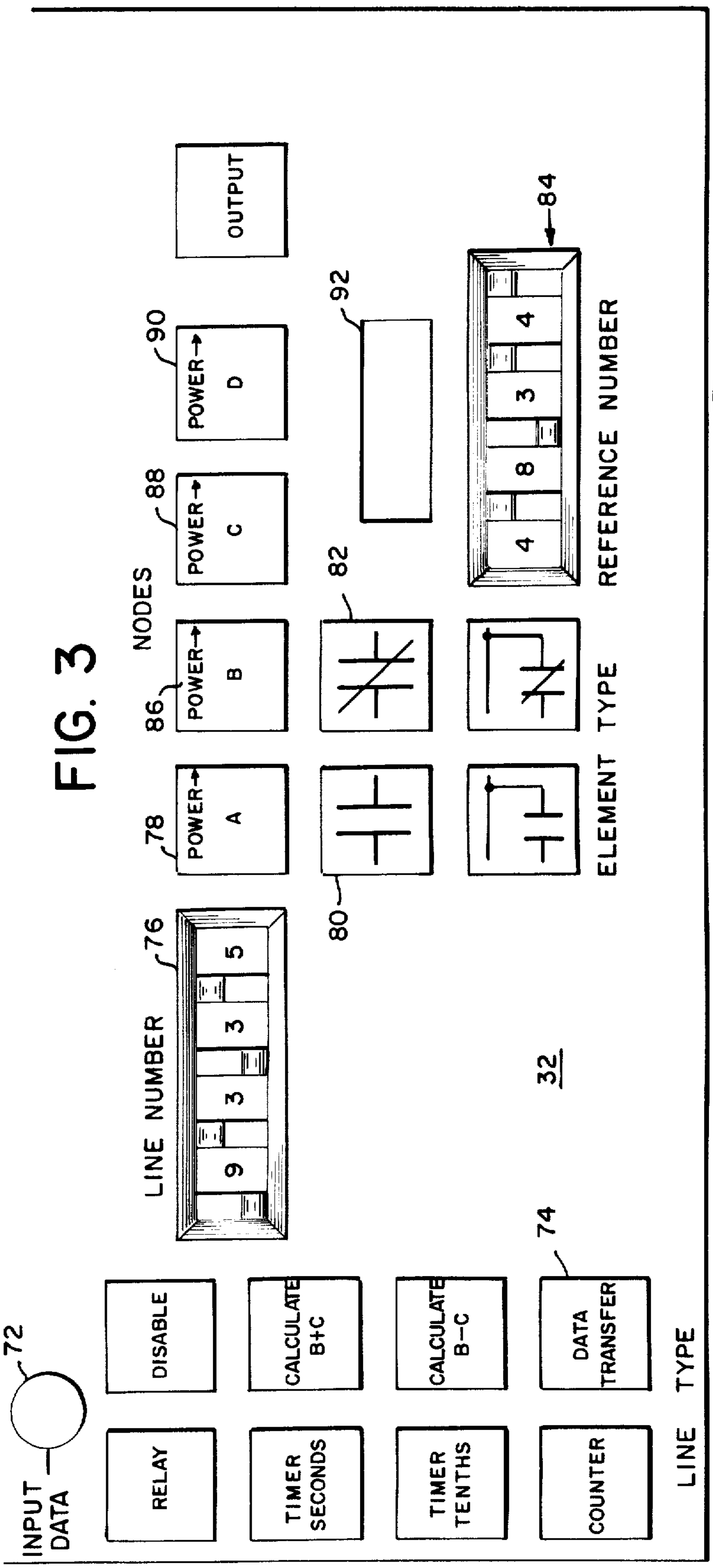
FIG. 3 is a front view of a programming panel of the computer controller system of FIG. 1.

As can best be seen in FIG. 3, programming panel 32 incorporates a number of push button switches and thumb wheel switches in order for an operator to program a desired electrical circuit line into the central processor 34. More particularly, a key-lock switch 72 has two positions, one of which, the input data position, allows an operator to insert electrical circuit lines into the central processor. A data transfer switch 74, when depressed, signals to the central processor that a data transfer electrical circuit line is to be generated by the programming panel. Line number thumb switches 76 are then set to the desired electrical circuit line within the central processor that is to be programmed into a data transfer line. The A-node push button 78 is depressed indicating that that particular node is to be entered into the central processor. After activating the A-node, element type push button 80, representing a normally open switch, or element type push button 82, representing a normally closed switch is depressed indicating the particular element type to be placed within the A-node.

Following this operation, reference number thumb wheel switches 84 are selected to refer to an output relay coil of an electrical circuit line that is to specify the initial condition of the chosen electrical element type. The energization of the data transfer line will be conditioned upon the state of the electrical element in the A-node.

Following the selection of the A-node, the B-node push button 86 is depressed. Following the B-node depression, reference number thumb wheel switches 84 are selected to indicate the register within the central processor where data can be retrieved.

Following the B-node push button depression, the C-node push button 88 is depressed and the reference number thumb wheel switches 84 are selected to represent the desired data transfer function. Finally, the D-node push button 90 is depressed and the reference number thumb wheel switches 84 are selected to indicate the register within the central processor where some or all of the manipulated data is to be deposited.

As is described in U.S. Pat. No. 3,686,639, all of the information entered into the A, B, C, and D nodes, as well as the particular electrical ciruit line number, may be seen in display window 92.

As the operator is inserting the data transfer function electrical circuit line into the central processor via programming panel 32, the central processor continuously monitors the programming panel so as to interpret and store the information selected by the operator. As is disclosed in U.S. Pat. No. 3,686,639, the central processor stores each electrical circuit line in 48 bits of designated core memory, these 48 bits representing three data words of 16 bits each (see FIG. 4). When data transfer switch 74 is depressed, three bits of WORDS 1 and 3 are coded to represent a data transfer line; that is, bit 0 of WORD 1 and bits 4 and 5 of WORD 3 are set to a binary 1 state. These bits therefore specify the circuit line type selected by the operator; in this case, a data transfer line.

Figure 4:
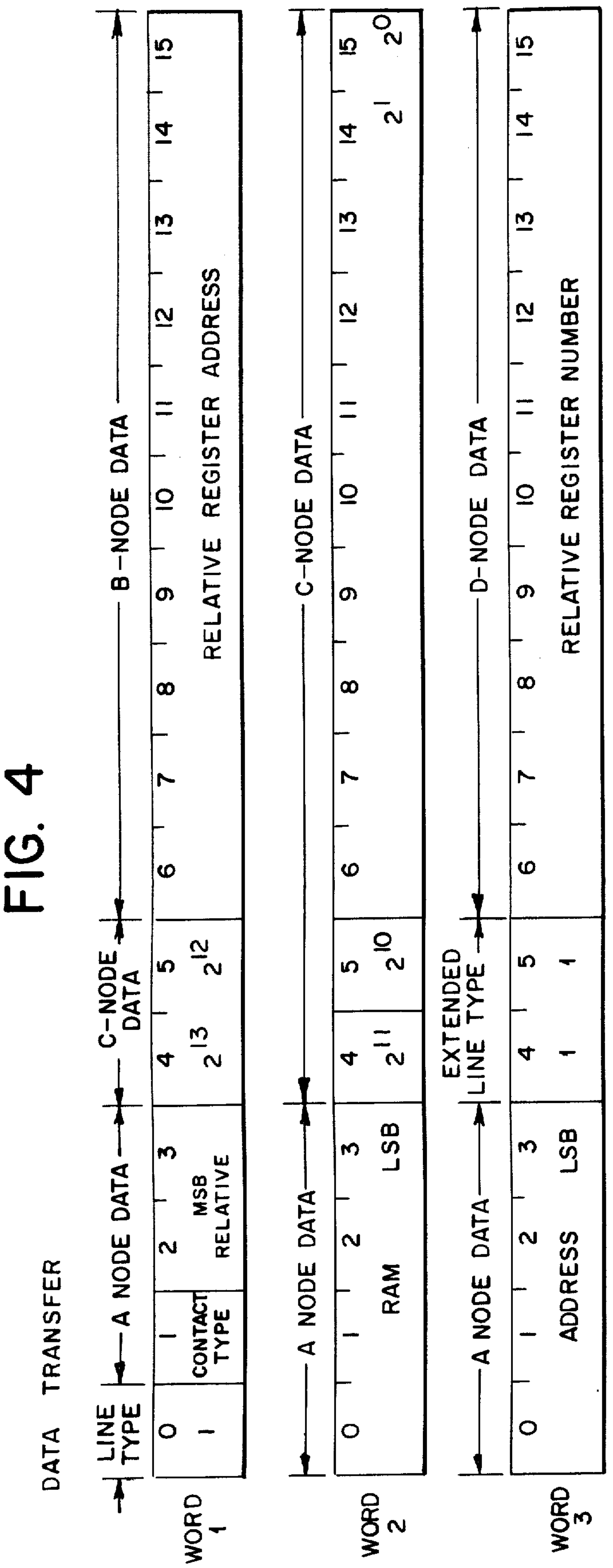
FIG. 4 is a schematic diagram of three registers utilized to store information relative to one electrical circuit line of the computer controller system of FIG. 1.

As best seen in FIG. 4, the type of electrical element chosen for the A-node is stored in bit 1 of WORD ONE. A binary zero in this bit represents a normally "open" switch and is generated by depressing push button 80, while a binary 1 in this bit represents a series normally closed switch or the depressing of push button 82. Bit numbers 2 and 3 of WORD ONE and bit numbers 0 through 3 of WORD TWO and WORD THREE denote the relative random access memory address of the central processor for simulating the electrical switch chosen. This random access memory is referenced by electronic circuits that are capable of solving relay elements in electrical circuit lines without the need of further computation by a computer program section or software section of the central processor. This computer program for storing and solving of data transfer electrical circuit lines is shown in Table number 3. The instruction set of the central processor is shown in Table number 4.

However, for the solution of non-relay electrical circuit lines, the non-relay portions of these lines must have the data transferred from the logic solver to the software section of the central processor. Thus the 10 bits of information denoting the relative random access memory address for the A-node contain all the information necessary for the logic solver to simulate the electrical element chosen as well as updating its condition in response to the relay coil of the referenced electrical circuit line.

TABLE NO. 3

```
                /DX MOVE OP CODES

                /10XX  TABLE TO REGISTER ON A CLOSING
                /11XX  TABLE TO REGISTER ON A CLOSED

                /12XX  REGISTER TO TABLE ON A CLOSING
                /13XX  REGISTER TO TABLE ON A CLOSED

                /14XX  TABLE TO TABLE ON A CLOSING
                /17XX  TABLE TO TABLE ON A CLOSED

                /15XX  "FI" OF FIFO STACK ON A CLOSING
                /16XX  "FO" OF FIFO STACK ON A CLOSING

                /DX PRINT OP CODES
                /(PRINTER DRIVER FOR P500 PRINTER ONLY)

                /40XX  NUMERIC OUTPUT ONLY FORMAT OF XX
                /41XX  PRINT FORM MESSAGE NUMBER XX
                /4200  PRINT FORM MESSAGE WHOSE NUMBER IS FOUND IN
                /        THE REGISTER POINTED TO BY THE B NODE
                EJECT
                /MACHINE STATUS BIT DEFINITIONS

                /SENSE

        000200  RTCS=200          /8 REAL TIME CLOCK SENSE
        000100  WLOCK=100         /9 MEMORY PROTECT VIOLATION CAUSED
        000020  PRGS=20           /11 PROGRAMMING PANEL ROM ENABLED
        000004  LOCK=4            /13 MEMORY PROTECT ENABLED

                /CONTROL

        000200  RTCC=200          /8 REAL TIME CLOCK ENABLE
        000100  RAMC=100          /9 COIL RAM CONTROL

        000020  PRGC=20           /11 ENABLE PROGRAMMING PANEL ROM
        000010  SHOT=10 /ACCESS CORE WITH NEXT INSTRUCTION

                / SYSTEM DEFINITION (OCTAL)

        000000  DOSG=0            /DELAYED OUTPUT START GROUP
```

TABLE NO. 3 – Continued

```
073          000017   DOEG=17          /DELAYED OUTPUT END GROUP
074          001604   REMOTE=1604      /NUMBER OF OUTPUT/HOLDING REGISTERS
075                   / NOTE: IF REGISTER TABLE GOES BELOW 40, ADDITIONAL
076                   /       OUT-OF-RANGE CHECKING MUST BE DONE IN IOCS &
077                   /       NON-RELAY SECTIONS.
078          000040   NGRP=40          /NUMBER OF GROUPS OF LINES
079          000020   INPUTS=20        /NUMBER OF DISCRETE INPUT GROUPS
080          000040   INPREM=40        /NUMBER OF INPUT REGISTERS
081                   EJECT
082          000001           *1
083
084
085 000001 000655             UPUP             /POWER UP ADDRESS
086
087
088                   / X002 RESERVED FOR 184 SERIAL NUMBER
089
090
091          000003           *. +1
092
093
094 000003 000025             25               /PROGRAM NUMBER
095
096
097 000004 110477             JMP NRLY         /NON-RELAY EXIT OF SB
098 000005 110712             JMP PANEL        /PANEL SERVICE EXIT OF SB
099 000006 110111             JMP EOG /END-OF-GROUP EXIT OF SB
100
101
102 000007 006005   DNTBO,    DNTB+INPREM      /OUTPUT HOLDING REGISTERS
103
104
105                   / XXX7 POINTER FOR SELECTIVE UNPROTECTED MEMORY
```

| MEMORY ADDRESS | NO. | |
|---|---|---|
| | RELAYS | |
| | TIMERS | |
| | COUNTERS | |
| | CALCULATORS | |
| | DATA TRANSFER: MOVE & PRINTER (MODEL P500) | |
| | 512 | LINES (INCLUDING WATCH DOG TIMER) |
| 1600–1617 | 256 | OUTPUTS (1–256 ON CHAN 1, 2) |
| 1640–1657 | 256 | INPUTS (1001–1256 ON CHAN 1, 2) |
| 1660–1677 | 240 | DELAYED OUTPUTS (2001–2240) |
| 5745–5764 | 16 | INPUT REGISTERS (3001–3016, 32 MAX) |
| 6005–6024 | 16 | OUTPUT REGISTERS (4001–4016, 32 MAX) |
| 6005–7610 | 900 | HOLDING REGISTERS (4001–4900) |
| | 4K | EXECUTIVE SIZE |
| 1400–1777 | | UNPROTECTED MEMORY |
| 5660–7777 | | |
| 2 | | 184 SERIAL NUMBER |
| 3 | 25 | PROGRAM NUMBER |
| 10 | | PROGRAMMING PANEL INTERFACE TABLE |
| 0001–7774 | DUMPING LIMITS | |
| 5040–5077 | OUTPUT ENABLE | |
| 5100–5117 | INPUT ENABLE | |
| 2000–2037 | INPUT/OUTPUT DIRECTORY | |
| 2040–5037 | LINE DATA | |

TABLE NO. 3—Continued

OPERATING SYSTEM

| MACHINE | INITIALIZED TO | RUNNING AT/OR BETWEEN |
|---|---|---|
| 1775 | 173 | 4-6 |
| | | 111-654 |
| | | 712-1367 |
| | | 1760-1767 |
| | | 5120-5146 |
| | | 5434-5575 |
| 5720 | 5147 | 446-476 |
| | | 5147-5433 |
| 7775 | 655 | 675 |
| 1637 | WATCH-DOG LINE | |

```
                         SUBJOB PANEL ROM/EXECT.  INTERFACE TABLE

                         /DOCUMENT #  SP-0014-000 REV AX08

                         /CCS  17 JAN 73

                         PIB,     /MARKS THE BEGINNING OF THE TABLE

                         /0001-0999  OUTPUT COILS
                                             /BEGINNING ADDRESS OF OUTPUT COIL
                                             /RAM TABLE IS 1600

000010 001000   PI1,     20!NGRP   /MAXIMUM RELATIVE LINE # OF
                                             /OUTPUT COILS

                         AVE,
000011 005040   PI2,     EVA       /BEGINNING ADDRESS OF THE OUTPUT
                                             /COIL ENABLE TABLE

                         /1001-1999  INPUT COILS
                         AWR,
000012 001640   PI4,     1600+NGRP          /BEGINNING ADDRESS OF INPUT
                                             /COIL RAM TABLE

000013 000400   PI5,     INPUTS!20  /MAX RELATIVE LINE NO. OF
                                             /INPUT COILS

                         AWE,
000014 005100   PI6,     EWA       /BEGINNING ADDRESS OF THE INPUT COIL
                                             /ENABLE TABLE

                         /2001-2999  DELAYED LOGIC LINE OUTPUT COILS
000015 000001   PI8,     1         /BEGINNING RELATIVE LINE NO.
                                             /OF DELAYED LOGIC LINE OUTPUT COILS
                                             /IF ZERO, DELAYED LOGIC LINE OUTPUT
                                             /COILS DO NOT EXIST

000016 000360   PI9,     20!DOEG   /LAST RELATIVE LINE NO OF
                                             /DELAYED LOGIC LINE OUTPUT COILS
                                             /IF THE CONTENT OF PI8 IS ZERO, THEN
                                             /THIS MUST BE ZERO
                         EJECT

                         /REMOTE TABLES

                         ADNTB,
000017 005745   PI21,    DNTB      /BEGINNING ADDRESS OF REGISTER CORE
                                             /TABLE.
                                             /IF ZERO, REGISTERS DO NOT EXIST.
```

TABLE NO. 3–Continued

```
PANEL ROM/EXECT. INTERFACE TABLE

                     /3001-3999  INPUT REGISTERS
000020 000040   PI11,    INPREM    /MAXIMUM RELATIVE LINE # OF INPUT
                                   /REGISTERS.
                                   /IF ZERO, INPUT REMOTES DO NOT
                                   /EXIST.

                     /4001-4999  OUTPUT/HOLDING REMOTES
000021 001604   PI13,    REMOTE    /MAXIMUM RELATIVE
                                   /LINE # OF OUTPUT/HOLDING REGISTERS.
                                   /IF ZERO,OUTPUT/HOLDING REGISTERS DO
                                   /NOT EXIST.

                     /5001-9999  UNASSIGNED LINE FUNCTIONS
000022 000000   PI14,    0         /BEGINNING ADDRESS OF EXECT. ROUTINE
                                   /TO PROCESS UNASSIGNED LINE
                                   /FUNCTIONS.
                                   /IF ZERO, NO UNASSIGNED LINE
                                   /FUNCTIONS EXIST

                /DATA TABLE DATA
                ATAB,
000023 002040   PI15,    SDAT      /BEGINNING ADDRESS OF OUTPUT COIL
                                   /DATA TABLE

                /FUNCTION INHIBIT MASK

000024 100177   PI16,    100177    /BIT = 0, INHIBITED
                                   /BIT = 1, ENABLED
                                   /BIT ASSIGNMENT:
                                   /BIT  0 REMOTE C NODE
                                   /BIT  9 DATA TRANSFER (DX)
                                   /BIT 10 TIMER SEC
                                   /BIT 11 TIMER SEC/10
                                   /BIT 12 COUNTER
                                   /BIT 13 CALCULATOR -
                                   /BIT 14 CALCULATOR +
                                   /BIT 15 RELAY
                /EXTENDED FUNCTION

000025 000000   PI17,    0         /BEGINNING ADDRESS OF EXECT. ROUTINE
                                   /TO PROCESS THE ENTERING OF THE
                                   /EXTENDED FUNCTION
                                   /CONTROL IS TRANSFERED VIA A JMS
                                   /IF ZERO, NO EXTENDED FUNCTION EXIST

                /DATA TRANSFER LINE (DX) B, C, &D NODE HANDLER

000026 005434   PI22,    DXPANL    /BEGINNING ADDR. OF EXEC. ROUTINE
                                   /TO HANDLE THE B, C, & D NODE
                                   /DATA OF A DX LINE.
                                   /CONTROL WILL BE PASSED TO THIS
                                   /ADDRESS IF D NODE.
                                   /CONTROL WILL BE PASSED TO THIS
                                   /ADDRESS+1 IF C NODE.
                                   /CONTROL WILL BE PASSED TO THIS
                                   /ADDRESS+2 IF B NODE.
                                   /CONTROL IS TRANSFERRED VIA A JMP
                                   /IF ZERO, DX LINE DOES NOT EXIST.

                / I/O TRAFFIC DIRECTORY TABLE

                TRACOP,
000027 002000   PI23,    TRACPO    /BEGINNING ADDRESS OF EXEC. TRAFFIC
                                   /COP TABLE. USED IN THE HANDLING
                                   /OF THE CONTENTS OF REMOTE REGISTERS
                                   /IF ZERO, THE TRAFFIC COP TABLE
                                   /DOES NOT EXIST. HENCE, THE
                                   /CONTENTS OF ALL REMOTE REGISTERS
```

TABLE NO. 3—Continued

```
PANEL ROM/EXECT. INTERFACE TABLE
                                           /ARE IN BINARY.

                          /SPARE PORT

    000030 000000         PI24,     0      /SPARE PORT
                          SUBJOB

                          SUBJOB ADDRESSES & CONSTANTS

    000031 001600         AVR,      1600    /SA COIL RAM
    000032 001660         AVL,      1600+NGRP+INPUTS  /BEGINNING ADDRESS OF
                                                      /DELAYED LOGIC LINE
                                                      /OUTPUT COIL RAM TABLE
    000033 001757         IFREG,    1757    /FLAG REGISTER & WATCH DOG

    000034 001760         SB,       1760    /ENTRANCE TO STUNT BOX
    000035 001761         BACK,     1761    /RE-ENTRANCE TO STUNT BOX FROM
                                            /NON RELAY LOGIC
    000036 001766         DELTAC,   1766    /SB LINE & UP-COUNTER
                                            /USED WITH PANEL EXIT
    000037 001770         IPCR,     1770    /I/O PROCESSOR CONTROL REG.

                          /I/O PROCESSOR CONTROL REGISTER BIT DEFINITIONS

                          /BIT 0 = 1 I/O TRANSMISSION IN PROGRESS, NOT READY
                          /BIT 1 = 0 INPUT ECHO OK (OR NO ECHO ON INPUT CYCLE)
                          /      = 1 INPUT ECHO NO COMPARE (2ND XMISSION ONLY)
                          /BIT 2 = 0 OUTPUT ECHO OK
                          /          (OR NO ECHO ON OUTPUT CYCLE)
                          /      = 1 OUTPUT ECHO NO COMPARE
                          /          (1ST OR 2ND XMISSION)
                          /BIT 3 = 0 ECHO EXISTS
                          /      = 1 ECHO DOES NOT EXIST
                          /BITS 6-15 ARE WRITE ONLY AND CAN BE LOADED ONLY
                          /          WHEN "READY" CONDITION EXISTS
                          /BITS 6 & 7 = 00 SEND OUTPUT & GET INPUT, FULL CYCLE
                          /           = 01 SEND OUTPUT ONLY, HALF CYCLE
                          /           = 10 GET INPUT ONLY, HALF CYCLE
                          /           = 11 SAME AS 00
                          /BITS 11 & 12 CHANNEL NUMBER
                          /BITS 13-15 DEVICE ADDRESS

    000040 001771         IPDR,     1771    /I/O PROCESSOR DATA REG.
                                            /CAN ONLY BE LOADED WHEN "READY"
                                            /CONDITION EXISTS

    000041 001772         ENBR,     1772    /STUNT BOX OUTPUT ENABLE REG.
    000042 001773         LPTR,     1773    /STUNT BOX LINE POINTER
    000043 001774         APTR,     1774    /STUNT BOX ADDRESS POINTER
    000044 001775         IPC,      1775    /STUNT BOX PC
    000045 001777         IPCS,     1777    /STUNT BOX PCS
    000046 007774         INDEX,    7774    /INDEX REGISTER
    000047 000173         STAR,     RATS    /STARTING ADDRESS OF HARD PC CODE
    000050 007611         AVC,      CVA     /IMAGE OUTPUT COIL RAM TABLE
    000051 007651         AWC,      CWA     /IMAGE INPUT COIL RAM TABLE
    000052 005705         AANHT,    ANHT    /A-NODE HISTORY MATRIX
    000053 001550         PRESTA,   PRESET  /NRLY WHEN PRESETS USED
    000054 001400         BCDSAV,   BCDIN   /IOCS BCD INPUT COMPARE
    000055 001440         BINSAV,   BINOUT  /IOCS BINARY OUTPUT COMPARE
    000056 001500         BCDOUT,   BINBCD  /IOCS BCD OUTPUT
    000057 007650         WDTIME,   CVA+NGRP-1  /WATCH-DOG TIMER
    000060 002037         LSTCOP,   TRACPO+37   /LAST TRAFFIC COP IN TABLE
    000061 007671         ARTAB,    RTAB    /DX REQUEST TABLE
    000062 005120         ADXLOK,   DXLOOK  /DX HANDLER ENTRANCE
    000063 005663         ADXDND,   DXDND   /DX D-NODE DATA
    000064 005664         ADXBND,   DXBND   /DX B-NODE DATA
    000065 005665         ADXCND,   DXCND   /DX C-NODE DATA
    000066 005702         HOLDMK,   MKHOLD  /REQUEST BIT MASK
```

TABLE NO. 3 – Continued

ADDRESSES & CONSTANTS

```
000067 005703   RQBITA, BITRQ    /RAM ADDRESS OF CURRENT PRINTER
                EJECT
                / CONSTANTS

000070 177377   NB7M,   '400
000071 023420   TENTHO, 23420    /=10000 (CALCULATORS)
000072 004000   BIT4,   4000
000073 100200   BOBS,   100200   /IOCS
000074 007611   DIR,    DNTB+INPREM+REMOTE
000075 001644   REGTAB, INPREM+REMOTE /REGISTER TABLE SIZE
000076 010421   C10421, 10421    /SPINNER (BCD CONVERSIONS)
000077 017500   CON7,   17500    /=8000 (BCD CONVERSIONS)
000100 007640   D4K,    7640     /DX (=4000)
000101 030000   C30K,   30000
000102 007777   MK7777, 7777
000103 010000   C10K,   10000
000104 014000   C14K,   14000
000105 007400   C7400,  7400
000106 040000   C40K,   40000
000107 170000   C170K,  170000
000110 002040   PROMA,  2040     /PP ENTRANCE
                PAUSE


000111 100225   EOG,    JMS IOCS       /GET INPUTS & OUTPUTS
000112 146046           IDX I INDEX    /NEXT GROUP
000113 014046           LAC I INDEX    /END OF SWEEP?
000114 072040           SAS P NGRP
000115 110154            JMP F256      /NO

                /END OF SWEEP

000116 014057           LAC I WDTIME   /YES; OUTPUT THE LAST
000117 004033           DAC I IFREG    /16 OUTPUTS TO THE WATCH
                                       /DOG TIMER
000120 100157           JMS RAMLAT     /MOVE RAM IMAGE TO LATCH
000121 066046           DZI INDEX
000122 164031   EOG10,  LAX I AVR      /MOVE RAM TO RAM IMAGE
000123 166050           DAX I AVC
000124 146046           IDX I INDEX
000125 014046           LAC I INDEX
000126 072040           SAS P NGRP     /MOVE COMPLETE?
000127 110122            JMP EOG10     /NO
000130 076420           SMS PRGC       /TURN ON THE PROGRAMMING
                                       /PANEL ROM, IF THERE.
000131 077420           SST PRGS       /ARE YOU THERE?
000132 110136            JMP DXSTUF    /NO
000133 011547           LAC SZIJ       /YES, ENTER WITH S&Z BITS IN
                                       /THE AC
000134 104110           JMS I PROMA    /GO ROM GO
000135 000010            PIB           /SA OF INTERFACE TABLE
000136 076020   DXSTUF, CMS PRGC       /TURN OFF PANEL
000137 114062           JMP I ADXLOK   /PROCESS PRINTER- IF THERE

                /SWEEP STARTS HERE
000140 076220   AGAIN,  CMS RTCC PRGC  /INHIBIT THE REAL-TIME
                                       /CLOCK & TURN OFF THE
                                       /PANEL HANDLER ROM
000141 011571           LAC SCLK       /GET THE SECONDS
000142 001573           DAC SECS
000143 017571           DZM SCLK       /RESET THE SECONDS TIMER
000144 011572           LAC TCLK       /GET THE TENTHS OF SECONDS
000145 001574           DAC TENS
000146 017572           DZM TCLK       /RESET THE TENTHS TIMER
000147 076600           SMS RTCC       /ENABLE THE REAL-TIME CLOCK
000150 100221           JMS IOSWEP     /SET IO FOR NEW SWEEP
000151 066042           DZI LPTR       /RESET SB LINE POINTER
000152 010023           LAC ATAB       /INITIALIZE THE SB
```

TABLE NO. 3 – Continued

```
ADDRESSES & CONSTANTS
000153 004043            DAC I APTR     /ADDRESS POINTER
000154 164011  F256,     LAX I AVE      /SET UP OUTPUT ENABLE BITS
000155 004041            DAC I ENBR
000156 114034            JMP I SB       /WE'RE OFF TO SEE THE WIZARD
000157 012000  RAMLAT,   LAC P DOSG     /MOVE RAM IMAGE TO LATCH
000160 004046            DAC I INDEX
000161 010032            LAC AVL
000162 001541            DAC DP1
000163 164050  EOG8,     LAX I AVC      /IMAGE OF 0XXX=>2XXX
000164 005541            DAC I DP1
000165 143541            IDX DP1
000166 146046            IDX I INDEX
000167 014046            LAC I INDEX
000170 072017            SAS P DOEG     /MOVE COMPLETED?
000171 110163             JMP EOG8      /NO
000172 175000            RTN            /YES
               SUBJOB

               SUBJOB SYSTEM INITIALIZATION FROM RESET
000173 076500  RATS,     SMS RAMC       /TURN ON THE RAM
000174 100214            JMS IOINIT     /IOCS INITIALIZATION ENTRY
000175 077100            SSF WLOCK      /WAS THE RESET CAUSED BY
                                        /A MEMORY PROTECT VIOLATION?
000176 110140             JMP AGAIN     /YES, KEEP ALL SEALS
                                        /NO, INITIALIZE THE RAM
                                  /SET LATCHED OUTPUTS
000177 100157            JMS RAMLAT     /IMAGE OF 0XXX=>2XXX
000200 066046            DZI INDEX      /RAM INPUT INITIALIZATION
000201 164051  CCS,      LAX I AWC      /RESTORE RAM
000202 166012            DAX I AWR
000203 100225            JMS IOCS       /UPDATE INPUTS
000204 164011            LAX I AVE      /IMAGE OF 0XXX THRU OUTPUT
000205 126050            ANX AVC        /ENABLE => 0XXX
000206 166031            DAX I AVR
000207 146046            IDX I INDEX
000210 014046            LAC I INDEX
000211 072040            SAS P NGRP
000212 110201             JMP CCS
000213 110140            JMP AGAIN
               /RAM IS INITIALIZED
               SUBJOB
               SUBJOB INPUT / OUTPUT CONTROL SYSTEM
000214 013037  IOINIT,   LAC P 1037     /INITIALIZATION ENTRY
000215 004037            DAC I IPCR     /START AN INPUT TRANSFER
000216 001570            DAC HOLDCR
000217 014060            LAC I LSTCOP   /GET LAST TC IN TABLE
000220 001566            DAC HOLDTC
000221 066046  IOSWEP,   DZI INDEX      /SWEEP ENTRY
000222 010027            LAC TRACOP     /SET TC ADDRESS POINTER
000223 001565            DAC ADDCOP
000224 175000            RTN
000225 014046  IOCS,     LAC I INDEX    /SAVE INDEX; INDEX IS USED
000226 001545            DAC DP2A       /IN WORKING THROUGH TABLES.
000227 001554            DAC SINX       /SINX SIMULATES INDEX
                                        /WHEN NGRP>IO TABLE.
000230 003542            DPS DP2        /SAVE RETURN
000231 011554  IOIO,     LAC SINX       /INDEX > IO TABLE?
000232 042040            SUB P 40
000233 170020            SMA
```

TABLE NO. 3—Continued

INPUT / OUTPUT CONTROL SYSTEM

```
022 000234 110270            JMP I014         /YES
023 000235 011566            LAC HOLDTC       /NO; BOTH INHIBITED?
024 000236 050073            AND BOB8
025 000237 060073            SAD BOB8
026 000240 110273             JMP I0400       /BOTH INHIBITED; DO NEXT TC.
027 000241 012005            LAC P 5          /SET ERROR COUNTER
028 000242 001540            DAC SWPF
029 000243 017543            DZM DP3          /PRESET INPUT
030 000244 014037    I012,   LAC I IPCR       /TRANSFER COMPLETE?
031 000245 170602            RAL SEA
032 000246 110244             JMP .-2         /NO
033 000247 170625            RAL SMA SOA RSS  /ANY ERRORS-IN OR OUT?
034 000250 110254             JMP I012C       /YES
035 000251 014040            LAC I IPDR       /NO ERRORS - READ INPUT
036 000252 001543            DAC DP3
037 000253 110273             JMP I0400
038
039 000254 170002    I012C,  SEA              /WERE THAY INPUT ERRORS?
040 000255 110260             JMP I012L       /YES
041 000256 014040            LAC I IPDR       /NO; READ INPUT
042 000257 001543            DAC DP3
043 000260 151540    I012L,  DSZ SWPF         /MAX ERRORS?
044 000261 110263             JMP I013        /NO; TRY AGAIN
045 000262 110273            JMP I0400        /YES; CONTINUE PROCESSING
046
047 000263 011567    I013,   LAC HOLDOP       /LOAD LAST OUTPUT
048 000264 004040            DAC I IPDR
049 000265 011570            LAC HOLDCR       /LOAD CR WITH LAST SETTING
050 000266 004037            DAC I IPCR
051 000267 110244            JMP I012
052
053 000270 011545    I014,   LAC DP2A         /RESET INDEX FOR EXEC.
054 000271 004046            DAC I INDEX
055 000272 115542            JMP I DP2
056 000273 015565    I0400,  LAC I ADDCOP     /GET CURRENT TC
057 000274 143565            IDX ADDCOP       /STEP TC ADDRESS POINTER
058 000275 001552            DAC HOLD
059 000276 050073            AND BOB8
060 000277 060073            SAD BOB8         /INPUT & OUTPUT INHIBITED?
061 000300 110351             JMP I0600       /BOTH INHIBITED
062 000301 170100            SZA              /IO EXCHANGE?
063 000302 110343             JMP I0460       /NO
064
065 000303 021554    I0406,  IOR SINX         /YES
066 000304 001570            DAC HOLDCR       /CONTROL REGISTER SETTING
067 000305 011552            LAC HOLD         /GET OUTPUT REL ADDR FOR
068 000306 052037            AND P 37         /INDEXING
069 000307 004046            DAC I INDEX
070 000310 011552            LAC HOLD         /GET OUTPUT BITS THAT
071 000311 052140            AND P 140        /GOVERN TYPE OF DATA
072 000312 072140            SAS P 140
073 000313 110330             JMP I0440       /MORE TESTS NEEDED
074 000314 164007            LAX I DNTBO      /REG. OUTPUT & CONVERSION
075 000315 001544            DAC DP1A         /REQUESTED.
076 000316 164055            LAX I BINSAV     /CHECK BINARY TO SEE IF
077 000317 041544            SUB DP1A         /OUTPUT HAS CHANGEG.
078 000320 170100            SZA
079 000321 110336             JMP I0450       /CONVERSION TO BCD NECESSARY
080 000322 164056            LAX I BCDOUT     /NO CHANGE; GET BCD FROM TAB

001 000323 004040    I0430,  DAC I IPDR       /LOAD IOP DATA REGISTER
002 000324 001567            DAC HOLDOP
003 000325 011570            LAC HOLDCR       /LOAD IOP CONTROL REGISTER
004 000326 004037            DAC I IPCR
005 000327 110351            JMP I0600
006
007 000330 072100    I0440,  SAS P 100        /DISCRETE OR REG. OUTPUT?
008 000331 110334             JMP .+3         /DISCRETE
009 000332 164007            LAX I DNTBO      /REGISTER; OUTPUT AS-IS
```

TABLE NO. 3-Continued

INPUT / OUTPUT CONTROL SYSTEM

```
000333 110323            JMP IO430

000334 164031            LAX I AVR        /GET OUTPUT RAM
000335 110323            JMP IO430

000336 164007  IO450,    LAX I DNTBO      /CONVERT BIN -> BCD
000337 166055            DAX I BINSAV
000340 100446            JMS CONBIN
000341 166056            DAX I BCDOUT     /UPDATE BCD TABLE
000342 110323            JMP IO430

000343 062200  IO460,    SAD P 200        /OUTPUT INHIBITED?
000344 110347             JMP .+3         /YES; LOAD IOP FOR INPUT
000345 012400            LAC P 400        /NO; LOAD IOP FOR OUTPUT
000346 110303            JMP IO406
000347 013000            LAC P 1000
000350 110303            JMP IO406

000351 011566  IO600,  LAC HOLDTC       /INPUT LAST TIME INHIBITED?
000352 170010            SPA
000353 110436             JMP IO550       /YES
000354 170400            RFR              /NO; GET REL ADDR FOR INDEX
000355 170400            RFR
000356 052037            AND P 37
000357 004046            DAC I INDEX
000360 011566            LAC HOLDTC
000361 170600            RAL              /REGISTER & CONVERT?
000362 170613            RAL SPA SEA RSS
000363 110420             JMP IO610       /NO
000364 164054            LAX I BCDSAV     /YES;DATA SAME AS BEFORE?
000365 041543            SUB DP3
000366 170040            SNA
000367 110436             JMP IO550       /DATA THE SAME-NO CONVERSION

000370 017557            DZM VAL          /BCD TO BINARY CONVERSION
000371 010076            LAC C10421       /SET SPINNER
000372 001560            DAC BDC1
000373 011543            LAC DP3          /DATA IS DIFFERENT
000374 166054            DAX I BCDSAV     /PUT NEW BCD IN TABLE
000375 110405            JMP DT2

000376 001555  DT1,      DAC TO
000377 170600            RAL
000400 170600            RAL
000401 031555            ADD TO
000402 170600            RAL
000403 001557            DAC VAL
000404 011556            LAC DIGS
000405 170600  DT2,      RAL
000406 170600            RAL
000407 170600            RAL
000410 170600            RAL
000411 001556            DAC DIGS
000412 052017            AND P 17
000413 031557            ADD VAL
000414 131560            RSO BDC1
000415 110376             JMP DT1
000416 166017            DAX I ADNTB      /STORE CONVERTED # IN ITABLE
000417 110436            JMP IO550

000420 170004  IO610;  SOA              /REGISTER INPUT?
000421 110425             JMP IO620       /NO;DISCRETE THROUGH ENABLES
000422 011543            LAC DP3          /YES; STORE AS-IS
000423 166017            DAX I ADNTB
000424 110436            JMP IO550

000425 164012  IO620,    LAX I AWR        /1XXX=>IMAGE OF 1XXX
000426 166051            DAX I AWC
000427 126014            ANX AWE          /RUN INPUTS THROUGH
```

TABLE NO. 3 – Continued

```
INPUT / OUTPUT CONTROL SYSTEM
000430 001541            DAC DP1          /INPUT ENABLES
000431 164014            LAX I AWE
000432 172000            CMA
000433 051543            AND DP3
000434 021541            IOR DP1
000435 166012            DAX I AWR

000436 011552   IO550,   LAC HOLD         /SAVE TC FOR INPUT NEXT TIME
000437 001566            DAC HOLDTC
000440 012037            LAC P NGRP-1     /SWEEP FINISHED?
000441 041545            SUB DP2A
000442 170120            SMA SZA
000443 110270             JMP IO14        /NO
000444 143554            IDX SINX         /YES; STAY IN IOCS UNTIL
000445 110231            JMP IO10         /IOCS TABLE IS EXHAUSTED
                         EJECT

000446 001557   CONBIN,  DAC VAL          /CONVERT BINARY TO BCD
000447 010076            LAC C10421
000450 001560            DAC BDC1
000451 001561            DAC BDC2
000452 011557            LAC VAL
000453 017557            DZM VAL
000454 040077   BD1,     SUB CON7
000455 133557            RML VAL
000456 170020            SMA
000457 143557             IDX VAL
000460 170010            SPA
000461 030077             ADD CON7
000462 170600            RAL
000463 131560            RSO BDC1
000464 110454             JMP BD1
000465 170400            RFR
000466 001555            DAC TO
000467 170600            RAL
000470 170600            RAL
000471 031555            ADD TO
000472 170600            RAL
000473 131561            RSO BDC2
000474 110454             JMP BD1
000475 011557            LAC VAL
000476 175000            RTN
                SUBJOB
                PAUSE
                SUBJOB TIMERS, COUNTERS, CALCULATORS, DX FUNCTION

000477 050070   NRLY,    AND NB7M         /CLEAR THE Z D BIT, I. E.
000500 001551            DAC PFWE         /THE OUTPUT OF THE LINE, AND
                                          /SAVE THE REST
000501 014043            LAC I APTR
000502 042001            SUB P 1
000503 001543            DAC DP3          /D-NODE DATA POINTER
000504 042001            SUB P 1
000505 001542            DAC DP2          /C-NODE DATA POINTER
000506 042001            SUB P 1
000507 001541            DAC DP1          /B-NODE DATA POINTER
000510 100632            JMS DNODE        /CHECK D-NODE ADDRESS
000511 001546            DAC DP3A         /D-NODE ABS ADDR
000512 040017            SUB ADNTB        /CHECK TO SEE IF ADDRESS IS
000513 042040            SUB P INFREM     /PAST INPUT REGISTERS
000514 170010            SPA
000515 110611             JMP TIM4        /ADDRESS IS IN INPUT AREA
000516 015543            LAC I DP3
000517 170400            RFR
000520 052300            AND P 300
000521 001554            DAC SINX
000522 062300            SAD P 300
000523 111002             JMP DXLINE      /DATA TRANSFER LINE
```

TABLE NO. 3 – Continued

```
                     /POWER UP COMES HERE
000655 010047  UPUP,  LAC STAR          /INIT. STUNT BOX MACHINE
000656 004044         DAC I IPC
000657 013775         LAC P 1775        /INITIALIZE INTERRUPT
000660 001562         DAC RTNMP         /RETURN MACHINE POINTER
000661 001575         DAC TIX           /INITIALIZE RTC COUNTERS
000662 001576         DAC TOX
000663 066063         DZI ADXDND        /CLEAR PRINTER CONTROL
000664 012040         LAC P RLAST-RTAB+1 /CLEAR DX REQUEST TABLE
000665 001541         DAC DP1
000666 066046         DZI INDEX
000667 012000         LAC P 0
000670 166061         DAX I ARTAB
000671 146046         IDX I INDEX
000672 151541         DSZ DP1
000673 110670          JMP . -3
000674 103562  INTEXT, IRI RTNMP        /RETURN FROM INTERRUPT
000675 077600         SST RTCS          /RTC INTERRUPT?
000676 110674          JMP INTEXT       /NO, IGNORE IT
                                        /YES, PROCESS ALL CLOCKS
000677 131575         RSO TIX           /COUNT EVERY 12TH CLOCK
000700 110674          JMP INTEXT       /INTERRUPT (120 HERTZ)
000701 143572         IDX TCLK          /COUNT A TENTH OF A SEC
000702 012020  CPS50, LAC P 20          /RESET TENTH SPINNER
000703 001575         DAC TIX
000704 131576         RSO TOX           /TENTH TENTH?
000705 110674          JMP INTEXT       /NO
000706 143571         IDX SCLK          /YES, COUNT A SECOND
000707 012100         LAC P 100         /RESET THE SECOND'S
000710 001576         DAC TOX           /SPINNER
000711 110674         JMP INTEXT
               SUBJOB
               EJECT
               /PANEL SERVICE EXIT FROM STUNT BOX
               /SAVE THE AC FOR THE PANEL & RETURN. THE EXEC.
               /WILL FIRE OFF THE PANEL AT END-OF-SWEEP.
000712 001547  PANEL, DAC SZIJ          /SAVE THE S, Z, I, &J BITS
000713 066036         DZI DELTAC        /FOR THE PANEL. CLEAR THE
000714 114035         JMP I BACK        /COUNT-UP CNTR. RETURN TO SB
```

```
               /VALIDATE THE DX FUNCTION CALL
               /CALLING SEQUENCE:
               /ENTER WITH THE BCD # IN THE AC
               /      JMS VALCND
               /       RETURN HERE IF INVALID
               /      RETURN HERE IF VALID
000715 001561  VALCND, DAC BDC2         /SAVE IT
000716 050107         AND C170K         /4XXX?
000717 070106         SAS C40K
000720 110766          JMP VAL1X        /NO; CHECK FOR 1XXX
000721 011561         LAC BDC2
000722 050105         AND C7400         /40XX OR 41XX OR 4200?
000723 170040         SNA
000724 110736          JMP CZERO        /=40XX
000725 062400         SAD P 400
000726 110751          JMP VALEXT       /= 41XX
000727 073000         SAS P 1000
000730 175000          RTN              /NEITHER
```

TABLE NO. 3 – Continued

```
000731 011561              LAC BDC2           /= 42XX, XX= 00?
000732 052377              AND P 377
000733 170100              SZA
000734 175000               RTN    /NO, EXIT
000735 110751              JMP VALEXT         /YES
000736 011561   CZERO,     LAC BDC2           /400X - 407X?
000737 052200              AND P 200
000740 170100              SZA
000741 175000               RTN               /NO, NG
000742 011561              LAC BDC2           /4001 - 4075?
000743 052017              AND P 17
000744 170040              SNA
000745 175000               RTN               /NO
000746 042006              SUB P 6
000747 170120              SMA SZA
000750 175000               RTN
000751 146045   VALEXT,    IDX I IPCS         /PRINTER RETURN
000752 146045   VALEX2,    IDX I IPCS         /MOVE RETURN
000753 011561              LAC BDC2
000754 175000              RTN
000755 170600   UPDXFC,    RAL                /UNPACK THE FUNCTION CALL
000756 170600              RAL
000757 050101              AND C30K
000760 001561              DAC BDC2
000761 015542              LAC I DP2
000762 050102              AND MK7777
000763 021561              IOR BDC2
000764 001563              DAC DXCN           /SAVE FUNCTION CALL
000765 175000              RTN
000766 070103   VAL1X,     SAS C10K           /1XXX?
000767 175000               RTN               /NO; NG
000770 011561              LAC BDC2           /<1800?
000771 040104              SUB C14K
000772 170020              SMA
000773 175000               RTN               /NO; DISPLAY ERROR CODE
000774 011561              LAC BDC2
000775 052377              AND P 377          /AT LEAST 2 IN XX?
000776 042002              SUB P 2
000777 170010              SPA
001000 175000               RTN               /NO; DISPLAY ERROR CODE
001001 110752              JMP VALEX2         /YES
                SUBJOB
                SUBJOB NON-RELAY DX FUNCTION

                /ENTER HERE ON DX LINE TYPE

                /AND THE ABSOLUTE ADDRESS IS IN "NRLDNA"
                /ADDRESSES OF THE DATA WORDS ARE IN DP1, 2, & 3
                /RESPECTFULLY.
                /DIGS:   HISTORY MATRIX RELATIVE ADDRESS
                /HOLD:   A-NODE BIT MASK
                /BDC1:   A-NODE JUST CLOSED FLAG
                /DP3A:   ABSOLUTE ADDRESS OF D-NODE

001002 015541   DXLINE,    LAC I DP1          /VALIDATE FUNCTION
001003 100755              JMS UPDXFC         /UNPACK FUNCTION
001004 001552              DAC HOLD
001005 043750              SUB P 1750
001006 170121              SMA SZA RSS
001007 110611               JMP TIM4          /FUNCTION< 1000
001010 043440              SUB P 3410-1750 /1800
001011 170010              SPA
001012 111106               JMP DXMOVE        /MOVE
001013 011552              LAC HOLD
001014 040100              SUB D4K            /> 4000?
```

TABLE NO. 3—Continued

```
NON-RELAY DX FUNCTION
001015 170121          SMA SZA RSS
001016 110611           JMP TIM4          /NO
001017 042115          SUB P 115          /YES; < 4077?
001020 170010          SPA
001021 111030           JMP DXPRNT        /YES
001022 042027          SUB P 144-115      /NO; < 4100?
001023 170010          SPA
001024 110611           JMP TIM4          /YES
001025 042144          SUB P 310-144      /NO; <4201?
001026 170120          SMA SZA
001027 110611           JMP TIM4          /NO
001030 101330  DXPRNT, JMS MKHIST         /MAKE & SENSE A NODE HISTORY
001031 010061          LAC ARTAB          /IS LINES'S REQUEST BIT ON?
001032 031556          ADD DIGS
001033 001564          DAC RQBIT
001034 015564          LAC I RQBIT
001035 051552          AND HOLD
001036 170040          SNA
001037 111060           JMP PDXOFF        /NO
001040 014063          LAC I ADXDND       /YES; IS THE D-NODE REGISTER
001041 170040          SNA                /ADDRESS = 0? (DONE?)
001042 111067           JMP PDX10         /YES; SET UP DATA FOR DRIVER
001043 010031          LAC AVR            /NO, IS THIS LINE OUTPUT ON?
001044 031556          ADD DIGS
001045 001557          DAC VAL
001046 015557          LAC I VAL
001047 051552          AND HOLD
001050 170100          SZA
001051 110603           JMP SETOUT        /YES; SET LINE OUTPUT
001052 066063          DZI ADXDND         /NO, CLEAR THE DX REQUEST
001053 011552  PDXABT, LAC HOLD           /CLEAR THE REQUEST BIT
001054 172000          CMA
001055 055564          AND I RQBIT
001056 005564          DAC I RQBIT
001057 110611          JMP TIM4           /NON RELAY RETURN (LINE OFF)
001060 011560  PDXOFF, LAC BDC1           /A-NODE CHANGE STATE TO ON?
001061 170040          SNA
001062 110611           JMP TIM4          /NO, EXIT (LINE OFF)
001063 011552          LAC HOLD           /YES, TURN ON REQUEST BIT
001064 025564          IOR I RQBIT
001065 005564          DAC I RQBIT
001066 110603          JMP SETOUT         /TURN ON LINE OUTPUT

               SUBJOB DX MOVE
001106 101330  DXMOVE, JMS MKHIST         /GET A-NODE HISTORY
001107 012010          LAC P DIGITE-DIGIT+1/GET TYPE OF MOVE DIGIT
001110 001557          DAC VAL            /& SIZE OF TABLE
001111 017556          DZM DIGS           /DIGS AT END OF LOOP
001112 011563          LAC DXCN           /=TYPE OF MOVE DIGIT
001113 043750          SUB P 1750         /SWPF CONTAINS TABLE SIZE
001114 001540  DXAGN,  DAC SWPF
001115 042144          SUB P 144
001116 170010          SPA
001117 111124           JMP DXANS
001120 143556          IDX DIGS
001121 151557          DSZ VAL
001122 111114           JMP DXAGN
001123 110611          JMP TIM4           /CAN NOT IDENTIFY THE MOVE
                                          /CODE
001124 100630  DXANS,  JMS BNODE          /CLOSED; B-NODE IN RANGE?
001125 001544          DAC DP1A           /ABS. ADDR.
001126 015546          LAC I DP3A         /WORD COUNT NEG. ?
001127 170010          SPA
```

TABLE NO. 3 – Continued

```
DX MOVE
001130 110611            JMP TIM4        /YES, NG
001131 041540           SUB SWFF        /WORD COUNT >= C NODE #?
001132 170020           SMA
001133 111160            JMP DXANSC      /YES
001134 011551           LAC PPWE        /A-NODE CLOSED OR OPEN?
001135 170010           SPA
001136 111146            JMP DXBIT       /OPEN
001137 011546 DXBIT2,   LAC DP3A        /CLOSED, POINTER TO DELTA
001140 171000           IAC
001141 001557           DAC VAL         /POINTER TO TABLE
001142 011556           LAC DIGS        /GENERATE ADDRESS TO SUB-
001143 033150           ADD P DIGIT     /SECTION
001144 001555           DAC TO
001145 115555           JMP I TO


001146 101165 DXBIT,    JMS DXDT56      /CHECK IF FIFO
001147 111323           JMP MOVEXT      /NO; SET OUTPUT COIL.


001150 111175 DIGIT,    JMP DIGITO      /TABLE->REGISTER: A CLOSING
001151 111176           JMP DIGIT1      /TABLE->REGISTER: A CLOSED
001152 111202           JMP DIGIT2      /REGISTER->TABLE: A CLOSING
001153 111203           JMP DIGIT3      /REGISTER->TABLE: A CLOSED
001154 111207           JMP DIGIT4      /TABLE->TABLE: A CLOSING
001155 111214           JMP DIGIT5      /FI OF FIFO STACK: A CLOSING
001156 111233           JMP DIGIT6      /FO OF FIFO STACK: A CLOSING
001157 111210 DIGITE,   JMP DIGIT7      /TABLE->TABLE: A CLOSED


001160 101165 DXANSC,   JMS DXDT56      /CHECK IF FIFO
001161 011551           LAC PPWE        /A-NODE PASSING POWER?
001162 170010           SPA
001163 067546            DZI DP3A       /NO, CLEAR THE POINTER
001164 111323           JMP MOVEXT      /SET OUTPUT COIL.


001165 011556 DXDT56,   LAC DIGS        /IF FIFO OP CODE
001166 042005           SUB P 5         /GO TO DXBIT2
001167 170040           SNA             /IF NOT, RTN.
001170 111137            JMP DXBIT2
001171 042001           SUB P 1
001172 170040           SNA
001173 111137            JMP DXBIT2
001174 175000           RTN
              EJECT



              /TYPE DIGIT 0: TABLE -> REGISTER ON A CLOSING
              /TYPE DIGIT 1: TABLE -> REGISTER ON A CLOSED

001175 101275 DIGITO,   JMS ACHEK       /A-NODE CLOSE THIS SWEEP?
001176 101310 DIGIT1,   JMS BNODT       /YES; CHECK B-NODE RANGE
001177 015560           LAC I BDC1      /NO; MOVE DATA
001200 005557           DAC I VAL
001201 101322           JMS MOVCOM      /CHECK FOR MOVE COMPLETED


              /TYPE DIGIT 2: REGISTER -> TABLE ON A CLOSING
              /TYPE DIGIT 3: REGISTER -> TABLE ON A CLOSED

001202 101275 DIGIT2,   JMS ACHEK       /A-NODE CLOSE THIS SWEEP?
001203 101301 DIGIT3,   JMS DNODT       /YES; CHECK D-NODE TABLE
                                        /RANGE
001204 015544           LAC I DP1A      /NO; MOVE DATA
001205 005561 DIGT3A,   DAC I BDC2
001206 101322           JMS MOVCOM      /CHECK FOR MOVE COMPLETED
```

TABLE NO. 3 – Continued

DX MOVE

```
                     /TYPE DIGIT 4: TABLE -> TABLE ON A CLOSING
                     /TYPE DIGIT 7: TABLE -> TABLE ON A CLOSED
001207 101275  DIGIT4, JMS ACHEK      /A-NODE CLOSE THIS SWEEP?
001210 101310  DIGIT7, JMS BNODT      /YES; CHECK B-NODE TABLE
                                      /RANGE
001211 101301          JMS DNODT      /CHECK D-NODE TABLE RANGE
001212 015560          LAC I BDC1     /MOVE DATA
001213 111205          JMP DIGT3A
                     /TYPE DIGIT 5: FI OF FIFO STACK ON A CLOSING
001214 101315  DIGIT5, JMS FULTAB     /TABLE FULL?
001215 011560          LAC BDC1       /A-NODE CLOSE THIS SWEEP?
001216 170040          SNA
001217 110611           JMP TIM4      /NO
001220 011546          LAC DP3A       /YES
001221 031540          ADD SWPF
001222 045546          SUB I DP3A
001223 001561          DAC BDC2       /DESTINATION ADDRESS
001224 040074          SUB DIR        /IS ADDR IN RANGE OF TABLE?
001225 170020          SMA
001226 110611           JMP TIM4      /NO
001227 015544          LAC I DP1A     /YES; MOVE DATA
001230 005561          DAC I BDC2
001231 101314          JMS FLTAB      /CHECK FOR FULL AGAIN
001232 110611          JMP TIM4
                     /TYPE DIGIT 6: FO OF FIFO STACK ON A CLOSING
001233 015544  DIGIT6, LAC I DP1A     /IS STACK EMPTY?
001234 170121          SMA SZA RSS
001235 110603           JMP SETOUT    /YES; SET OUTPUT LINE COIL
001236 011560          LAC BDC1       /A-NODE CLOSE THIS SWEEP?
001237 170040          SNA
001240 110611           JMP TIM4      /NO
001241 011544          LAC DP1A       /YES, PUT ACTIVE ADDRESS AT
001242 031540          ADD SWPF       /END OF TABLE
001243 001560          DAC BDC1
001244 040074          SUB DIR
001245 170020          SMA
001246 110611           JMP TIM4
001247 015560          LAC I BDC1     /MOVE DATA
001250 005546          DAC I DP3A
001251 011560          LAC BDC1       /SLIDE DATA TO BOTTOM OF STK
001252 042001          SUB P 1
001253 001561          DAC BDC2       /ADDRESS - 1 IN SOURCE TABLE
001254 155544          DSZ I DP1A     /DECREMENT DELTA IN TABLE
001255 170140           SKP
001256 110603           JMP SETOUT    /TURN ON LINE OUTPUT
001257 015544          LAC I DP1A     /NO. LOC. TO BE SLID
001260 170010          SPA            /CHECK FOR DELTA IN
001261 110611           JMP TIM4      /RANGE OF TABLE
001262 041540          SUB SWPF
001263 170020          SMA
001264 110611          JMP TIM4       /OUTSIDE OF DELTA-DO NOTHING
001265 037540          ADD M SWPF
001266 015561  IGIT6,  LAC I BDC2
001267 005560          DAC I BDC1
001270 153560          DDX BDC1
001271 153561          DDX BDC2
001272 151540          DSZ SWPF       /FINISHED?
001273 111266           JMP IGIT6     /NO
001274 110611          JMP TIM4
               EJECT
```

TABLE NO. 3—Continued

```
DX MOVE
001275 011560   ACHEK,   LAC BDC1        /A-NODE CLOSE THIS SWEEP?
001276 170100            SZA
001277 175000             RTN            /YES; KEEP GOING
001300 111323            JMP MOVEXT      /NO, SET OUTPUT COIL

                /GET D-NODE ADDRESS & CHECK TABLE RANGE
001301 011557   DNODT,   LAC VAL
001302 035546            ADD I DP3A
001303 001561            DAC BDC2
001304 040074   DNODT1,  SUB DIR         /BASE ADDRESS OF REG. TABLE
                                         /INPUT+ OUTPUT REGISTER SIZE
001305 170020            SMA
001306 110611             JMP TIM4       /ADDRESS OUT-OF-RANGE
001307 175000            RTN

                /GET B-NODE ADDRESS & CHECK TABLE RANGE
001310 011544   BNODT,   LAC DP1A
001311 035546            ADD I DP3A
001312 001560            DAC BDC1
001313 111304            JMP DNODT1

                /CHECK FOR FULL TABLE (DIGIT 5 - FIFO STACK)
001314 147546   FLTAB,   IDX I DP3A      /STEP TO NEXT SLOT IN TABLE
001315 011540   FULTAB,  LAC SWPF        /CHECK FOR FULL TABLE
001316 045546            SUB I DP3A
001317 170120            SMA SZA
001320 175000             RTN            /TABLE NOT FULL
001321 110603            JMP SETOUT      /TABLE FULL; TURN ON LINE

                /CHECK FOR MOVE COMPLETED
001322 147546   MOVCOM,  IDX I DP3A      /STEP TO NEXT SLOT IN TABLE
001323 011540   MOVEXT,  LAC SWPF
001324 045546            SUB I DP3A
001325 170121            SMA SZA RSS     /MOVE COMPLETED?
001326 110603             JMP SETOUT     /YES; TURN ON LINE
001327 110611            JMP TIM4        /NO; TURN OFF LINE
001067 100630   PDX10,   JMS BNODE       /VALIDATE THE B-NODE
001070 004064            DAC I ADXBND    /STORE IT
001071 011563            LAC DXCN        /CONVERT C-NODE
                                         /# TO BCD.
001072 100446            JMS CONBIN
001073 100715            JMS VALCND      /VALIDATE THE C-NODE
001074 111053             JMP PDXABT     /NG
001075 170000             NOP
001076 004065            DAC I ADXCND    /OK, STORE IT
001077 011546            LAC DP3A        /D NODE REMOTE ABSOLUTE ADDR
001100 004063            DAC I ADXDND.
001101 011552            LAC HOLD        /SEND REQUEST CONTROL
001102 004066            DAC I HOLDMK    /TO DRIVER
001103 011564            LAC RQBIT
001104 004067            DAC I RQBITA
001105 110603            JMP SETOUT      /TURN ON LINE OUTPUT

                /MAKE AND RECORD THE A NODE HISTORY

001330 014042   MKHIST,  LAC I LPTR      /MAKE LINE COUNT INTO
001331 052017            AND P 17        /A MATRIX ADDRESS.
001332 171000            IAC
001333 001556            DAC DIGS
001334 012001            LAC P 1
001335 170200            R3R
001336 170600            RAL
001337 170600            RAL
001340 151556            DSZ DIGS
001341 111335             JMP . -4
001342 001552            DAC HOLD
001343 001555            DAC TO
001344 011551            LAC PPWE        /SET STATE OF
```

TABLE NO. 3 – Continued

```
DX MOVE
001345 170010           SPA             /A-NODE INTO
001346 017555            DZM TO         /"TO"
001347 014042           LAC I LPTR
001350 170400           RFR
001351 052077           AND P 77
001352 001556           DAC DIGS
001353 030052           ADD AANHT       /GET STATE OF A NODE HISTORY
001354 001554           DAC SINX        /ABSOLUTE ADDRESS
001355 015554           LAC I SINX      /SENSE CHANGE
001356 172000           CMA             /NOT OLD & NEW
001357 051552           AND HOLD
001360 051555           AND TO
001361 001560           DAC BDC1        /SET JUST
                                        /CLOSED FLAG
001362 011552           LAC HOLD        /UPDATE HISTORY
001363 172000           CMA
001364 055554           AND I SINX
001365 021555           IOR TO
001366 005554           DAC I SINX
001367 175000           RTN
                SUBJOB
                EJECT

       001400   *1400

                                /IOCS BCD INPUT COMPARISON TABLE

       001400   BCDIN=.
       001440   *BCDIN+40

                                /IOCS BINARY OUTPUT (BEFORE
                                /CONVERSION)

       001440   BINOUT=.
       001500   *BINOUT+40

                                /IOCS BCD OUTPUT (BINOUT AFTER
                                /CONVERSION)

       001500   BINBCD=.
       001540   *BINBCD+40
       001540   *1540
                /SCRATCH PAD & ASSORTED ODDS & ENDS

       001540   SWPF=.
       001541   DP1=. +1
       001542   DP2=. +2
       001543   DP3=. +3
       001544   DP1A=. +4
       001545   DP2A=. +5
       001546   DP3A=. +6
       001547   SZIJ=. +7       /S, Z, I, & J PANEL BITS
       001550   PRESET=. +10
       001551   PPWE=. +11
       001552   HOLD=. +12
       001553   INGC=. +13
       001554   SINX=. +14
       001555   TO=. +15
       001556   DIGS=. +16
       001557   VAL=. +17
       001560   BDC1=. +20
       001561   BDC2=. +21
       001562   RTNMP=. +22
       001563   DXCN=. +23
       001564   ROBIT=. +24

                /EXCLUSIVE PROPERTY OF IOCS

```

TABLE NO. 3 – Continued

```
        001565  ADDCOP=. +25    /TRAFFIC COP ADDRESS POINTER
        001566  HOLDTC=. +26    /LAST TRAFFIC COP USED
        001567  HOLDOP=. +27    /LAST OUTPUT TO DATA REGISTER
        001570  HOLDCR=. +30    /LAST IOP CONTROL REGISTER SETTING

                /REFERENCED BY INTERRUPT PROCESSOR

        001571  SCLK=. +31      /SECONDS CLOCK
        001572  TCLK=. +32      /TENTHS CLOCK
        001573  SECS=. +33      /SECONDS TIMER
        001574  TENS=. +34      /TENTHS TIMER
        001575  TIX=. +35       /TENTHS SPINNER
        001576  TOX=. +36       /SECONDS SPINNER
```

```
                / STANDARD TRAFFIC COP TABLE
                / INPUT BIT     FUNCTION
                /       0       0 ENABLE TRANSFER
                /               1 INHIBIT TRANSFER

                /       1       0 DISCRETE
                /               1 REGISTER : INTERROGATE BIT 2

                /       2       0 STORE REGISTER "AS IS"
                /               1 CONVERT REGISTER TO BINARY

                /       3-7       DISCRETE : GROUP NUMBER
                /                 REGISTER :REL ADDR IN INPUT TABLE

                /       4


                /       5


                /       6


                /       7


                /OUTPUT 8       0 ENABLE TRANSFER
                /               1 INHIBIT TRANSFER

                /       9       0 DISCRETE
                /               1 REGISTER : INTERROGATE BIT 10

                /       10      0 OUTPUT REGISTER "AS IS"
                /               1 CONVERT REGISTER TO BCD

                /       11-15     DISCRETE : GROUP NUMBER
                /                 REGISTER :REL ADDR IN OUTPUT TABLE

                /       12


                /       13


                /       14


                /       15
        002000  *2000           /FULL PROTECTION
002000  000000  TRACPO, 0         /CHAN 1 ADDR 1 : 1-16 DISCRETE IO
002001  000401          401
002002  001002          1002
002003  001403          1403
002004  002004          2004
```

TABLE NO. 3 – Continued

```
002005 002405          2405
002006 003006          3006
002007 003407          3407

002010 004010          4010    /CHAN 2 ADDR 1 : 129-144 DISCRETE IO
002011 004411          4411
002012 005012          5012
002013 005413          5413
002014 006014          6014
002015 006415          6415
002016 007016          7016
002017 007417          7417

002020 060140          60140   /CHAN 3 ADDR 1 : 1ST REGISTER IO
002021 060541          60541
002022 061142          61142
002023 061543          61543
002024 062144          62144
002025 062545          62545
002026 063146          63146
002027 063547          63547

002030 064150          64150   /CHAN 4 ADDR 1 : 9TH REGISTER IO
002031 064551          64551
002032 065152          65152
002033 065553          65553
002034 066154          66154
002035 066555          66555
002036 067156          67156
002037 067557          67557
                EJECT

                /LINE DATA TABLE

       002040   SDAT=.
       005035   *20!3!NGRP+SDAT-3          /DATA TABLE END WITH
       000777   WDLA=20!NGRP-1             /WATCH DOG TIMER
005035 052777           WDLA&1400!20+WDLA+42000
005036 172777           WDLA&360!400+WDLA+2000
005037 172777           WDLA&17!10000+WDLA+2000


                /OUTPUT ENABLE TABLE (0=ENABLED, 1=DISABLED)

       005040   EVA=.    /ENABLE OF 1-16
       005100   *EVA+NGRP

                /INPUT ENABLE TABLE (0=ENABLED, 1=DISABLED)

       005100   EWA=.    /ENABLE OF 1001-1016
       005120   *EWA+INPUTS
                SUBJOB
                PAUSE
                SUBJOB PRINTER SCHEDULER



005120 011667   DXLOOK, LAC HWDTW          /MAKE LEADING EDGES
005121 172000           CMA                /OF THE 3 FEEDBACK
                                           /BITS.
005122 055633           AND I AWDTW
005123 001666           DAC DXLDED
005124 015633           LAC I AWDTW        /SAVE SETTINGS
005125 001667           DAC HWDTW          /FOR NEXT SWEEP
005126 011663           LAC DXDND          /PRINTER IN
                                           /OPERATION?
005127 170040           SNA
005130 111144            JMP DXL1          /NO
```

TABLE NO. 3—Continued

```
005131 011666          LAC DXLDED      /YES; PANIC BUTTON SET?
005132 170220          R3R SMA
005133 111136           JMP DXL8       /NO, PANIC BUTTON NOT SET
005134 011627          LAC ADXIN       /YES, INITIALIZE PC
005135 001660          DAC DXPC
005136 011632  DXL8,   LAC PDXPC       /GET ADDR OF PC & GO THERE
005137 005626          DAC I MPRTN     /SET SYSTEM POINTER
005140 125625          LMP I INTPC     /LET INT. MACH. SWITCH
005141 011663          LAC DXDND       /HANDLER FINISHED?
005142 170100          SZA
005143 115630           JMP I GAINA    /NO; RETURN TO SWEEP
005144 011627  DXL1,   LAC ADXIN       /YES; INITIALIZE SWEEP
005145 001660          DAC DXPC
005146 115630          JMP I GAINA
               SUBJOB
               EJECT
               SUBJOB DX PRINTER DRIVER
005147 011666  PDXIN1, LAC DXLDED      /ABORT BUTTON HIT?
005150 170210          R3R SPA
005151 111345           JMP CLEAN      /YES; CLEAN THE DIRTY HOUSE
005152 012200          LAC P 200       /NO, CLEAR THE PRINTER
005153 101216          JMS CONOUT      /WAIT FOR IO
005154 017704          DZM WITONE      /SET SWT TO VARIABLE
005155 011665          LAC DXCND       /WHY ARE WE HERE?
005156 053400          AND P 1400      /FORM OR VARIALBE DATA?
005157 170040          SNA
005160 111174           JMP VARDAT     /VARIABLE DATA
005161 072400          SAS P 400       /FORM, BUT WHICH?
005162 111244           JMP PMR1       /FORM # IN B NODE REG.
005163 011665          LAC DXCND       /FORM # IN FUNCTION CALL
005164 052377  PMR2,   AND P 377       /GET FORM ADDRESS
005165 170400          RFR
005166 170400          RFR
005167 022010          IOR P 10        /LOAD FORM BIT
005170 101216          JMS CONOUT      /LOAD INTO IO PORT
               /ASSUMPTION MADE THAT 'FORM' WILL WANT VARIABLE DATA
               /CONTROL IS RETURNED HERE WHEN 'BUSY' GOES LOW.
005171 153704          DDX WITONE      /SET FORM SWITCH
005172 101250          JMS GETLD4      /GET 4 CHAR->BUFFER
005173 111172          JMP .-1
005174 011665  VARDAT, LAC DXCND       /GET LINE TYPE &
005175 052017          AND P 17        /GENERATE ABS ADDRESS
005176 031637          ADD TYPLIN      /OF LINE TYPE ROUTINE
005177 001674          DAC CNTR
005200 015674          LAC I CNTR
005201 001701          DAC LINTYP
005202 011665          LAC DXCND       /GET PAGE TYPE
005203 170400          RFR
005204 052017          AND P 17
005205 031640          ADD TYPPAG
005206 001674          DAC CNTR        /ABS ADDR OF PAGE
005207 015674          LAC I CNTR      /TYPR ROUTINE; GO THERE
005210 001660          DAC DXPC        /AN EFFECTIVE JUMP

005211 012002  SPACE,  LAC P 2         /OUTPUT SPACE TO BUFFER
005212 111216          JMP CONOUT
005213 012004  FFEED,  LAC P 4         /FORM FEED
005214 111216          JMP CONOUT
005215 012001  PRINT,  LAC P 1         /PRINT THE LINE
005216 005663  CONOUT, DAC I DXDND     /LOAD INTO IO PORT
```

TABLE NO. 3—Continued

```
DX PRINTER DRIVER

                         /WAIT A SWEEP, MONITOR PRINTER BUSY FLAG

                         /HAND SHAKING BETWEEN PRINTER DRIVER & PRINTER

                         /ALL COMMANDS TO THE PRINTER ARE ACKNOWLEDGED
                         /IN THE FOLLOWING MANNER (WITH THE EXCEPTION
                         /OF "CLEAR").
                         /  1) COMMAND TO THE PRINTER.
                         /  2) WAIT FOR PRINTER BUSY.
                         /  3) CLEAR COMMAND FROM OUTPUT REGISTER.
                         /  4) WAIT FOR BUSY TO DROP.

005217 003672                      DPS PCSAV2       /WAIT SWEEP ENTRY
005220 101232            WATSW4,   JMS DXEXIT       /RETURN TO SCHEDULER
005221 011667                      LAC HWDTW        /PRINTER BUSY?
005222 170404                      RFR SOA
005223 111220                       JMP WATSW4      /NO; RETURN TO SWEEP
005224 067663                      DZI DXDND        /YES; CLEAR IO PORT
005225 101232            WATSW5,   JMS DXEXIT       /RETURN TO SCHEDULER
005226 011667                      LAC HWDTW        /PRINTER BUSY?
005227 170404                      RFR SOA
005230 115672                       JMP I PCSAV2    /NO; CONTINUE PROCESSING
005231 111225                      JMP WATSW5       /YES; TRY NEXT SWEEP

005232 013775            DXEXIT,   LAC P 1775       /RETURN TO SCHEDULER
005233 005626                      DAC I MPRTN      /MACHINE
005234 125625                      LMP I INTPC      /LET INT. MACH. SWITCH
005235 175000                      RTN

                         /GENERATE 'N' LINE FEEDS
                         /ENTER WITH NUMBER OF LINE FEEDS IN AC


005236 003673            LINFED,   DPS PCSAV3
005237 001674                      DAC CNTR
005240 101215            LINFD,    JMS PRINT
005241 151674                      DSZ CNTR
005242 111240                       JMP LINFD
005243 115673                      JMP I PCSAV3


005244 015664            PMR1,     LAC I DXBND      /GET THE FORM # FROM
005245 143664                      IDX DXBND        /THE B NODE
005246 105631                      JMS I BNBCD      /CONVERT TO BCD
005247 111164                      JMP PMR2
                         EJECT

                         /GET 4 CHARACTERS (1 WORD) FROM B-NODE ADDRESS.
                         /CALL 'SINGLE CHARACTER OUT' SUBROUTINE TO LOAD
                         /OUTPUT AND CONTROL PORTS. A ONE SWEEP WAIT IS
                         /INITIATED AFTER LOADING THE CONTROL PORT TO GIVE
                         /THE IO TIME TO GET THE DATA TO THE PRINTER.
                         /THE PRINTER BUSY FLAG IS MONITORED AFTER THE
                         /ONE SWEEP DELAY BEFORE CONTROL IS RETURNED FROM
                         /THE 'SWEEP WAIT' ROUTINE.

005250 012004            GETLD4,   LAC P 4      /SET CHAR COUNTER
005251 003671                      DPS PCSAV1       /SAVE RA
005252 001674                      DAC CNTR
005253 015664                      LAC I DXBND      /GET BINARY
005254 105631                      JMS I BNBCD      /CONVERT TO BINARY
005255 001670                      DAC CHAR
005256 143664                      IDX DXBND        /STEP TO NEXT 4 CHAR

005257 131704            GETLDA,   RSO WITONE       /FORM OR PURE DATA?
005260 111264                       JMP GETLDB      /PURE DATA
005261 011667                      LAC HWDTW        /FORM; FORM BUSY?
005262 170204                      R3R SOA
```

TABLE NO. 3—Continued

```
DX PRINTER DRIVER
005263 111345                JMP CLEAN       /NO; RETURN - ALL DONE
005264 011670     GETLDB,   LAC CHAR        /YES; GET CHAR.
005265 051620               AND C170K1
005266 022020               IOR P 20
005267 101216               JMS CONOUT
005270 011670               LAC CHAR
005271 170400               RFR
005272 170400               RFR
005273 170400               RFR
005274 001670               DAC CHAR
005275 151674               DSZ CNTR        /4 CHAR OUT?
005276 111257                JMP GETLDA      /NO
005277 115671               JMP I PCSAV1    /YES

                  /SPACE, 4 CHARACTERS
005300 003673     LINE0,    DPS PCSAV3
005301 111315               JMP LINE0A

                  /SPACE, 4 CHAR, SPACE, 4 CHAR
005302 003673     LINE1,    DPS PCSAV3
005303 111313               JMP LINE1A

                  /SPACE, 4 CHAR, SPACE, 4 CHAR, SPACE, 4 CHAR
005304 003673     LINE2,    DPS PCSAV3
005305 111311               JMP LINE2A

                  /SPACE, 4 CHAR, SPACE, 4 CHAR, SPACE, 4 CHAR, SPACE,
                  /4 CHAR
005306 003673     LINE3,    DPS PCSAV3
005307 101211               JMS SPACE
005310 101250               JMS GETLD4
005311 101211     LINE2A,   JMS SPACE
005312 101250               JMS GETLD4
005313 101211     LINE1A,   JMS SPACE
005314 101250               JMS GETLD4
005315 101211     LINE0A,   JMS SPACE
005316 101250     LINFIN,   JMS GETLD4
005317 101215               JMS PRINT
005320 115673               JMP I PCSAV3

                  EJECT
                  /SPACE, 8 CHAR, SPACE, 4 CHAR
005321 003673     LINE4,    DPS PCSAV3
005322 101211               JMS SPACE
005323 101250               JMS GETLD4
005324 101250               JMS GETLD4
005325 101211               JMS SPACE
005326 111316               JMP LINFIN

                  /SPACE, 8 CHAR, SPACE, 8 CHAR
005327 003673     LINE5,    DPS PCSAV3
005330 101211               JMS SPACE
005331 101250               JMS GETLD4
005332 101250               JMS GETLD4
005333 101211               JMS SPACE
005334 101250               JMS GETLD4
005335 111316               JMP LINFIN


005336 005300     ALINE0,   LINE0           /DX PRINT LINE
005337 005302               LINE1           /FORMAT ROUTINES
005340 005304               LINE2
005341 005306               LINE3
005342 005321               LINE4
005343 005327               LINE5
                  / 1 LINE
005344 105701     PAGE0,    JMS I LINTYP
005345 067663     CLEAN,    DZI DXDND       /CLEAR CONTROL PORT
```

TABLE NO. 3—Continued

```
DX PRINTER DRIVER
005346 017663        DZM DXDND        /CLEAR D-NODE DATA
005347 011702        LAC MKHOLD       /CLEAR REQUEST BIT
005350 172000        CMA
005351 055703        AND I BITRQ
005352 005703        DAC I BITRQ
005353 101232        JMS DXEXIT       /RETURN TO SCHEDULER

              / 1 LINE, 1 LINE FEED
005354 105701 PAGE1, JMS I LINTYP
005355 012001        LAC P 1
005356 101236        JMS LINFED
005357 111345        JMP CLEAN

              / 12 LINE FEEDS, 1 LINE, FORM FEED
005360 012014 PAGE2, LAC P 14
005361 101236        JMS LINFED
005362 105701        JMS I LINTYP
005363 101213        JMS FFEED
005364 111345        JMP CLEAN

              / 11 LINE FEEDS, 2 LINES, FORM FEED
005365 012013 PAGE3, LAC P 13
005366 101236        JMS LINFED
005367 105701        JMS I LINTYP
005370 105701        JMS I LINTYP
005371 101213        JMS FFEED
005372 111345        JMP CLEAN

              / 10 LINE FEEDS, 3 LINES, FORM FEED
005373 012012 PAGE4, LAC P 12
005374 101236        JMS LINFED
005375 105701        JMS I LINTYP
005376 105701        JMS I LINTYP
005377 105701        JMS I LINTYP
005400 101213        JMS FFEED
005401 111345        JMP CLEAN
              EJECT

              / 9 LINE FEEDS, 4 LINES, FORM FEED
005402 012011 PAGE5, LAC P 11
005403 101236        JMS LINFED
005404 105701        JMS I LINTYP
005405 105701        JMS I LINTYP
005406 105701        JMS I LINTYP
005407 105701        JMS I LINTYP
005410 101213        JMS FFEED
005411 111345        JMP CLEAN

              / 10 LINE FEEDS, 1 LINE, LINE FEED, 1 LINE,
              /FORM FEED
005412 012012 PAGE6, LAC P 12
005413 101236        JMS LINFED
005414 105701        JMS I LINTYP
005415 012001        LAC P 1
005416 101236        JMS LINFED
005417 105701        JMS I LINTYP
005420 101213        JMS FFEED
005421 111345        JMP CLEAN

              / 8 LINE FEEDS, 2 LINES, LINE FEED, 2 LINES,
              /FORM FEED
005422 012010 PAGE7, LAC P 10
005423 101236        JMS LINFED
005424 105701        JMS I LINTYP
005425 105701        JMS I LINTYP
005426 012001        LAC P 1
005427 101236        JMS LINFED
```

TABLE NO. 3—Continued

```
DX PRINTER DRIVER
005430 105701          JMS I LINTYP
005431 105701          JMS I LINTYP
005432 101213          JMS FFEED
005433 111345          JMP CLEAN

                 SUBJOB PANEL SERVICE FOR DX LINE B, C & D NODES

005434 111437  DXPANL, JMP XDXDN       /D NODE
005435 111514          JMP XDXCN       /C NODE
005436 115614          JMP I CARBNS    /B NODE IS IDENTICAL TO THE
                                       /B NODE OF A CALCULATOR LINE

005437 015613  XDXDN,  LAC I REMH      /CHECK ADDRESS FOR D-NODE
005440 001677          DAC HOLD5       /RANGE
005441 015605          LAC I IDW3
005442 105677          JMS I HOLD5
005443 105610           JMS I IU33U    /NON-REGISTER ENTRY-NG
005444 105610           JMS I IU33U    /INPUT REGISTER ENTRY-NG
005445 015603          LAC I IDW1      /UNPACK THE C NODE
005446 101365          JMS UPDXF5      /TO SEE IF IT IS A PRINTER
005447 105631          JMS I BNBCD     /BIN TO BCD
005450 041636          SUB C4KBCD
005451 051620          AND C170K1
005452 170100          SZA
005453 111507           JMP DXDN4      /NOT A PRINTER DX LINE
005454 015602          LAC I ILS3D     /FIND THE OUTPUT REGISTER
005455 045635          SUB I IPI11     /IN THE TRAFFIC COP TABLE
005456 042040          SUB P 40
005457 170020          SMA
005460 105610           JMS I IU33U    /OUT OF TABLE
005461 032140          ADD P 40+100
005462 001677          DAC HOLD5
005463 012040          LAC P 40        /OK, NOW SEARCH FOR
005464 001674          DAC CNTR        /THIS REGISTER IN THE
005465 015634          LAC I IPI23     /TRAFFIC COP TABLE
005466 001675          DAC BDC6
005467 076010  XDXDNS, CMS SHOT
005470 015675          LAC I BDC6
005471 052137          AND P 137
005472 061677          SAD HOLD5
005473 111500           JMP XDXDNF     /FOUND
005474 143675          IDX BDC6
005475 151674          DSZ CNTR
005476 111467           JMP XDXDNS
005477 105610          JMS I IU33U     /NOT FOUND

005500 077004  XDXDNF, SSF LOCK        /WRITE LOCK OUT ON?
005501 105606           JMS I IU11U    /YES
005502 011607          LAC NC40        /NO, SET THE BIT TO
005503 076010          CMS SHOT        /HEXIDECIMAL
005504 055675          AND I BDC6
005505 076410          SMS SHOT
005506 005675          DAC I BDC6
005507 015605  DXDN4,  LAC I IDW3      /PACK IN THE DATA
005510 051616          AND C176K
005511 025602          IOR I ILS3D
005512 005605          DAC I IDW3
005513 105611          JMS I IPNLEX    /BACK TO THE PANEL

                 /C NODE SERVICE

005514 012017  XDXCN,  LAC P 17        /TURN ON ALL CONTACT
005515 025576          IOR I IOUT2     /TYPE LIGHTS
```

TABLE NO. 3—Continued

```
PANEL SERVICE FOR DX LINE B, C & D NODES
005516 005576           DAC I IOUT2
005517 015600           LAC I IPPI2      /ENTERING ANYTHING?
005520 052017           AND P 17
005521 170040           SNA
005522 111560            JMP XDXCND      /NO
005523 015601           LAC I IPPI3      /YES, VALIDATE IT
005524 105624           JMS I VALCN5
005525 111556            JMP DXDN2       /ILLEGAL FUNCTION
005526 170000            NOP
005527 005577           DAC I IOUT3      /DISPLAY BCD
005530 015612           LAC I ADTOB      /GET BCD TO BIN ROUTINE'S
005531 001677           DAC HOLD5
005532 015601           LAC I IPPI3      /DX FUNCTION CALL BCD TO BIN
005533 105677           JMS I HOLD5
005534 001677           DAC HOLD5
005535 015603           LAC I IDW1       /NOW PACK IT IN
005536 051622           AND N6K
005537 005603           DAC I IDW1
005540 011677           LAC HOLD5
005541 051621           AND C30KA
005542 170200           R3R
005543 170600           RAL
005544 025603           IOR I IDW1
005545 005603           DAC I IDW1
005546 015604           LAC I IDW2
005547 051620           AND C170K1
005550 005604           DAC I IDW2
005551 011677           LAC HOLD5
005552 051617           AND C7777
005553 025604           IOR I IDW2
005554 005604           DAC I IDW2
005555 105611           JMS I IPNLEX     /FIN, EXIT


005556 011623  DXDN2,   LAC U77U         /FUNCTION CALL ERROR CODE
005557 105615           JMS I IU66U


005560 015603  XDXCND,  LAC I IDW1       /DISPLAY THE FUNCTION CALL
005561 101565           JMS UPDXF5       /UNPACK IT
005562 105631           JMS I BNBCD      /CONVERT TO BCD
005563 005577           DAC I IOUT3      /INTO THE DISPLAY
005564 105611           JMS I IPNLEX     /EXIT


005565 170600  UPDXF5,  RAL              /UNPACK THE FUNCTION
005566 170600           RAL
005567 051621           AND C30KA
005570 001676           DAC BDC25
005571 015604           LAC I IDW2
005572 051617           AND C7777
005573 021676           IOR BDC25
005574 001700           DAC DXCN5
005575 175000           RTN
               SUBJOB

005576 002001  IOUT2,   2001     /PP PANEL CONTACT DISPLAY
005577 002002  IOUT3,   2002     /PP BCD REFERENCE DISPLAY
005600 002004  IPPI2,   2004     /PP 'BUTTON' REGISTER
005601 002005  IPPI3,   2005     /PP BCD REFERENCE NUMBER
005602 002017  ILS3D,   2017     /PP LEAST SIGNIFICANT 3 DIGITS
005603 002026  IDW1,    2026     /PP LINE DATA WORDS
005604 002027  IDW2,    2027
005605 002030  IDW3,    2030
005606 002041  IU11U,   2041
005607 177737  NC40,    -40
005610 002043  IU33U,   2043     /PP C-NODE ERROR RETURN
005611 002046  IPNLEX,  2046     /PP EXIT FOR OXXX LINE HANDLING
```

TABLE NO. 3–Continued

```
005612 002050  ADTOB,   2050    /PP ADDR BCD TO BINARY SUBR
005613 002051  REMH,    2051    /PP ADDR REGISTER HANDLER SUBR
005614 002057  CARBNS,  2057    /PP B-NODE REGISTER SERVICE
005615 002061  IU66U,   2061    /PP SPECIAL DISPLAY SUBR
005616 176000  C176K,   176000
005617 007777  C7777,   7777
005620 170000  C170K1,  170000
005621 030000  C30KA,   30000
005622 171777  N6K,     ´6000
005623 143574  U77U,    143574  /U77U DISPLAY
005624 000715  VALCN5,  VALCND
005625 007775  INTPC,   7775    /INTERRUPT MACHINE PC
005626 001562  MPRTN,   RTNMP   /SYSTEM MACHINE POINTER
005627 005147  ADXIN,   PDXIN1  /HANDLER ENTRANCE
005630 000140  GAINA,   AGAIN   /SWEEP START
005631 000446  BNBCD,   CONBIN  /BINARY TO BCD SUBR
005632 005660  PDXPC,   DXPC    /ADDRESS OF DX PC
005633 001637  AWDTW,   1600+NGRP-1      /ADDRESS OF WATCH DOG WORD
005634 000027  IPI23,   PI23    /TRAFFIC COP ADDRESS
005635 000020  IPI11,   PI11    /INPUT REG. MAX
005636 040000  C4KBCD,  040000
005637 005335  TYPLIN,  ALINEO-1
005640 005641  TYPPAG,  APAGEO
005641 005344  APAGEO,  PAGEO            /DX PRINT PAGE
005642 005354           PAGE1            /FORMAT ROUTINES
005643 005360           PAGE2
005644 005365           PAGE3
005645 005373           PAGE4
005646 005402           PAGE5
005647 005412           PAGE6
005650 005422           PAGE7
       005660         *. &7760+20
                       /UNPROTECTED MEMORY
       000073  TRX=. &1760%20   /USED TO SET THE MEMORY PROTECT
                                /BOUNDRY REGISTER.
       005660  DXPC=.   /PRINTER PC
                                /AC
                                /PCS
       005663  DXDND=. +3       /NODE D - OUTPUT DATA PORT
       005664  DXBND=. +4       /NODE B - DATA SOURCE
       005665  DXCND=. +5       /NODE C - DATA FORM
       005666  DXLDED=. +6      /FEEDBACK SIGNALS
       005667  HWDTW=. +7       /WATCH DOG WORD HISTORY
       005670  CHAR=. +10       /CURRENT OUTPUT CHARACTERS
       005671  PCSAV1=. +11     /PC SAVED REGISTERS FOR NESTED SUBR.
       005672  PCSAV2=. +12
       005673  PCSAV3=. +13
       005674  CNTR=. +14       /SCRATCH COUNTER
       005675  BDC6=. +15
       005676  BDC25=. +16
       005677  HOLD5=. +17
       005700  DXCN5=. +20
       005701  LINTYP=. +21
       005702  MKHOLD=. +22     /REQUEST BIT MASK
       005703  BITRQ=. +23      /RAM ADDRESS OF CURRENT PRINTER
       005704  WITONE=. +24
               EJECT

               /HISTORY MATRIX OF A-NODE
       005705                   ANHT=. +25
       005745                   *ANHT+NGRP
```

TABLE NO. 3—Continued

```
                         /REGISTER TABLES - INPUT & OUTPUT
          005745         DNTB=.
          007611         *DNTB+REMOTE+INPREM

                         /RAM IMAGES

                         /OUTPUT IMAGE

          007611         CVA=.
          007651         *CVA+NGRP

                         /INPUT IMAGE

          007651         CWA=.
          007671         *CWA+INPUTS


                         /DX REQUEST TABLE

          007671         RTAB=.
          007731         *RTAB+NGRP
          007730         RLAST=RTAB+NGRP-1

          140000         EXEC=140000      /4K
          000300         BANK0=300
          001000         BANK1=1000
          002000         BANK2=2000
          000000         BANK3=0
          143373         STACK=EXEC BANK0 BANK1 BANK2 BANK3 TRX


          007773                 *7773


                         /LOWER 3/4       300     1400     6000     30000
                         /TOTAL           200     1000     4000     20000

                                          /7774 IS THE INDEX REGISTER


          007775                 *7775


    007775 000000                0        /7775 IS THE INTERRUPT PC
                                          /7776 IS THE INTERRUPT AC
                                          /7777 IS THE INTERRUPT PCS

                         SUBJOB SYMBOL TABLE
                         EJECT
AANHT     000052
ACHEK     001275
ADDCAL    000554
ADDCOP    001565
ADNTB     000017
ADTOB     005612
ADXBND    000064
ADXCND    000065
ADXDND    000063
ADXIN     005627
ADXLOK    000062
AGAIN     000140
ALINEO    005336
ANHT      005705
APAGEO    005641
APTR      000043
ARTAB     000061
ATAB      000023
AVC       000050
AVE       000011
```

TABLE NO. 3 – Continued

| SYMBOL TABLE | |
|---|---|
| AVL | 000032 |
| AVR | 000031 |
| AWC | 000051 |
| AWDTW | 005633 |
| AWE | 000014 |
| AWR | 000012 |
| BACK | 000035 |
| BANK0 | 000300 |
| BANK1 | 001000 |
| BANK2 | 002000 |
| BANK3 | 000000 |
| BCDIN | 001400 |
| BCDOUT | 000056 |
| BCDSAV | 000054 |
| BDC1 | 001560 |
| BDC2 | 001561 |
| BDC25 | 005676 |
| BDC6 | 005675 |
| BDNODE | 000633 |
| BD1 | 000454 |
| BINBCD | 001500 |
| BINOUT | 001440 |
| BINSAV | 000055 |
| BITRQ | 005703 |
| BIT4 | 000072 |
| BNBCD | 005631 |
| BNODE | 000630 |
| BNODT | 001310 |
| BOB8 | 000073 |
| CARBNS | 005614 |
| CCS | 000201 |
| CHAR | 005670 |
| CLEAN | 005345 |
| CLR | 000606 |
| CNODE | 000641 |
| CNODE4 | 000650 |
| CNTR | 005674 |
| CONBIN | 000446 |
| CONOUT | 005216 |
| CON7 | 000077 |
| COUNTR | 000564 |
| CPS50 | 000702* |
| CVA | 007611 |
| CWA | 007651 |
| CZERO | 000736 |
| C10K | 000103 |
| C10421 | 000076 |
| C14K | 000104 |
| C170K | 000107 |
| C170K1 | 005620 |
| C176K | 005616 |
| C30K | 000101 |
| C30KA | 005621 |
| C4KBCD | 005636 |
| C40K | 000106 |
| C7400 | 000105 |
| C7777 | 005617 |
| DELTAC | 000036 |
| DIGIT | 001150 |
| DIGITE | 001157 |
| DIGIT0 | 001175 |
| DIGIT1 | 001176 |
| DIGIT2 | 001202 |
| DIGIT3 | 001203 |
| DIGIT4 | 001207 |
| DIGIT5 | 001214 |
| DIGIT6 | 001233 |
| DIGIT7 | 001210 |
| DIGS | 001556 |

TABLE NO. 3—Continued

SYMBOL TABLE

| | |
|---|---|
| DIGT3A | 001205 |
| DIR | 000074 |
| DNODE | 000632 |
| DNODT | 001301 |
| DNODT1 | 001304 |
| DNTB | 005745 |
| DNTBO | 000007 |
| DOEG | 000017 |
| DOSG | 000000 |
| DP1 | 001541 |
| DP1A | 001544 |
| DP2 | 001542 |
| DP2A | 001545 |
| DP3 | 001543 |
| DP3A | 001546 |
| DT1 | 000376 |
| DT2 | 000405 |
| DXAGN | 001114 |
| DXANS | 001124 |
| DXANSC | 001160 |
| DXBIT | 001146 |
| DXBIT2 | 001137 |
| DXBND | 005664 |
| DXCN | 001563 |
| DXCND | 005665 |
| DXCN5 | 005700 |
| DXDND | 005663 |
| DXDN2 | 005556 |
| DXDN4 | 005507 |
| DXDT56 | 001165 |
| DXEXIT | 005232 |
| DXLDED | 005666 |
| DXLINE | 001002 |
| DXLOOK | 005120 |
| DXL1 | 005144 |
| DXL8 | 005136 |
| DXMOVE | 001106 |
| DXPANL | 005434 |
| DXPC | 005660 |
| DXPRNT | 001030 |
| DXSTUF | 000136 |
| D4K | 000100 |
| ENBR | 000041 |
| EOG | 000111 |
| EOG10 | 000122 |
| EOG8 | 000163 |
| EVA | 005040 |
| EWA | 005100 |
| EXEC | 140000 |
| FFEED | 005213 |
| FLTAB | 001314 |
| FULTAB | 001315 |
| F256 | 000154 |
| GAINA | 005630 |
| GETLDA | 005257 |
| GETLDB | 005264 |
| GETLD4 | 005250 |
| HOLD | 001552 |
| HOLDCR | 001570 |
| HOLDMK | 000066 |
| HOLDOP | 001567 |
| HOLDTC | 001566 |
| HOLD5 | 005677 |
| HWDTW | 005667 |
| IDW1 | 005603 |
| IDW2 | 005604 |
| IDW3 | 005605 |
| IFREG | 000033 |
| IGIT6 | 001266 |

TABLE NO. 3 – Continued

SYMBOL TABLE

| | |
|---|---|
| ILS3D | 005602 |
| INDEX | 000046 |
| INGC | 001553 |
| INPREM | 000040 |
| INPUTS | 000020 |
| INTEXT | 000674 |
| INTPC | 005625 |
| IOCS | 000225 |
| IOINIT | 000214 |
| IOSWEP | 000221 |
| IOUT2 | 005576 |
| IOUT3 | 005577 |
| IO10 | 000231 |
| IO12 | 000244 |
| IO12C | 000254 |
| IO12L | 000260 |
| IO13 | 000263 |
| IO14 | 000270 |
| IO400 | 000273 |
| IO406 | 000303 |
| IO430 | 000323 |
| IO440 | 000330 |
| IO450 | 000336 |
| IO460 | 000343 |
| IO550 | 000436 |
| IO600 | 000351 |
| IO610 | 000420 |
| IO620 | 000425 |
| IPC | 000044 |
| IPCR | 000037 |
| IPCS | 000045 |
| IPDR | 000040 |
| IPI11 | 005635 |
| IPI23 | 005634 |
| IPNLEX | 005611 |
| IPPI2 | 005600 |
| IPPI3 | 005601 |
| IU11U | 005606 |
| IU33U | 005610 |
| IU66U | 005615 |
| LINEO | 005300 |
| LINEOA | 005315 |
| LINE1 | 005302 |
| LINE1A | 005313 |
| LINE2 | 005304 |
| LINE2A | 005311 |
| LINE3 | 005306 |
| LINE4 | 005321 |
| LINE5 | 005327 |
| LINFD | 005240 |
| LINFED | 005236 |
| LINFIN | 005316 |
| LINTYP | 005701 |
| LOCK | 000004 |
| LPTR | 000042 |
| LSTCOP | 000060 |
| MKHIST | 001330 |
| MKHOLD | 005702 |
| MK7777 | 000102 |
| MOVCOM | 001322 |
| MOVEXT | 001323 |
| MPRTN | 005626 |
| NB7M | 000070 |
| NC40 | 005607 |
| NGRP | 000040 |
| NRLY | 000477 |
| NRLY20 | 000570 |
| N6K | 005622 |
| PAGEO | 005344 |

TABLE NO. 3—Continued

| SYMBOL TABLE | |
|---|---|
| PAGE1 | 005354 |
| PAGE2 | 005360 |
| PAGE3 | 005365 |
| PAGE4 | 005373 |
| PAGE5 | 005402 |
| PAGE6 | 005412 |
| PAGE7 | 005422 |
| PANEL | 000712 |
| PCSAV1 | 005671 |
| PCSAV2 | 005672 |
| PCSAV3 | 005673 |
| PDXABT | 001053 |
| PDXIN1 | 005147 |
| PDXOFF | 001060 |
| PDXPC | 005632 |
| PDX10 | 001067 |
| PIB | 000010 |
| PI1 | 000010* |
| PI11 | 000020 |
| PI13 | 000021* |
| PI14 | 000022* |
| PI15 | 000023* |
| PI16 | 000024* |
| PI17 | 000025* |
| PI2 | 000011* |
| PI21 | 000017* |
| PI22 | 000026* |
| PI23 | 000027 |
| PI24 | 000030* |
| PI4 | 000012* |
| PI5 | 000013* |
| PI6 | 000014* |
| PI8 | 000015* |
| PI9 | 000016* |
| PMR1 | 005244 |
| PMR2 | 005164 |
| PPWE | 001551 |
| PRESET | 001550 |
| PRESTA | 000053 |
| PRGC | 000020 |
| PRGS | 000020 |
| PRINT | 005215 |
| PROMA | 000110 |
| RAMC | 000100 |
| RAMLAT | 000157 |
| RATS | 000173 |
| REGTAB | 000075 |
| REMH | 005613 |
| REMOTE | 001604 |
| RLAST | 007730 |
| RQBIT | 001564 |
| RQBITA | 000067 |
| RTAB | 007671 |
| RTCC | 000200 |
| RTCS | 000200 |
| RTNMP | 001562 |
| SB | 000034 |
| SCLK | 001571 |
| SDAT | 002040 |
| SECS | 001573 |
| SETOUT | 000603 |
| SHOT | 000010 |
| SINX | 001554 |
| SPACE | 005211 |
| STACK | 143373 |
| STAR | 000047 |
| SWPF | 001540 |
| SZIJ | 001547 |
| TCLK | 001572 |

TABLE NO. 3 – Continued

SYMBOL TABLE

| | |
|---|---|
| TENS | 001574 |
| TENTHO | 000071 |
| TIMER | 000614 |
| TIM3 | 000610 |
| TIM4 | 000611 |
| TIX | 001575 |
| TOFF10 | 000607 |
| TOX | 001576 |
| TRACOP | 000027 |
| TRACPU | 002000 |
| TRX | 000073 |
| TSEC | 000625 |
| TYPLIN | 005637 |
| TYPPAG | 005640 |
| TO | 001555 |
| UPDXFC | 000755 |
| UPDXF5 | 005565 |
| UPUP | 000655 |
| U77U | 005623 |
| VAL | 001557 |
| VALCND | 000715 |
| VALCN5 | 005624 |
| VALEXT | 000751 |
| VALEX2 | 000752 |
| VAL1X | 000766 |
| VARDAT | 005174 |
| WATSW4 | 005220 |
| WATSW5 | 005225 |
| WDLA | 000777 |
| WDTIME | 000057 |
| WITONE | 005704 |
| WLOCK | 000100 |
| XDXCN | 005514 |
| XDXCND | 005560 |
| XDXDN | 005437 |
| XDXDNF | 005500 |
| XDXDNS | 005467 |

TABLE NO. 4

PROGRAMMABLE CONTROLLER

INSTRUCTION SET

GLOSSARY OF TERMS AND SYMBOLS

| | |
|---|---|
| => | IS LOADED INTO |
| AC | ACCUMULATOR |
| EA | EFFECTIVE ADDRESS, THIS IS THE ADDRESS ACTUALLY USED IN THE EXECUTION OF AN INSTRUCTION. |
| (EA) | CONTENTS OF THE EFFECTIVE ADDRESS. |
| INDIRECT | THE ADDRESS PORTION OF THE INSTRUCTION WORD WHICH SPECIFIES THE ADDRESS OF THE MEMORY CELL WHICH CONTAINS THE EFFECTIVE ADDRESS. |
| IMMEDIATE | THE ADDRESS PORTION OF THE INSTRUCTION IS THE OPERAND. |
| MP | MACHINE POINTER REGISTER, CONTAINS THE ADDRESS OF THE PC |
| PC | PROGRAM COUNTER |

TABLE 4—Continued

| | |
|---|---|
| PCS | PROGRAM COUNTER SAVE REGISTER |
| REVERSE | THE RESULT OF THE INSTRUCTION IS STORED IN THE MEMORY CELL SPECIFIED BY THE EFFECTIVE ADDRESS. |
| X | INDEX REGISTER |
| Y | CONTENTS OF BITS 6 - 15 IN THE INSTRUCTION WORD. |

FORMAT:

```
0 1 2 3 4 5.6 7 8 9 10 11 12 13 14 15
           .
 OP CODE   .      ADDRESS
```

| MNEMONIC | OP CODES | | | | DEFINITION (NORMAL) |
|---|---|---|---|---|---|
| | NORMAL | INDIRECT I | IMMEDIATE P | REVERSE M | |
| ADD | 030 | 034 | 032 | 036 | ADD (EA) TO AC |
| AND | 050 | 054 | 052 | 056 | AND (EA) TO AC |
| ANX | 126 | --- | --- | --- | INDEXED AND<br>EA = (Y) + (X) |
| BIG | 112 | 116 | --- | --- | (EA) => T, (EA+1) => T,<br>(EA+2) => T, (PCS) => T |
| DAC | 000 | 004 | --- | --- | DEPOSIT AC INTO (EA) |
| DAX | 162 | 166 | --- | --- | INDEXED DAC<br>EA = Y + (X) NORMAL<br>EA = (Y) + (X) INDIRECT |
| DDX | 152 | 156 | --- | --- | DECREMENT (EA) BY 1 |
| DPS | 002 | 006 | --- | --- | DEPOSIT PCS INTO (EA) |
| DSZ | 150 | 154 | --- | --- | DECREMENT (EA) BY 1 THEN<br>SKIP IF (EA) EQUAL TO 0 |
| DZI | 066 | --- | --- | --- | DZM INDIRECT |
| DZM | 016 | --- | --- | --- | DEPOSIT ZERO INTO (EA) |
| IDX | 142 | 146 | --- | --- | INCREMENT (EA) BY 1 |
| IOR | 020 | 024 | 022 | 026 | INCLUSIVE OR (EA) TO AC |
| IRI | 102 | --- | --- | --- | IRT INDIRECT |
| IRT | 122 | --- | --- | --- | INTERBORO RAPID TRANSIT<br>CLEAR INTERRUPT & LMP |
| ISZ | 140 | 144 | --- | --- | INCREMENT (EA) BY 1 THEN<br>SKIP IF (EA) EQUAL TO 0 |
| JMP | 110 | 114 | --- | --- | JUMP; EA=>PC |
| JMS | 100 | 104 | --- | --- | JUMP TO A SUBROUTINE<br>PC+1=>PCS; EA=>PC |
| LAC | 010 | 014 | 012 | --- | LOAD AC WITH (EA) |
| LAX | 160 | 164 | --- | --- | INDEXED LAC<br>EA = Y + (X) NORMAL<br>EA = (Y) + (X) INDIRECT |

TABLE 4–Continued

'ORMAT:

```
0 1 2 3 4 5.6 7 8 9 10 11 12 13 14 15
 OP CODE   .   ADDRESS
```

| NEMONIC | OP CODES NORMAL | INDIRECT I | IMMEDIATE P | REVERSE M | DEFINITIONS (NORMAL) |
|---|---|---|---|---|---|
| MP | 120 | 124 | --- | --- | LOAD THE MACHINE POINTER EA=>MP |
| RX | 106 | --- | --- | --- | INDEXED OR EA = (Y) + (X) |
| ML | 132 | 136 | --- | --- | ROTATE (EA) 1 LEFT |
| SO | 130 | 134 | --- | --- | ROTATE (EA) 1 LEFT THEN SKIP IF (EA) ODD; (EA)15=1 |
| AD | 060 | 064 | 062 | --- | SKIP IF AC DIFFERENT FROM (EA) |
| AS | 070 | 074 | 072 | --- | SKIP IF AC SAME AS (EA) |
| UB | 040 | 044 | 042 | 046 | SUBTRACT (EA) FROM AC |

PERATE GROUP I

)RMAT:

```
0 1 2 3 4.5 6 7 8 9 10 11 12 13 14 15
1 1 1 1 0.    OPERATORS
```

| NEMONIC | OP CODE | DEFINITION |
|---|---|---|
| )P | 170000 | NO OPERATION |
| IA | 172000 | ONE'S COMPLEMENT THE AC |
| IC | 171000 | INCREMENT THE AC BY 1 |
| IL | 170600 | ROTATE AC LEFT 1 |
| 'R | 170400 | ROTATE AC RIGHT 4 |
| IR | 170200 | ROTATE AC RIGHT 3 |
| :A | 170100 | SKIP IF AC EQUAL TO 0 |
| IA | 170040 | SKIP IF AC NOT EQUAL TO 0 |
| IA | 170020 | SKIP IF AC MINUS; AC0=1 |
| 'A | 170010 | SKIP IF AC POSITIVE; AC0=0 |
| )A | 170004 | SKIP IF AC ODD; AC15=1 |
| 'A | 170002 | SKIP IF AC EVEN; AC15=0 |
| .S | 170001 | REVERSE SKIP SENSING OF THE OPERATORS. IF OPERATORS ARE COMBINED INTO A SINGLE INSTRUCTION, THE INCLUSIVE OR OF THE CONDITIONS DETERMINES THE SKIP WHEN BIT 15 IS A 0; AND THE "AND" OF THE INVERSE OF THE CONDITIONS DETERMINES THE SKIP WHEN BIT 15 IS A 1. |

TABLE 4—Continued

OPERATE GROUP II

FORMAT:

```
0 1 2 3 4.5 6 7 8 9 10 11 12 13 14 15
1 1 1 1 1. .    OPERATORS
```

| MNEMONIC | OP CODE | DEFINITION |
|---|---|---|
| RMP | 176000 | READ THE MACHINE POINTER; MP=>AC |
| RTN | 175000 | RETURN FROM A SUBROUTINE; PCS=>PC |

OPERATE GROUP III

FORMAT:

```
0 1 2 3 4 5 6 7.8 9 10 11 12 13 14 15
0 1 1 1 1 1 X X.       OPERATORS
```

| MNEMONIC | OP CODE | DEFINITION |
|---|---|---|
| CMS | 0760 | CLEAR THE MACHINE STATUS BIT(S) THAT ARE ON IN THE OPERATOR FIELD. |
| SMS | 0764 | SET THE MACHINE STATUS BIT(S) THAT ARE ON IN T OPERATOR FIELD. |
| SST | 0774 | SKIP IF ANY MACHINE STATUS BIT(S) ARE ON AFTER MASKING WITH THE OPERATOR FIELD. |
| SSF | 0770 | SKIP IF ALL MACHINE STATUS BIT(S) ARE OFF AFTER MASKING WITH THE OPERATOR FIELD. |

CMS & SMS OPERATORS

| | | |
|---|---|---|
| RTCC | 200 | REAL TIME CLOCK INHIBIT |
| RAMC | 100 | ENABLE LOGIC SOLVER RAM |
| PRGC | 020 | ENABLE PROGRAMMING PANEL ROM |
| SHOT | 010 | ACCESS CORE WITH NEXT INSTRUCTION CMS TO FETCH, SMS TO DEPOSIT |

SST & SSF OPERATORS

| | | |
|---|---|---|
| RTCS | 200 | REAL TIME CLOCK INTERRUPT |
| MLOCK | 100 | MEMORY PROTECT VIOLATION |
| OVRFLW | 040 | ARITHEMTIC OVERFLOW |
| PRGS | 020 | PROGRAMMING PANEL ROM ENABLED |
| LOCK | 004 | MEMORY PROTECT |

TABLE 4 – Continued

UNASSIGNED OP CODES

| OP CODE | EFFECT |
|---|---|
| 165XXX | RTN |
| 167XXX | RMP |
| 177XXX | RMP |

INSTRUCTION TIMING

| | NORMAL | INDIRECT I | IMMEDIATE P | REVERSE M |
|---|---|---|---|---|
| ADD | 2M+P+A | 3M+P+A | P+A+D+M | 2M+P+A |
| AND | 2M+P+A | 3M+P+A | P+A+D+M | 2M+P+A |
| ANX | 4M+P+A | | | |
| BIG | 4M+P+S | 5M+P+S | | |
| DAC | 2M+P+A | 3M+P+A | | |
| DAX | 3M+P+A | 4M+P+A | | |
| DDX | 2M+P | 3M+P | | |
| DPS | 2M+P+S | 3M+P+S | | |
| DSZ | 2M+P | 3M+P | | |
| DZI | 3M+P | | | |
| DZM | 2M+P | | | |
| IDX | 2M+P | 3M+P | | |
| IOR | 2M+P+A | 3M+P+A | P+A+D+M | 2M+P+A |
| IRI | 2M+P+D | | | |
| IRT | P+M+D | | | |
| ISZ | 2M+P | 3M+P | | |
| JMP | 2P+M | 2(P+M) | | |
| JMS | 2P+S+M | 2(M+P)+S | | |
| LAC | 2M+P+A | 3M+P+A | P+A+M | |
| LAX | 3M+P+A | 4M+P+A | | |
| LMP | P+D+M | 2M+P+D | | |
| ORX | 4M+P+A | | | |
| RML | 2M+P | 3M+P | | |
| RSO | 2M+P | 3M+P | | |
| SAD | 2M+P+A | 3M+P+A | P+A+D+M | |
| SAS | 2M+P+A | 3M+P+A | P+A+D+M | |
| SUB | 2M+P+A | 3M+P+A | P+A+D+M | 2M+P+A |

OPERATE GROUP I P+A+M

RMP P+A+D+M
RTN 2P+S+M

OPERATE GROUP III P+M+D

WHERE:

P PC CYCLE: 1.4 USEC IF HARD PC; 2.4 USEC IF CORE PC
A AC CYCLE: 1.4 USEC IF HARD AC; 2.4 USEC IF CORE AC
S PCS CYCLE: 1.4 USEC IF HARD PCS; 2.4 USEC IF CORE PCS
D DUMMY CYCLE: 1.4 USEC
M MEMORY CYCLE: 2.4 USEC IF CORE;
1.4 USEC IF HARDWARE REGISTER;
20.0 IF USEC PROGRAMMING PANEL I/O PORT

TABLE 4 – Continued

INSTRUCTION SET

MEMORY REFERENCE

| | NORMAL | INDIRECT I | IMMEDIATE P | REVERSE M |
|---|---|---|---|---|
| ADD | 030 | 034 | 032 | 036 |
| AND | 050 | 054 | 052 | 056 |
| ANX | 126 | --- | --- | --- |
| BIG | 112 | 116 | --- | --- |
| DAC | 000 | 004 | --- | --- |
| DAX | 162 | 166 | --- | --- |
| DDX | 152 | 156 | --- | --- |
| DPS | 002 | 006 | --- | --- |
| DSZ | 150 | 154 | --- | --- |
| DZI | 066 | --- | --- | --- |
| DZM | 016 | --- | --- | --- |
| IDX | 142 | 146 | --- | --- |
| IOR | 020 | 024 | 022 | 026 |
| IRI | 102 | --- | --- | --- |
| IRT | 122 | --- | --- | --- |
| ISZ | 140 | 144 | --- | --- |
| JMP | 110 | 114 | --- | --- |
| JMS | 100 | 104 | --- | --- |
| LAC | 010 | 014 | 012 | --- |
| LAX | 160 | 164 | --- | --- |
| LMP | 120 | 124 | --- | --- |
| ORX | 106 | --- | --- | --- |
| RML | 132 | 136 | --- | --- |
| RSO | 130 | 134 | --- | --- |
| SAD | 060 | 064 | 062 | --- |
| SAS | 070 | 074 | 072 | --- |
| SUB | 040 | 044 | 042 | 046 |

| OPERATE GROUP I | | OPERATE GROUP II | | OPERATE GROUP III | |
|---|---|---|---|---|---|
| NOP | 170000 | RMP | 176000 | CMS | 0760 |
| CMA | 172000 | RTN | 175000 | SMS | 0764 |
| IAC | 171000 | | | SST | 0774 |
| RAL | 170600 | | | SSF | 0770 |
| RFR | 170400 | | | | |
| R3R | 170200 | | | | |
| SZA | 170100 | | | | |
| SNA | 170040 | | | | |
| SMA | 170020 | | | | |
| SPA | 170010 | | | | |
| SOA | 170004 | | | | |
| SEA | 170002 | | | | |
| RSS | 170001 | | | | |

CMS & SMS OPERATORS

| | | |
|---|---|---|
| RTCC | 200 | REAL TIME CLOCK INHIBIT |
| RAMC | 100 | ENABLE LOGIC SOLVER RAM |
| PRGC | 020 | ENABLE PROGRAMMING PANEL ROM |
| SHOT | 010 | ACCESS CORE WITH NEXT INSTRUCTION CMS TO FETCH, SMS TO DEPOSIT |

SST & SSF OPERATORS

| | | |
|---|---|---|
| RTCS | 200 | REAL TIME CLOCK INTERRUPT |
| WLOCK | 100 | MEMORY PROTECT VIOLATION |
| OVRFLW | 040 | ARITHEMTIC OVERFLOW |
| PRGS | 020 | PROGRAMMING PANEL ROM ENABLED |
| LOCK | 004 | MEMORY PROTECT |

As also shown in FIG. 4, bits 6 through 15 of WORD ꟷNE indicate the designated register chosen for the B-ode via reference number thumb wheel switches 84. it number 6 is the most significant digit of this binary umber while bit number 15 is the least significant igit. Bit numbers 4 and 5 of WORD ONE and bit num-ers 4 through 15 of WORD TWO are the binary quivalent of the four digit, base 10, number chosen for e C-node. These 10 binary digits represent the binary quivalent of the number chosen via reference number umb wheel switches 84 for the C-node. The function osen, as discussed earlier, is dependent upon the umbers chosen via these thumb wheel switches.

Lastly, bit numbers 6 through 15 of WORD THREE dicate the designated register chosen via reference umber thumb wheel switches 84 with respect to the -node. This binary equivalent of the decimal number dicates the designated register or registers where the sults of a transfer function are to be placed.

The same number of core memory locations are uti-zed in the present invention as was discussed in U.S. t. No. 3,686,639. However, the number of locations r each node with regard to the non-relay functions of electrical circuit line are different from the bit loca-ons specified in U.S. Pat. No. 3,686,639.

Figure 5:
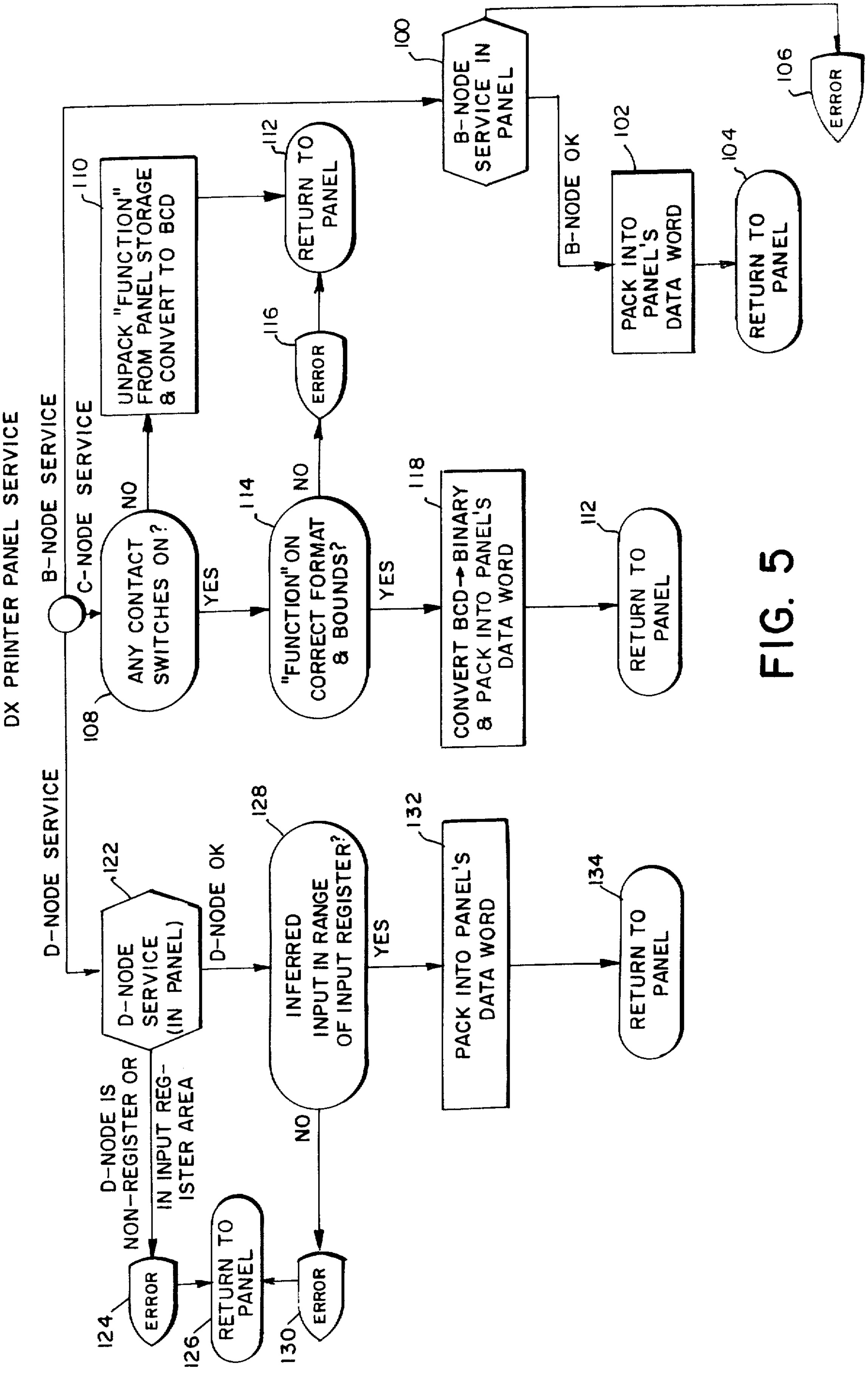
FIG. 5 is a flow chart of a portion of the executive program according to the invention, utilized by the computer controller system of FIG. 1.

As further discussed in U.S. Pat. No. 3,686,639, the ecutive program of the central processor communi-ates with the electronic circuitry of the programming anel in order to store information generated by the ogramming panel in response to various switch posi-ons selected by the operator. In addition to the execu-ve program disclosed in U.S. Pat. No. 3,686,639 with gard to receipt of information from the programming nel, the present invention utilizes an executive com-uter program shown in Table 3 for various non-relay gic functions including validity checking the informa-on placed in the B, C, and D nodes of a data transfer ectrical circuit line. This portion of the computer pro-am is shown on pages A-50 through A-52 of the com-uter program. A flow chart of this portion of the com-uter program is best seen in FIG. 5. A description of e block diagrams used in all the flow charts is shown FIG. 6.

As seen in FIG. 5, once a number is chosen in the B-ode of the data transfer line, a "READ ONLY" mem-y (not shown) in the programming panel determines the number chosen is an acceptable register in the ntral processor, step 100. If the register is accept-le, the information is packed into the first data word the electrical line chosen, step 102 (see FIG. 4). If e number represents an unacceptable register; such a non-existent register or a register where data may t be obtained, an error signal, step 106, is displayed display window 92 (see FIG. 3).

When the C-node push button 88 is depressed and a mber is entered into this node via the reference num-r thumb wheel switches 84, the central processor 34 termines if any contact or electrical element switches e in the "ON" state, step 108. If none of the contact itches are on, the central processor unpacks the nction from the panel storage area and converts the mber selected for the C-node into a binary coded cimal number, step 110. The executive program then turns to the panel for further information, step 112.

If any of the contact switches are in the "ON" state e executive program next determines if the function; at is the number chosen for the C-node, is in the cor-ct format and bounds, step 114. More particularly, the executive program determines if the number chosen is a number which corresponds to a data trans-fer function that is stored within the executive pro-gram. If the number is not an acceptable number, an error signal is generated in the display window 92 of the programming panel (see FIG. 3), step 116. If an error signal is generated, the number chosen for the C-node is not packed into a data word for the chosen electrical circuit line as determined by the position of thumb wheel switches 76. Following the generation of the error signal, the executive program returns to the pro-gramming panel, step 112.

If however, the number chosen for the C-node corre-sponds to an acceptable data transfer function, the ex-ecutive program converts the number into a binary number and packs this binary number into the first and second data words of the selected electrical circuit line, step 118 (see FIG. 4). Following this operation, the ex-ecutive program returns to the programming panel, step 120.

Next, the executive program determines if the num-ber chosen for the D-node corresponds to a non-existent register or also, if the register chosen is in an "INPUT" register area, step 122. If either of these con-ditions exist, an error signal is generated in the display window 92 (see FIG. 3), step 124. Following the gener-ation of an error signal, the executive program returns to the programming panel, step 126. If however, the D-node selected is an acceptable register, with regard to a data transfer deposit register, and if the data transfer function as determined by the number in the C-node is a printer function, (as will be discussed more fully later in this description) the executive program determines if the inferred input register (the register that receives commands from the printer) is in range of an accept-able input register, step 128. If the inferred input is out of range an error signal is again generated on the dis-play window 92, step 130, and the executive program returns to the programming panel, step 126. If the in-ferred input is in range, the executive program packs the D-node number into the third data word for the se-lected electrical circuit line (see FIG. 4), step 132, and returns to the programming panel for further informa-tion, step 134.

If the data transfer function corresponds to a "MOVE" function the computer program determines in step 128 if the last register to receive transferred data is acceptable. If it is not, an error signal is gener-ated, step 130. If the last register is acceptable, the ex-ecutive program packs the D-node number into the third data word for that electrical circuit line, step 132, and returns to the programming panel, step 134.

In the generation of error signals, step 116, 124, and 130 the symbols displayed in the display window 92 de-note the type of error that has occurred. Thus if the C-node function is determined to be a "PRINTER" func-tion; that is the most significant digit of the C-node is a 4, and the sub-type number, that is, the second most significant digit, is an unacceptable number, the error generated in step 116 will denote that the error is due to an incorrect data function with regard to a "PRINTER" data transfer line. Similarly if the most significant digit of the C-node number is a 1 and the second most significant digit did not correspond to one of the sub-type of "MOVE" functions, the error signal would denote that there is an error in a "MOVE" data transfer line.

Once the data transfer line has been completely selected by the operator, through use of the programming panel 32, and no error signals are generated, the three data words corresponding to the electrical circuit line chosen contain all the bit information necessary for the central processor 34 to perform a data transfer function on that particular electrical circuit line when the A-node state is in the proper configuration. Of course, the electrical circuit line chosen by the operator to be a data transfer line may later be re-programmed to be another data transfer line or a standard logic type line as used in present-day computer controller systems.

Following the programming of selected electrical circuit lines to correspond to data transfer functions, the central processor continuously sweeps through the electrical circuit lines and updates these electrical circuit lines in a manner disclosed in U.S. Pat. No. 3,686,639. In the present invention, however, the central processor determines the status of the three "LINE TYPE" bits in the data words of the particular circuit line. If bit 0 of word 1 is a 0, the central processor's logic solver determines that this particular electrical circuit line is a relay function and proceeds to update this electrical circuit line with regard to the referenced relay coil. If however, a binary 1 is in this bit, the logic solver transfers the data in the three data words (see FIG. 4) to the executive computer program of the central processor where the proper determination of the non-relay function is determined (see Table 3, page A-20). As can best be seen in Table 5, if all three bits contain a binary 1, a data transfer function is to be performed by the computer program with respect to that particular electrical circuit line.

The executive program of the central processor then looks at the most significant digit of the C-node in order to determine the particular type of data transfer function selected for that particular electrical circuit line. If the most significant digit of the C-node number is a decimal 1 the executive program knows that a "MOVE" function is to be performed.

"MOVE" FUNCTION DESCRIPTION

Figure 8A:
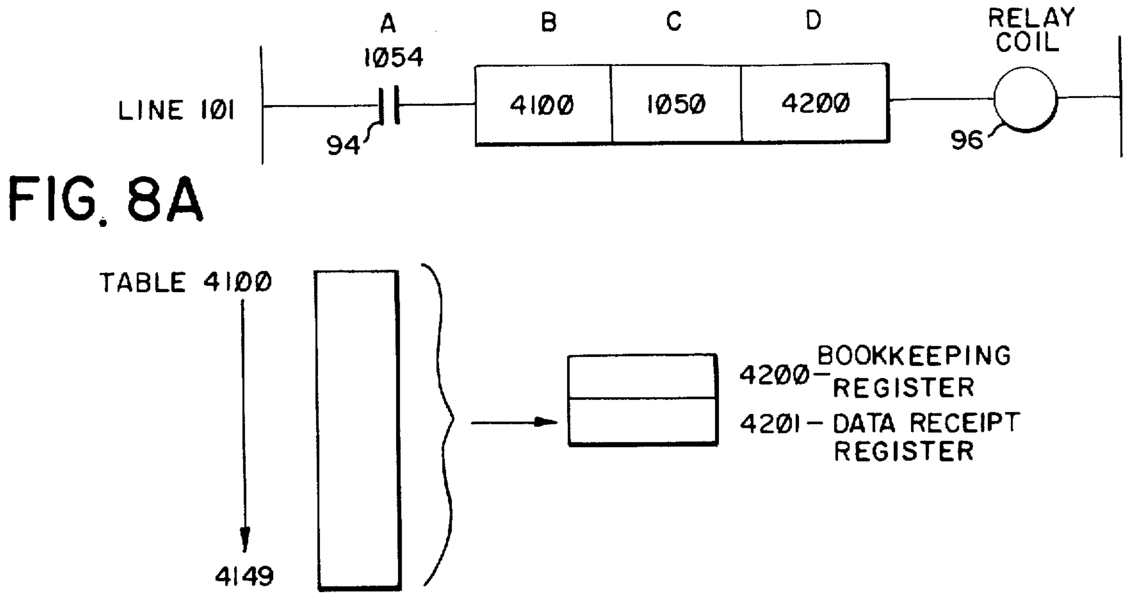

The particular type of "MOVE" data transfer function for each particular sub-type is shown in Table 1. Thus, if a zero sub-type is contained in the second most significant digit of the C-node, the "MOVE" function causes data in one register of a table of registers to be transferred into a single register every time the A-node closes. That is, the data contents of one register of a table of registers is transferred upon the edge detection of the electrical element in the A-node closing for that particular sweep. The registers in the table of registers are sequentially taken from this table per closure of the A-node. The data in the table of registers is not destroyed during this process. As can be seen in FIG. 8A, an example of digit zero sub-type of "MOVE" transfer function causes data in 50 registers, numbers 4100 through 4149, of the executive program to be transferred to one register, number 4201. The particular line in the central processor containing this data transfer function is line number 101. The A-node consists of a normally open switch 94 which is referenced to the relay coil of electric circuit line 1054. The B-node of line 101 contains decimal number 4100, corresponding to the table of registers starting with register number 4100 in the central processor. Thus the first register of data to be transferred via this data transfer line is register number 4100.

TABLE NO. 5

| LINE TYPE | BIT 0, WORK 1 | BIT 4, WORDS | BIT 5, WORD 3 |
|---|---|---|---|
| RELAY | 0 | — | — |
| COUNTER | 1 | 0 | 1 |
| TIMER | 1 | 1 | 0 |
| CALCULATE | 1 | 0 | 0 |
| DATA TRANSFER | 1 | 1 | 1 |

The C-node consists of the number 1050. The most significant digit of this number; mainly 1 determines that the data transfer function is a "MOVE" data transfer function. The second most significant digit; mainly the 0, denotes that the particular sub-type "MOVE" data transfer function consists of a transfer from a table of registers to a single register every time the A-node closes. The least two significant digits; mainly 50, denote the size of the table that is to be transferred by this data transfer line. Thus fifty registers of data are to be transferred before this data transfer line has completed its "MOVE" operation.

The D-node consists of the decimal number 4200. This number refers to the register that will contain a number related to the number of registers transferred to register number 4201. Thus register 4200 is a bookkeeping register that keeps track of the progress of "MOVE" function with regard to this particular data transfer line. When a number equal to decimal 50 is contained in this register, the executive program executing this particular electrical circuit line will know that all the registers within the table of registers have been transferred to register number 4201 and that the "MOVE" operation has been completed. When the "move" has been completed, the relay coil 96 will be activated by the central processor. The relay coil is not energized before the "MOVE" operation is completed.

As best seen in FIG. 8A, the first time normally open switch 94 closes the data in register 4100 will be transferred to register 4201. It should be noted that the register receiving the data is always equal to the register denoted in the D-node plus 1, therefore in this case register number 4201. Prior to normally open switch 94 closing, register 4200 contains a 0 and after the closure register 4200 contains a 1. The relay coil 96 is off before and after the closure of the normally open switch.

The next time switch 94 closes, data in register 4101 is transferred to register 4201. At this particular time register 4200 contains a 1 before this closure of the switch and a 2 after this closure.

This process will continue until the 50th closing of normally open switch 94. At this particular time data in register 4149 is transferred to register 4201. Just prior to this fiftieth closure of the A-node register 4200 contains a binary equivalent of 49 and following this closure of the switch register 4200 contains a binary equivalent to 50. This number indicates to the central processor that all the data within all 50 of the registers of data have been transferred to the register denoted by the D-node plus and therefore the "MOVE" function has been completed with regard to this particular data transfer line. Therefore the relay coil of line 101 is energized indicating to the operator or to other external lines or other external devices that this particular "MOVE" function has been completed.

As best seen in FIGS. 6A, 6B, 6C, and 6D, the flow chart for the generation of a "MOVE" data transfer function consists of a main flow portion as shown in FIG. 6A with eight sub-type functions depending on the second most significant digit in the C-node. The program listing for the "MOVE" subjob is shown in Table 3, pages A-28 through A-40. More particularly, the computer program first validates the number within the C-node to determine if this number is between 1001 and 1799, step 140. If the number within the C-node is not between these two ranges the computer program exits from the "MOVE" subjob, step 142. The TIM 4 shown for step 142 indicates that the computer program returns to the main sweep so as to update the remainder of the electrical circuit lines while commanding that the output relay for this electrical circuit line be set to the OFF position. Whenever a TIM 4 block is shown in any of the flow charts of FIGS. 7A, 7B and 7C, the same type of exit from the "MOVE" subjob is to be performed by the central processor.

Figure 6:
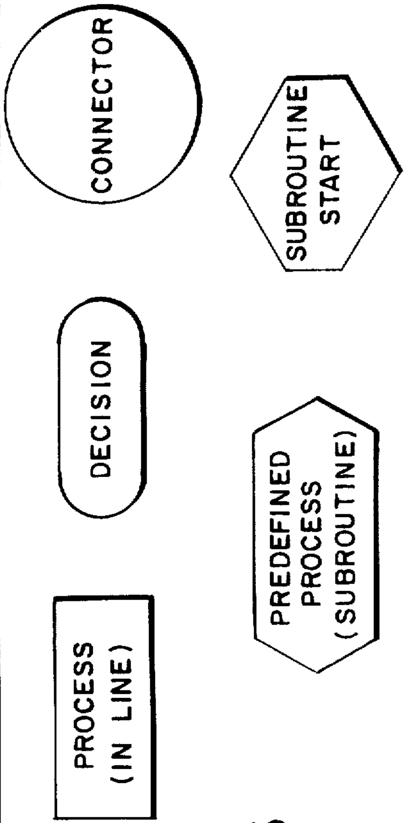
FIG. 6 is a representation of the block diagrams used in FIGS. 5, 7, 12, 13, 14, 15, and 16.

If the numbers in the C-node are acceptable, the computer program proceeds to ascertain the A-node histoy, step 144. As is seen in FIG. 6, the block utilized in step 144 is a subroutine block indicating that the executive program proceeds to that particular subroutine to ascertain the A-node history. In this particular subroutine (not shown) the executive program merely ascertains if the electrical element in the A-node of this particular data transfer line was open or closed during the last time this electrical circuit line was checked by the central processor; i.e., during the last sweep of the computer controller system. After this ascertainment the executive program returns to step 144 of the main flow of the "MOVE" subjob.

The executive program needs to determine the A-node history since some of the sub-types of "MOVE" functions are only activated when the electrical element in the A-node goes from an open state to a closed state; that is, some data transfer "MOVE" sub-types are edge detected on the A-node. Thus if the electrical element in that node is open during the last sweep and is closed during the present sweep, the executive program knows that the A-node has just closed and thus an edge detection has just occurred.

Following the A-node history gathering the executive program proceeds to ascertain the last three digits of the C-node number, step 146. As mentioned earlier the second most significant digit of the C-node represents the sub-type of the particular data transfer function. Thus in this particular case there are eight particular sub-type "MOVE" data transfer functions that the executive program can undertake. The two least significant digits with regard to a data transfer "MOVE" function tell the executive program the number of registers of data that are to be transferred. Since this number has an upper bound of 99, it is therefore apparent that at most 99 registers of data may be transferred via one transfer "MOVE" line.

The executive program proceeds to determine if the B-node refers to an acceptable register, step 148. If it does not, the executive program exits from the "MOVE" subjob, setting the relay coil of the data transfer line to an off state, step 150.

If the B-node is acceptable, the executive program determines if the A-node is closed on this particular sweep through this particular data transfer line, step 152. If the A-node is closed, the executive program exits to one of the 8 DIGIT sub-types as is indicated generally by step 154. These particular sub-types perform various transfer "MOVE" operations and each utilizes a separate sub-type subroutine.

Figure 7A:
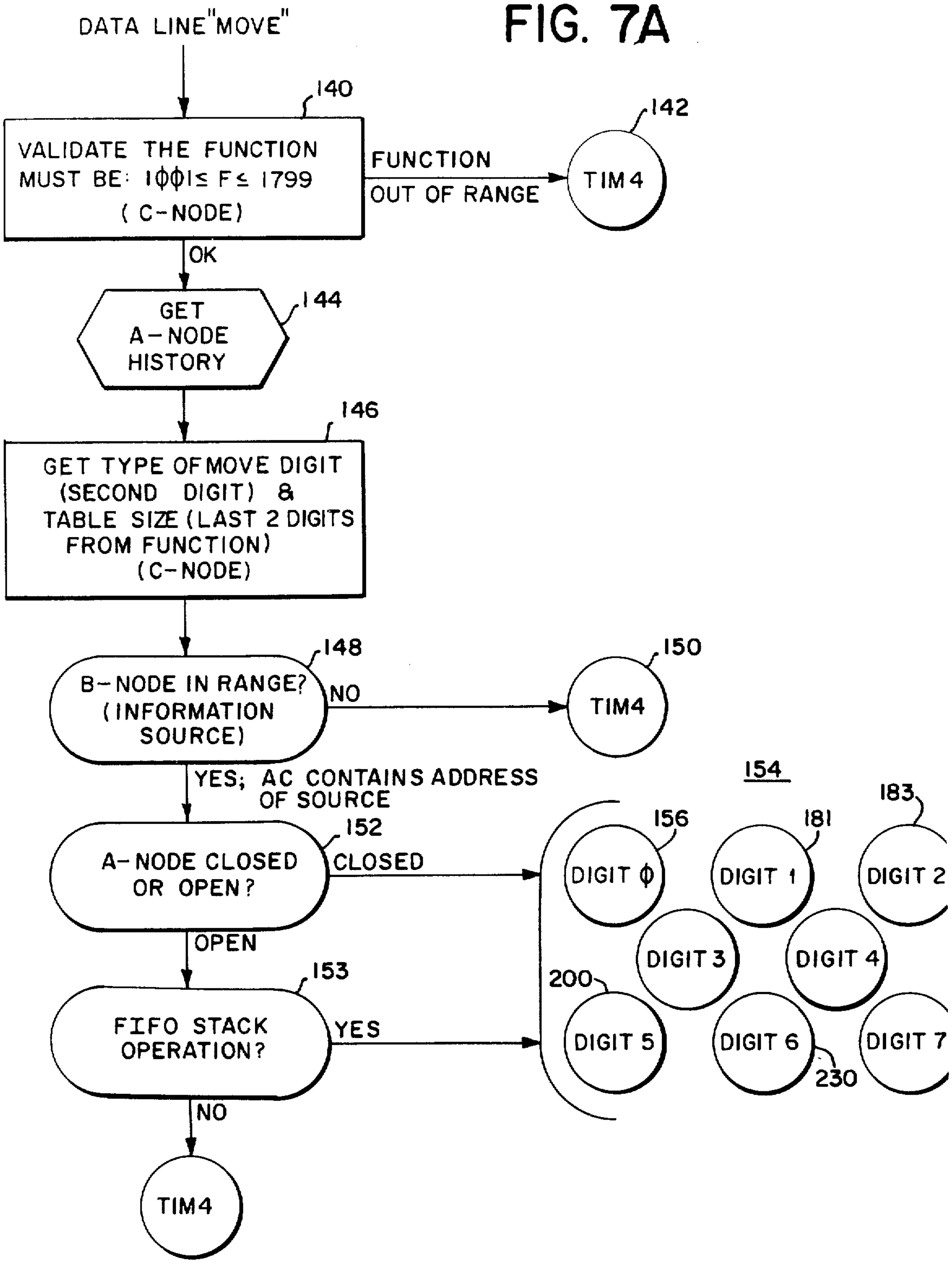
Figure 7B:
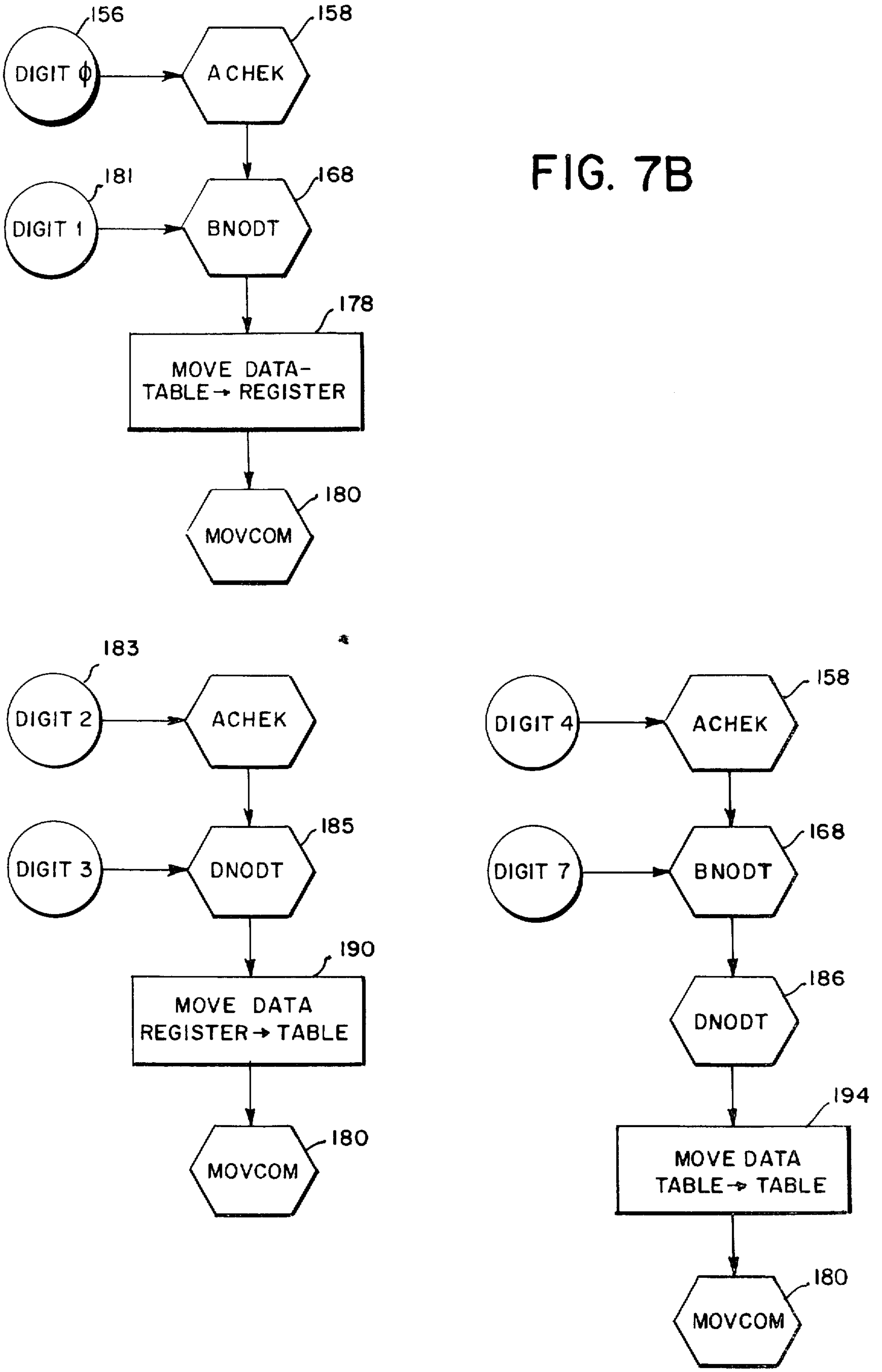

Thus if the second most significant digit in the C-node is an 0, the executive program jumps to the DIGIT 0 connection, step 156 where it proceeds to execute the flow diagram shown in FIG. 7B. Thus the executive program executes the ACHEK subroutine, step 158. As seen best in FIG. 7D the ACHEK subroutine first determines if the A-node closed on this particular sweep, step 160. If the A-node did close on this sweep, the executive program returns to the sub-type subroutine for DIGIT 0, step 162.

It is therefore apparent that the executive program must know the state of the A-node for the sweep just prior to the present sweep in order to determine if the A-node closed on this particular sweep. Therefore the history gathered in step 144 is essential for this decisional step 160. If the A-node did not close on this particular sweep, it indicates that the A-node was closed prior to this sweep since the decisional step 152 has already determined the A-node is closed on this particular sweep. Since the "MOVE" subroutine subjob for the DIGIT 0 sub-type is only activated on the edge detection of the A-node closing, if the A-node did not close on this particular sweep the ACHEK subroutine determines in decisional step 164 that a move is not in progress and therefore exits from the data transfer line, setting the lines relay coil to the OFF position, via step 166.

If the A-node has just closed, the sub-type subroutine proceeds to validity check the B-node, step 168. As can be seen in FIG. 7D, the BNODT subroutine retrieves the absolute address of the register where data is to be retrieved, step 170 and determines if this register is an acceptable register, step 172.

As is best seen in Table 1 and FIG. 8A, the DIGIT 0 sub-type of MOVE transfer function moves data from one register in a table of registers into a single register every time the A-node closes. These registers are taken in sequence from the table of registers. It is therefore apparent that as data is retrieved from this table, the register transferring data may not be an acceptable register even though the first register was an acceptable register. Thus as seen in FIG. 8A, although register 4100 is an acceptable register it is possible, depending upon the particular central processor utilized, that register 4145 may not be an acceptable register to retrieve data from. In such a case decisional step 172 and FIG. 7D determine that this condition exists and exits from this particular data transfer "MOVE" line, setting the relay coil to the OFF position, step 174. If the absolute address of the register is acceptable, the executive program exits from the BNODT subroutine via step 176, and continues in the DIGIT 0 sub-type subroutine. The executive program then proceeds to transfer data from the latest B-node table register to the register identified in the D-node, step 178.

Following the transfer of the data to the d-node register, the executive program proceeds to the MOVCOM subroutine, step 180 so as to move to the next register in the table of registers, step 182. The executive program does this so that the next time this data transfer line's A-node is edge detected, the register from which data is to be retrieved is not the same register as was previously moved. Following the incrementing of the register within the table of registers, the executive program determines if the total number of registers moved is equal to the total size of that table as determined by the two least significant digits in the D-node, step 184. If the "MOVE" has been completed, the executive program resets the bookkeeping register (register 4200 in FIG. 8A) to zero, step 192, and proceeds to exit from this data transfer circuit line while energizing relay coil 96, step 193. If the "MOVE" table has not been completely transferred to the data receipt register (register 4201 in FIG. 8A), the MOVCOM subroutine exits from the circuit line via TIM 4, step 150.

If a ONE occurs in the second most significant digit of the C-node, the executive program proceeds to DIGIT 1, step 181, if a decisional step 152 is closed. The data "MOVE" operation for this particular subtype is identical to the sub-type 0 "MOVE" function except that data will be transferred from the table of registers to the D-node register plus 1 every time the executive program sweeps through this particular electrical circuit line if the A-node in this electrical circuit line is closed. Thus this sub-type does not need the A-node history obtained in step 144 for the previous condition of the A-node is immaterial to the transfer of data by this sub-type. Table 1 illustrates the type of data transfer caused by this particular sub-type of "MOVE" function.

Figure 8B:
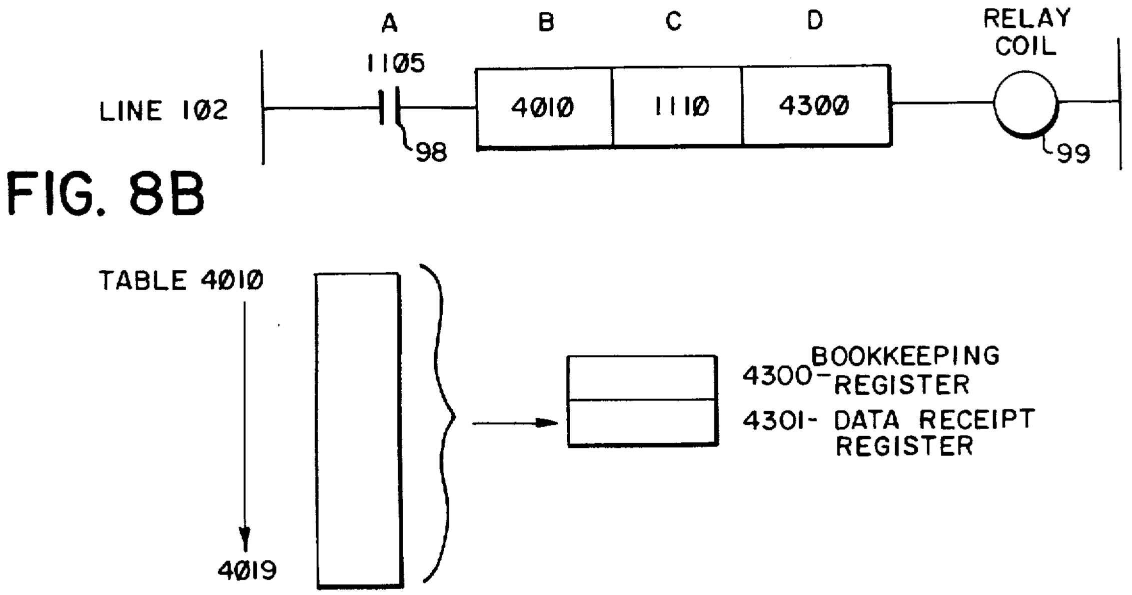

An example of this data transfer sub-type "MOVE" function is shown in FIG. 8B. Thus circuit line 102 contains a "MOVE" function of sub-type 1, as shown in the C-node two most significant digits of 1 and 1. The two least significant digits of the C-node contain the digits 1 and 0 and therefore 10 registers of data are to be transferred before this "MOVE" function is completed. As shown in the A-node a normally open switch 98 is referenced to the relay coil in electrical circuit line 1105. The B-node contains number 4010 indicating that the first register in the table of registers is register 4010. The D-node contains the number 4300 indicating that the register keeping track of the number of registers moved to register 4301 is register 4300.

Thus if normally open switch 98 is in the closed position, and remains closed, data in register 4010 is transferred to register 4301 on the first sweep. On the next sweep through this electrical circuit line the data in register 4011 is transferred to register 4301. This continues until data in register 4019 is transferred to register 4301. At this time the number stored in register 4300 is a binary equivalent to a decimal 10, indicating to the central processor that the "MOVE" for this data transfer line has been completed. At this time relay coil 99 is energized indicating that the "MOVE" has been completed.

Figure 7D:
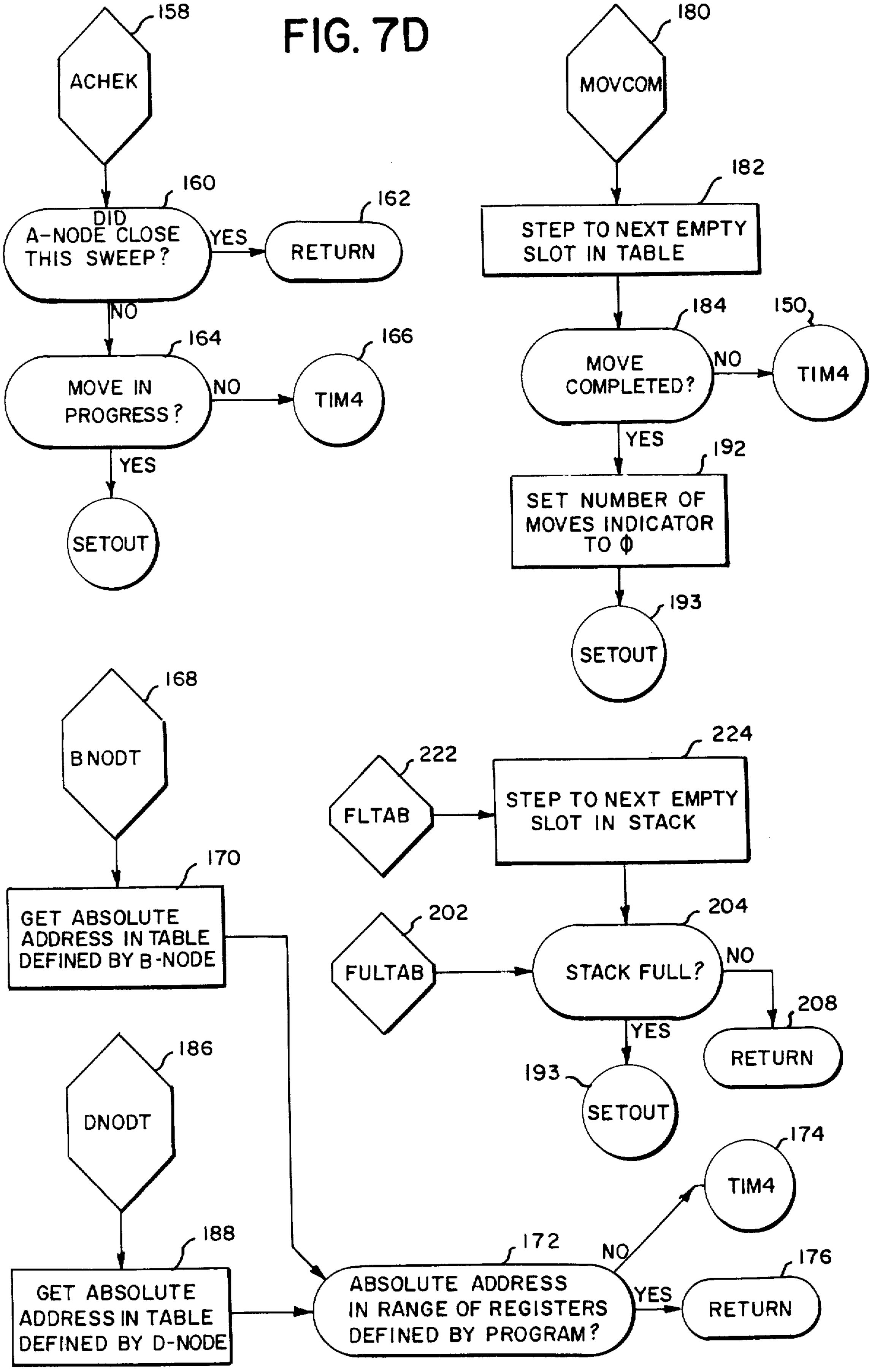
Figure 8C:
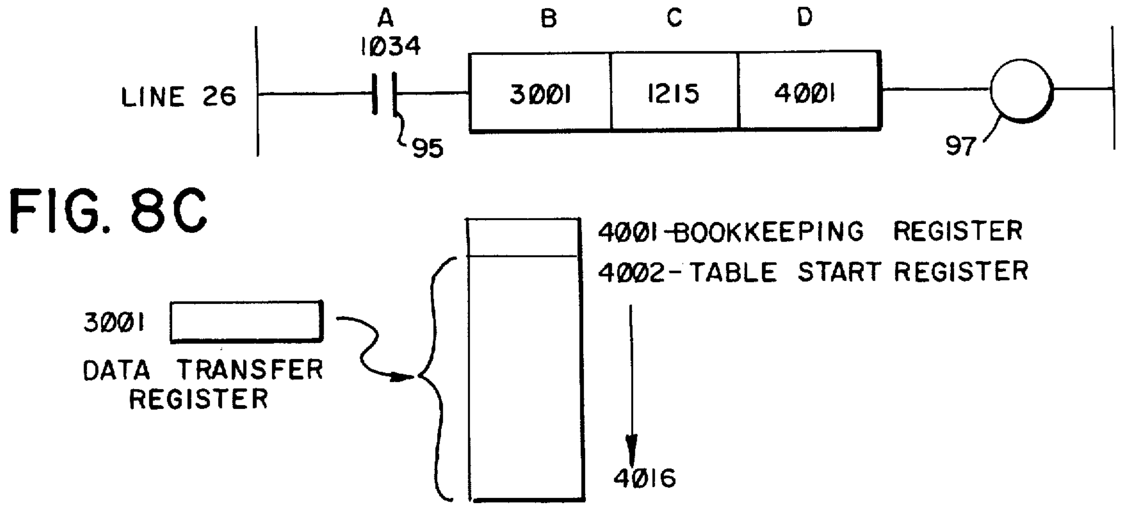

As shown in Table 1 a 2 in the second most significant digit of the C-node indicates a sub-type of "MOVE" where a register containing data is transferred to the table of registers while the A-node is edge detected. In this particular case the decisional step 152 proceeds to DIGIT 2 sub-type, step 183 and completes the flow chart shown in FIG. 7B. This flow chart is identical to the DIGIT 0 flow except that the D-node is validity checked per transfer of data to insure that the register where data is to be transferred is an acceptable register, step 185. FIG. 8C indicates the reason why the D-node table must be checked since it is possible that although register 4002 is an acceptable register, that register 4003 may not be an acceptable register. As shown in FIG. 7D the DNODT subroutine obtains the absolute address in the table defined by the D-node, step 188 and determines if this absolute address is in range of the registers defined by the computer program, step 172. If it is an acceptable register, the program returns to the sub-type 2 subroutine where the data is transferred from the B-node register to the latest D-node table register, step 190 (see FIG. 7B). If the register is not acceptable, the computer program exits from this particular data transfer line via TIM 4, step 174.

Following an acceptable transfer of data the executive program goes to the MOVCOM subroutine, step 180 where the register number and D-node register is incremented by 1 so as to receive the next register of data in the next D-node register. If the "MOVE" operation is completed; that is the data has been transferred to all the registers in the table of registers defined by the two least significant digits of the C-node, and the A-node element is opened, the executive program resets the number in the bookkeeping register defined by the D-node to zero, step 192 and exits from the data transfer line setting the relay coil of that line to the ON state, step 193.

As is best seen in FIG. 8C, line 26 is programmed by a data transfer "MOVE" line of a sub-type 2. Normally open switch 95 is conditioned on the relay coil of electrical circuit line 1034. Node B contains 3001 which indicates that data is to be transferred from register 3001. The C-node indicates that a "MOVE" function is to be performed and that the sub-type "MOVE" is a register to table "MOVE" upon closure of the A-node. The two least significant digits; mainly 15, indicate that 15 registers of the central processor are to receive the data contained in register 3001. Node-D contains 4001 indicating that register number 4001 is the bookkeeping register keeping track of the number of times that data in register number 3001 is transferred to the D-node table. Thus on the first closure of the A-node, data in register 3001 is transferred to register number 4002. Prior to closure of the A-node register number 4001 contained a zero and after closure of the A-node register 4001 contains a 1. A relay coil 97 of line 26 is de-energized before this transfer of data to register 4002 and is also de-energized after this transfer has taken place. Relay coil 97 is energized following transfer of data from register 3001 to register 4016. At this particular time if the A-node element is open the bookkeeping register 4001 is reset to zero.

Figure 8D:
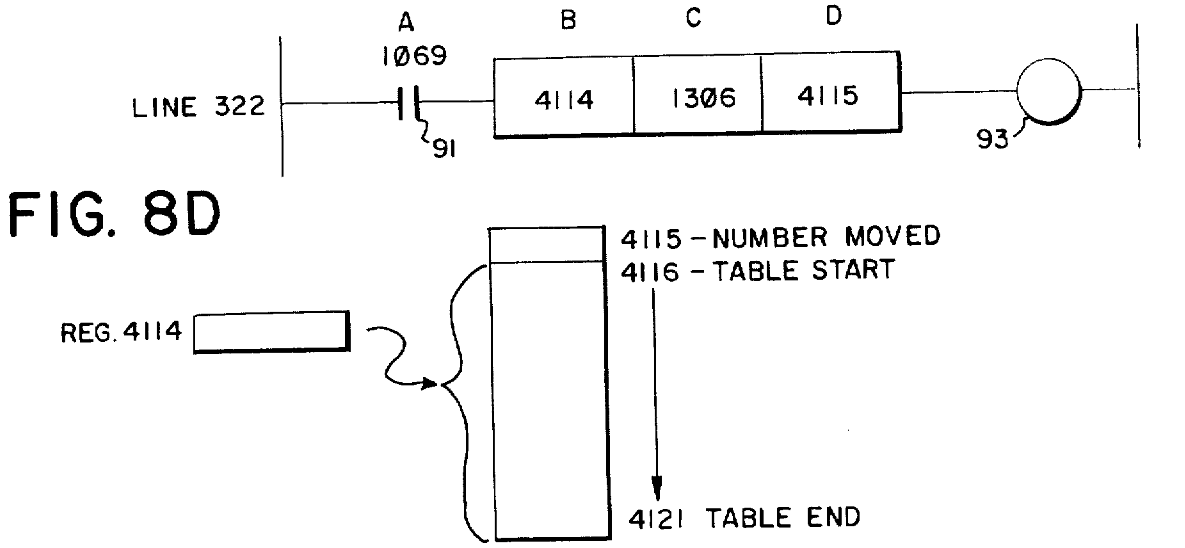

As best seen in FIG. 7B the DIGIT 3 sub-type utilizes the same subroutine as DIGIT 2 except that the ACHEK subroutine is disregarded. The reason for disregarding the ACHEK subroutine is that the 3 type "MOVE" function is activated whenever the A-node is closed regardless of the previous state of the A-node. As seen in Table 1 this particular type of "MOVE" function transfers data from one register to a table of registers whenever the A-node is closed. As best seen in FIG. 8D, data in register number 4114 is sequentially transferred to register numbers 4116 to 4121 if normally open switch 91 is in the closed state. Following completion of the transfer of data from register 4114 to register 4121, the number stored in register 4115 is 0006 and relay coil 93 is energized by the central processor.

As best seen in Table 1 sub-types 4 and 7 cause data in a table of registers to be transferred to a second table. If a 4 sub-type is chosen the transfer of data occurs when the A-node goes from an open to a closed state, whereas if a sub-type 7 is chosen the data is transferred from one table to the second table provided that the A-node is closed. As best seen in FIG. 7B the flow chart or the 4 sub-type first checks the A-node history, step .58 and proceeds to validity check the B-node register, tep 168 and finally the D-node register, step 186. If all hese sub-routines indicate that the A-node has gone rom an open to a closed state and the B-node and D-ıode registers are acceptable, data in a register of the irst table of registers is transferred to a register of the econd table of registers, step 194. Following this the xecutive program goes to subroutine MOVCOM ,here the B-node and D-node registers are incre-ıented and the executive program checks to see if the MOVE" has been completed.

The 7 type subroutine is identical to the 4 sub-type xcept that the ACHEK subroutine is disregarded.

Figure 8E:
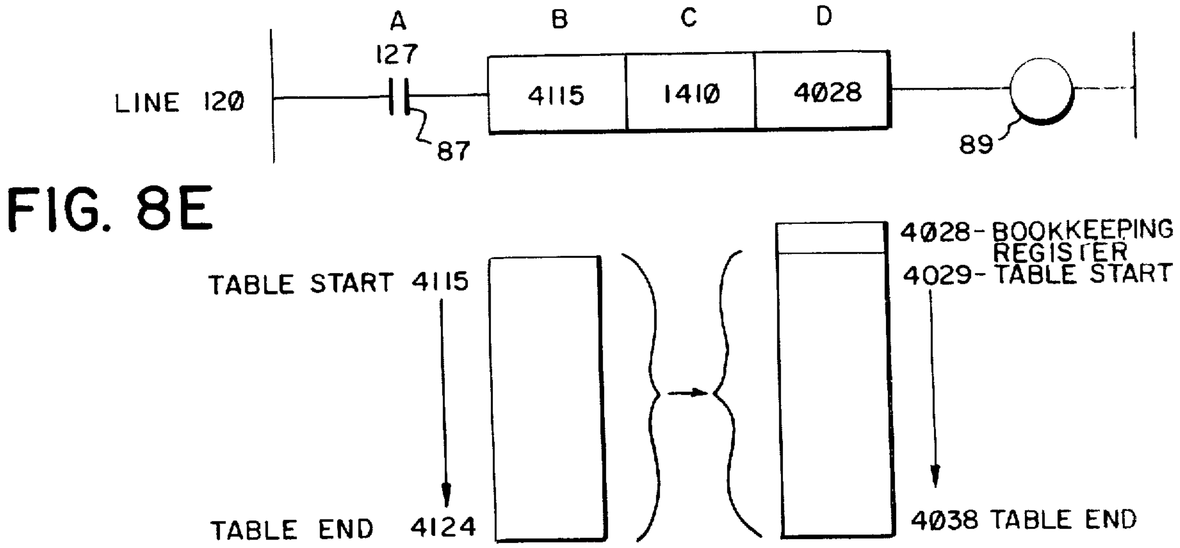

An example of a 4 sub-type is shown in FIG. 8E. :lectrical circuit line 120 is programmed to be a table ɔ table data transfer "MOVE" function as designated y the two most significant digits of the C-node. Nor-ıally open switch 87 is conditioned by the relay coil of lectrical circuit line 127. The B-node contains number 115 which indicates the first register in a table of reg-ıters to have its data transferred to a second table of ɛgisters. The two least significant digits of the C-node ıdicate that the size of the table is ten registers. The umber 4028 in the D-node indicates that the book-eeping register is register number 4028 and that the rst register to receive data is register number 4029. 'hus on each closure of normally open switch 87 the ata in one register starting at register 4115 is trans-ɛrred to a second table of registers starting at register 029. After ten such closures of the A-node all the data ı registers 4115 through 4124 is transferred respec-vely to registers 4029 through 4038. At this particu-ır time the number in register 4028 is 0010 and relay ɔil 89 is energized.

A sub-type 7 "MOVE" data transfer is identical to ıe sub-type 4 data transfer and thus FIG. 8E shows ıch a line if the number in the C-node is changed from umber 1410 to 1710. The operation of this type of ata transfer is initiated whenever normally open vitch 87 is closed regardless of its prior condition.

As best seen in Table 1, sub-types 5 and 6 perform first-in/first-out (FIFO) type of data transfer function. he 5 sub-type performs the in-putting of data, while ıe 6 sub-type performs the out-putting of data.

Figure 8F:
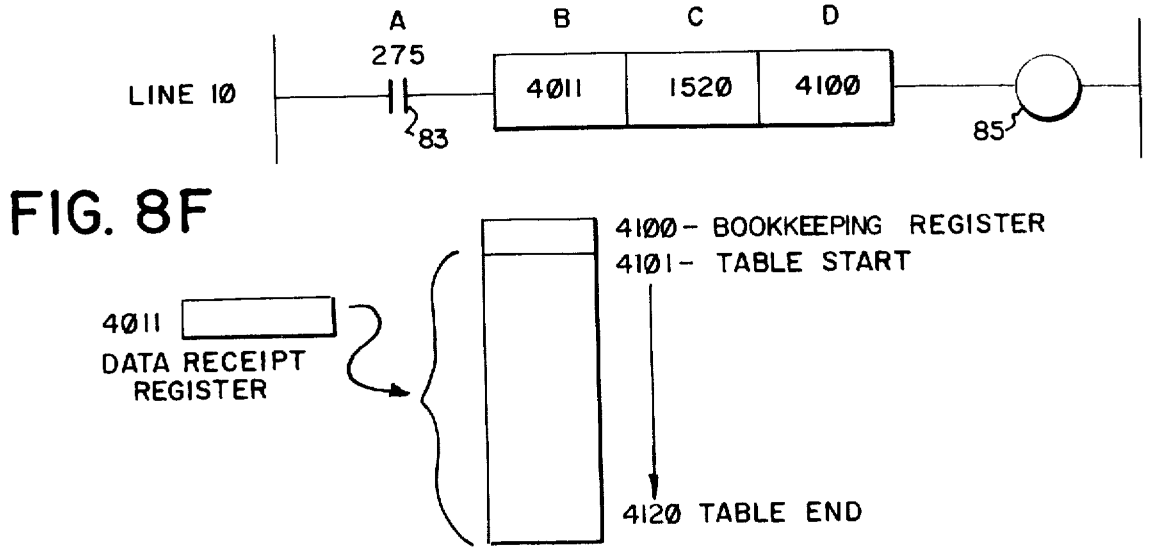

As best seen in FIG. 8F, circuit line 10 is pro-ɾammed to be a first-in side of a FIFO stack operation. lore particularly, normally open switch 83 is inserted ı the A-node and is referenced by the relay coil of ectrical circuit line 275.

The B-node contains number 4011 which corre-ɔonds to data receipt register number 4011. Every me the normally open switch 83 closes the data in reg-ter 4011 is sequentially transferred to a table of regis-rs starting with the highest numbered register; ainly, register number 4120. The C-node has two ast significant digits corresponding to a 20 which ɔecify the table length of registers to receive data from gister 4011. The number 4100 is contained in the D-ɔde and this number corresponds to the bookkeeping gister which records the number of times register )11 has transferred data to the table.

Unlike the other type of data transfer "MOVE" func-ɔns, the present first-in side of a FIFO stack transfers e data in register 4011 to the highest number register the table. Thus the first time normally open switch } closes data in register 4011 is transferred to register 120. This latter register is obtained by adding to the number in the D-node; mainly 4100 the numbers of the two least significant digits of the C-node. Thus 4100 plus 20 is equal to 4120. Before the normally open switch 83 first closed, register 4100 contained number 0 and after the switch closed for the first time register 4100 contained a 1. The second time normally open switch 83 closes, register 4011 deposits its data in regis-ter 4119. This operation continues upon closure of switch 83 until register 4011 deposits its data in register 4101. At this time register 4100 contains a binary equivalent of decimal 20 indicating that the present "MOVE" operation has been completed. Relay coil 85 is then turned "ON" signifying that the "MOVE" oper-ation has been completed.

Figure 8G:
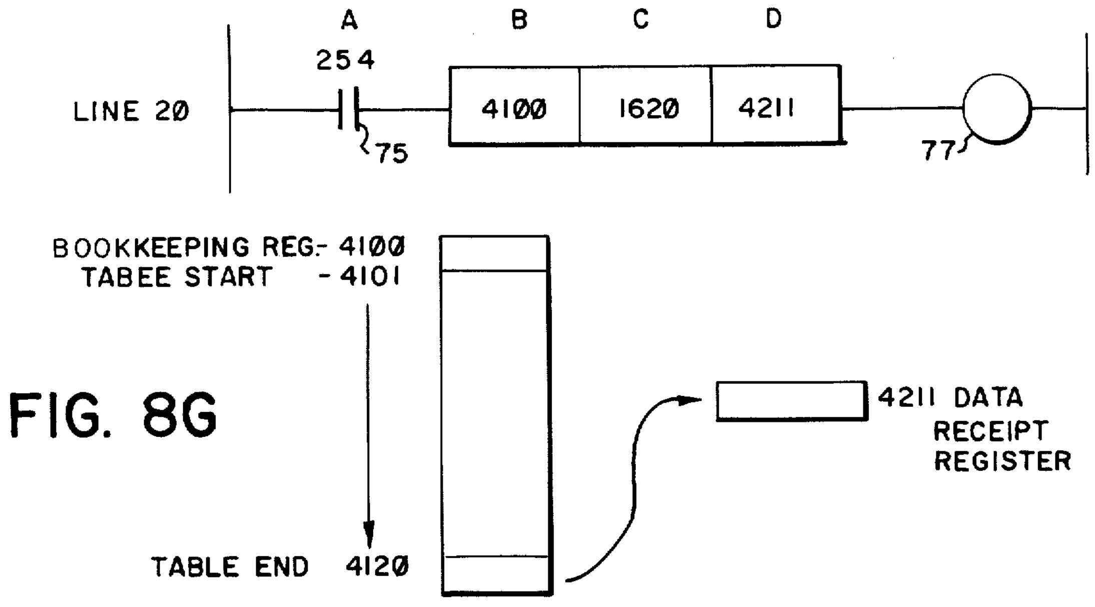

In the first-out side of a FIFO stack, the reverse oper-ation with regard to a first-in side is performed. As best seen in FIG. 8G, circuit line 20 of the central processor is programmed as a first-out side of a FIFO stack. Nor-mally open switch 75 is referenced to the relay coil of electrical circuit line 254. Node-B contains number 4100 corresponding to the bookkeeping register 4100 that keeps track of the number of times the normally open switch 75 is closed. Unlike the other sub-type data transfer "MOVE" functions the sub-type 6 uses a B-node register as a bookkeeping register rather than a D-node register. The register equal to the number stored in the B-node plus 1 is the last register to have data transferred to the register denoted by the D-node register.

The C-node has two least significant digits; mainly 20, which specify the table length of registers that are to be transferred to the data receipt register 4211. Upon the first closure of the A-node, data stored in reg-ister 4120 is transferred to register 4211. Following transfer the data in registers 4119 to 4101 is sequen-tially moved down to the next higher register. That is, data in register 4119 is moved to register 4120 while data in register 4118 is moved into register 4119, etc. The next time normally open switch 75 closes the data in register 4120 is again deposited in register 4211 and following this deposit of data the data in registers 4119 through 4102 are moved to the next higher register. This deposit and incrementation of the data to the next higher data register is continued until normally open switch 75 closes for the 20th time. At this particular time, after the data is transferred from register 4120 to register 4211, the executive program realizes that the "MOVE" operation has been completed for line 20 and therefore energizes relay coil 77.

As best seen in FIG. 7A the main flow of the data line "MOVE" transfer function goes to DIGITS 5 or 6 of the sub-type if decisional step 152 indicates that the A-node is closed for this particular sweep. If a digit 5 op-eration is to be performed the main program foes to the sub-type program of DIGIT 5, step 200. The DIGIT 5 subroutine starts with subroutine FULTAB, step 202. As best seen in FIG. 7D, the FULTAB subroutine de-cides whether the particular stack is full, step 204. If the stack is full, indicating that all the information has been transferred to the table of registers of the D-node, the executive program proceeds to exit from this par-ticular data transfer line and energizes the relay coil of this line, step 193. If the stack is not full, indicating that more data is to be transferred to the table of registers, the subroutine returns to the subroutine of the DIGIT 5 sub-type, step 208.

The DIGIT 5 subroutine then determines if the A-node closed this particular sweep, step 210, since all FIFO stack operations are edge detected. If the A-node has not closed this sweep, indicating the A-node closed the previous sweep, the executive program exits from this data transfer "MOVE" to the remaining electrical circuit lines while setting the relay coil of this electrical circuit line to the de-energized state, step 212.

If the A-node did close this particular sweep the executive program proceeds to ascertain the absolute address in the stack as defined by the D-node, step 214. If this absolute address is within the range of registers defined by the program, the 5 sub-type subroutine continues, step 216. If the register is out of range the executive program escapes from this data transfer line via step 218.

If the register of the D-node is acceptable, the data is then transferred from the register defined by the B-node to a register defined by the number of the D-node plus the table size minus the number stored in the bookkeeping register, step 220. The executive program then proceeds to subroutine FLTAB, step 222. As best seen in FIG. 7D, this subroutine merely steps the data transfer register 4011 (see FIG. 8F) to the next lower data receipt register. That is, the subroutine points to the next empty slot in the table stack, step 224. If the stack is full at this particular time, the subroutine exits from the data transfer function line while energizing the relay coil of this line, step 206. If the stack is not full, the subroutine returns to the sub-type 5 subroutine and exits from this subroutine via TIM 4, step 226.

Figure 7C:
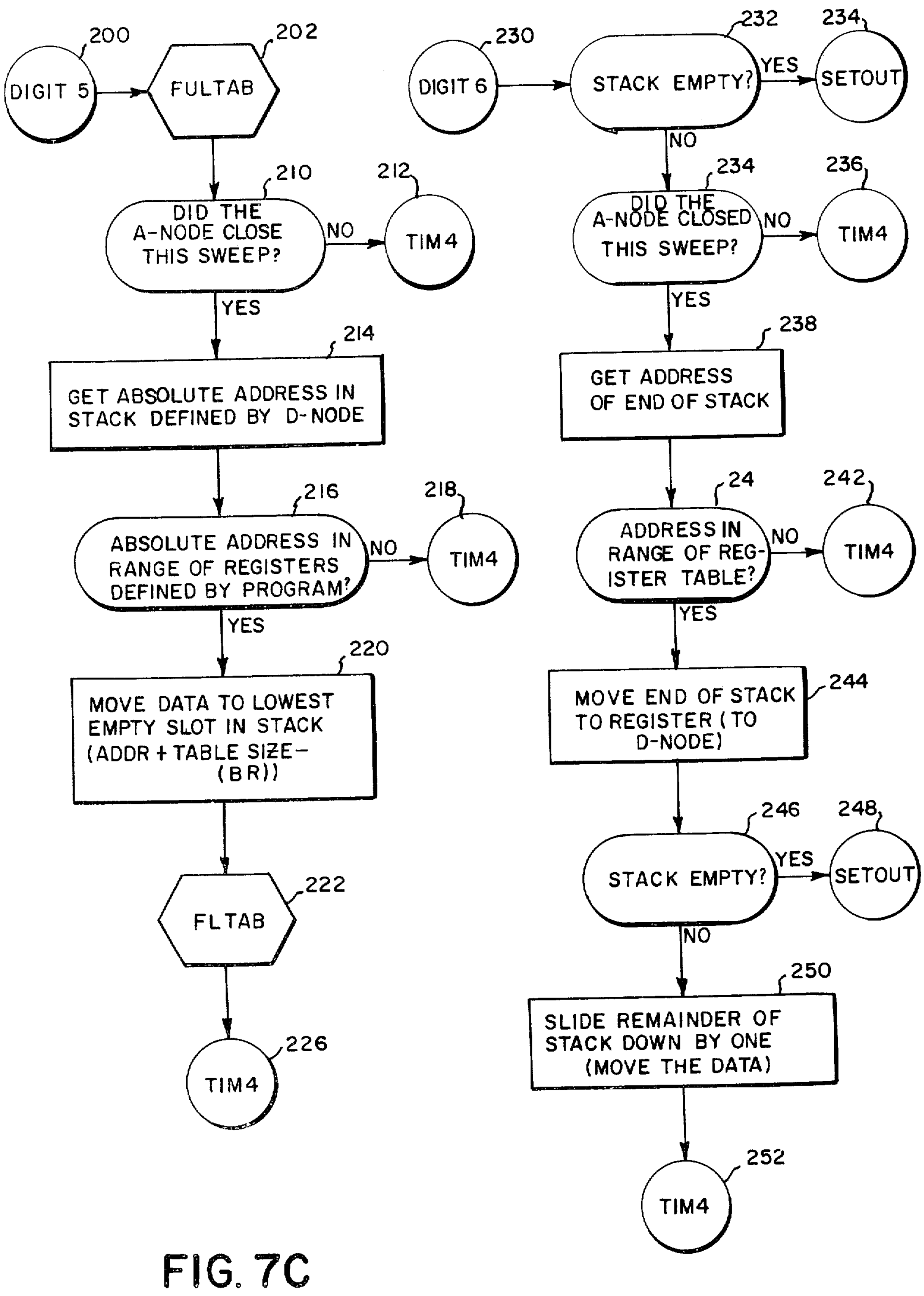

As best seen in FIG. 7C, the flow chart for the sub-type 6 "MOVE" transfer function is basically the reverse operation of the sub-type 5 transfer function. The first operation of the sub-type 6 subroutine, step 230 is to determine if the B-node stack is empty, step 232. If the stack is empty, indicating that all the information within the table of registers has been transferred to the data receipt register, the executive program exits this particular data transfer line while energizing the relay coil of this line, step 234. If the stack is not empty, indicating that more data is to be transferred to the data receipt register, the subroutine determines if the A-node closed on this particular sweep, step 234. If the A-node was closed on the previous sweep, the executive program exits from this subroutine via TIM 4, step 236.

If, however, the A-node closed this particular sweep, the executive program ascertains the address of the last register in the table of registers in the B-node, step 238. The executive program then determines if this register is within range. If this register is not within range, the executive program exits from this subroutine via TIM 4, step 242. If however, the register is within range, the executive program moves the data within the last register of the table to the data receipt register (register number 4211 of FIG. 8G), step 244. The executive program then determines if the stack is empty and if it is empty the executive program exits from the circuit line while energizing the relay coil of this particular data transfer line, step 248.

If the stack is not empty, indicating that more data is to be transferred from the B-node back to the data receipt register, the executive program slides the remainder of data in the registers above the highest number B-node register down to the next register, step 250, and then exits from this data transfer line via TIM 4, step 252.

Referring to the main flow as shown in FIG. 7A for a data transfer "MOVE" function, the decisional block 152 will continue to a FIFO stack operation, step 153, if the A-node is open on this particular sweep. If a sub-type 5 or sub-type 6 function is within this particular data transfer line, the executive program will be transferred to the sub-type 5 or sub-type 6 subroutines as shown in FIG. 7C. The reason for transferring to these sub-types even though the A-node is open on this particular sweep is that for the sub-type 5 and 6 subroutines the FULTAB subroutine will energize the relay coil of the particular data transfer line if the stack is full or empty respectively, regardless of the A-node state. Thus in a 5 sub-type, the executive program merely looks at the D-node bookkeeping register and sees if the number within this register is equal to the two least significant digits of the C-node. If the number is equal to the C-node, the executive program will interpret this as indicating that all the registers in the table of registers have had data transferred to them regardless of whether they actually had this transferred. Thus if a number is transferred to register 4100 as shown in FIG. 8F, and this number equals the C-node number, the FULTAB subroutine will exit from this particular electrical circuit line and energize the relay coil of this line regardless of the condition of the A-node.

Similarly for the 6 sub-type, if the number in the bookkeeping register is equal to zero, the executive program will exit from the data transfer line and set the relay coil of that particular line to the energized state, step 234. Thus if a zero is transferred to register 4100 as shown in FIG. 8G, the executive program will energize the relay coil of that particular transfer line regardless of the state of the A-node electrical element.

Thus the first-in/first-out stack operations, denoted by sub-types 5 and 6, allow an operator to store and retrieve data in a table of registers within the central processor in a first-in/first-out basis.

If the "MOVE" transfer function is not a FIFO stack operation decisional block 153 will cause the computer program to exit from the data transfer line to continue solving the remainder of the electrical circuit line of the computer controller system.

From the above description it is apparent that the data transfer "MOVE" function adds a new dimension to computer controller systems, allowing registers within these systems to have data transferred to and from registers in various unique and novel ways. The deposit registers where data is placed may be used as transfer registers for other data transfer lines or possibly as registers to drive external devices via the central processor and the input/output housing 38 as well as the input/output modules 40, 42, 44 and 46.

PRINTER FUNCTION DESCRIPTION

The present invention also includes a printer data transfer function designated by a 4 in the most significant digit of the C-node. As best seen in FIG. 9 electrical circuit line 201 is programmed to be a printer data transfer line. As seen in FIG. 9, the A-node contains the normally open switch 71 which is referenced to a relay coil of the electrical circuit line 1105. When normally open switch 71 is in the closed position the print function specified by the number stored in the C-node is requested. The "PRINTER" function is executed once for each closure of the normally open switch, however repeated closures of the switch before the requested print function has occurred will not be acted upon. The B-node contains a number corresponding to a register where numeric data may be obtained. If there is more than one number to be printed from data within the central processor, additional numbers will be obtained from the sequential register locations following the register denoted in the B-node.

The C-node specifies the print control function. Thus a 4 in the most significant digit specifies a printer operation. The second most significant digit of the C-node specifies the particular type of printer function to be performed by the computer controller system (see Table 2). Thus a zero in the second most significant digit calls for the printing of numeric information from the central processor without any additional information being printed from data stored within the programmable printer with which this electrical circuit line intercommunicates. With regard to a 0 sub-type, the two least significant digits in the C-node specify the format of the printed data. Table 6 illustrates the various formats obtainable by these two least significant digits. More particularly, the second least significant digit determines the page format while the least significant digit of the C-node specifies the line format. As seen in TAble 6, if the two least significant digits are a 1 and a 1, the data from the central processor will be printed on one line with four data insertions (as shown by the four X's) and after this data is printed the programmable printer will move the print paper up one position.

The programmable printer utilized in the preferred embodiment of the "PRINTER" data transfer function is disclosed in U.S. patent application Ser. No. 443,329, entitled "Programmable Printer."

If a 1 is contained in the second most significant digit of the C-node the data transfer line will command the programmable printer to print a pre-stored message within the printer as addressed by the two least significant digits of the C-node. Thus as discussed in U.S. patent application Ser. No. 443,329, the programmable printer may print 100 possible pre-stored messages in response to the 100 possible numbers generated by the two least significant digits of the C-node.

If a 2 is in the second most significant digit of the C-node, the "PRINTER" function will call for a pre-stored message within the programmable printer as defined by a number stored within the B-node register. Thus one particular data transfer line may be used to request one of a number of pre-stored messages depending upon the particular numbers stored in the register specified by the B-node of the data transfer line. The number stored in the D-node of the data transfer line refers to an output register that is wired to the programmable printer.

As shown in FIG. 9, the relay coil 73 of a "PRINTER" data transfer line will be energized when the normally open switch 71 is closed, and the coil will remain ON until the print request is satisfied.

For the sub-type 1 or 2 "PRINTER" function calling for the printing of a pre-stored message, the programmable printer is able to request variable data from the central processor to be transferred to the printer via the D-node register. This data is obtained from the register denoted by the B-node and the registers sequentially following this register if more than one register of data is requested.

As shown in FIG. 10, the "PRINTER" data transfer lines receive information from the printer concerning the request for variable data as well as for termination of the printing operation from three input electrical circuit lines lines 396, 397, and 398. As described in U.S. patent application Ser. No. 443,329 if the FORM BUSY line is energized and the BUSY line is energized the programmable printer is in the process of printing a pre-stored message and is not requesting the insertion of variable data. If the FORM BUSY line is high and the BUSY Line is low the programmable printer is commanding the data transfer line to transfer variable data to the programmable printer. When the programmable printer has received sufficient data the BUSY line will again be in the high state. When the programmable printer is completed with printing, both the FORM BUSY and BUSY lines will go to the low state indicating to the central processor that the request for a print function has been completed. Throughout the printing, the programmable printer may send an ABORT signal to the computer controller system which will cause the executive program to automatically terminate the printing operation of the programmable printer.

As best seen in FIG. 11, the computer controller system communicates with the programmable printer with regards to the transferral of data and commands to the printer via a register equal to the number stored in the D-node of the printer data transfer line. An inferred register, equal to the D-Node register minus 1000 is used by the controller to receive the FORM BUSY, BUSY, and ABORT signals from the programmable printer.

TYPICAL PRINTER DATA TRANSFER LINE OPERATION

If the C-node of a data transfer line contains 4011, the following would be printed by the programmable printer when the A-node of this particular data transfer line is energized:

XXXX (LINE FEED)

where LINE FEED refers to the printer advancing its paper one line. The four X's shown correspond to four numbers stored in the data register referred to in the B-node of this data transfer line. This information is transferred to the programmable printer in the following manner:

1. transfer four bits of data in the register denoted by the B-node to bits 4 through 7 of the register denoted by the D-node (see FIG. 11),
2. disable the two data select lines of the programmable printer via bits 0 and 1 of the D-node register,
3. enable the load buffer command, bit 11, by bringing this bit to the low state,
4. repeating the above procedure three more times for the other three numbers to be printed,
5. give a print command on bit 15 by bringing this bit to the low state.

To print a pre-stored message the data transfer line must first tell the programmable printer what pre-stored message is desired. This is performed by putting on bits 0 through 7 of the D-node register the two binary coded decimal numbers corresponding to the desired pre-stored message. At this point the START FORM command, bit 12 is brought to the low state so as to enable this particular command. The programmable printer then knows what particular pre-stored message to initiate printing. The programmable printer prints this pre-stored message until variable data is needed from the computer controller system. At this time the BUSY output line from the programmable printer will become disabled while the FORM BUSY line will remain enabled. The data transfer line will then cause variable data to be transferred in a similar manner to when only variable data is to be transferred to the printer as described above. When the programmable printer has received sufficient data from the computer controller system the BUSY output line will go to the high state. When the programmable printer has completed its printing operation — which may call for many insertions of variable data — the FORM BUSY and BUSY output lines will go to the low state telling the data transfer line that the print operation has been completed. At this time another print request will be performed by the central processor if another print request exists during the next sweep.

It will be noted that only one printer may be driven by the central processor at any given time but that any number of print requests may be made at any time for any number of printers. Thus the present invention allows controlled machinery or processes to be monitored when conditions arise that warrant the monitoring of their information. Thus emergency signals may be generated by the printer or inventory information may be displayed by the printer in response to commands given to the programmable printer by the computer controller system. A thorough description of the particular mechanisms involved by the programmable printer in printing pre-stored and purely variable data is given in the U.S. patent application Ser. No. 443,329.

Since the programmable printer takes 500 milliseconds to print one line of print-out, and since a typical print request may contain many lines of print-out, it is quite obvious that if the central processor remained on a particular data transfer printer line when a print request was made, the remaining control by the computer controller system would be severely hampered by the long time delay. Because of this potential long time delay in printing messages, the computer controller system of the present invention utilizes a computer program that time-shares with a background computer program which in turn performs the printer drive function. Thus the foreground program performs the updating of all the electrical circuit lines in the computer controller system while the background computer program performs the printer drive function when the foreground computer program transfers control to the background computer program. In the preferred embodiment, the foreground computer program transfers control to the background computer program once during one entire sweep through all the electrical circuit lines and allows the background computer program to operate until an input/output request is generated. Since it has been emperically found that this amount of time is always less than 4 milliseconds, no restraits have been put on the background computer program with regard to the amount of time it may use before control is switched back to the foreground computer program. Thus the central processor continually performs a printer request function during each sweep through the electrical circuit lines until that printer data transfer line has had its request completed.

PRINTER FUNCTION SOLVING

As best seen in FIGS. 12A and 12B, the executive program for solving printer data transfer lines incorporates a non-relay logic solver for determining if a particular electrical circuit line (see FIG. 9) is programmed as a "PRINTER" function and also is requesting that this function be acted upon. The computer program with regard to this non-relay logic subroutine is listed in Table 3 on pages A-26 through A-27. The non-relay logic subroutine shown in FIGS. 12A and 12B is in the main sweep or foreground computer routine of the executive program, and therefore every sweep of the executive program through the electrical circuit lines will perform this subroutine for every non-relay electrical circuit line.

A typical printer data transfer line is shown in FIG. 9. The C-node code is 4121 while the A-node contains a normally open switch 71 referenced to a relay coil of electrical circuit line 1105. When the machine pointer of the executive program points to electrical circuit line 201 the executive program will determine if a 4 exists in the most significant digit of the C-node, step 241. If a 4 does not exist in the C-node the program will return to the logic solver while indicating that a non-relay return has occurred, step 243 and step 245. If a 4 exists in the most significant digit, the executive program knows that a printer data transfer line exists with respect to electrical circuit line 201 (see FIG. 9). The executive program then determines and makes the A-node history with respect to normally open switch 71, step 247. The executive program here performs the A-node history with regard to normally open switch 71 as was described earlier in the "MOVE" data transfer function.

After making the A-node history the executive program determines if this particular data transfer line's request bit is in the ON state, step 249. If normally open switch 71 had just closed, request for a print function has not occurred and the executive program then determines if the A-node had just changed state to the ON condition, step 251. If the A-node is in the OFF position, the executive program again returns to the non-relay return, step 243 and finally to the logic solver, step 245. If however the A-node of the line 201 is in the ON state, and if it has just been put in that particular state, the executive program sets the request bit in the request table to the ON state; indicating that this particular data transfer line is making a request for a print opertion, step 253.

As mentioned earlier any number of lines may make any number of print requests to any number of printers by only one line's request may be acted upon by the central processor at any particular time. Thus step 253 stores a bit regarding a particular data transfer line's request for a print operation. When the central processor has completed the print requests of electrical circuit lines with numbers lower than the present electrical circuit line; mainly lower than line 201, the executive program proceeds to initiate a print operation with regard to this particular electrical circuit line.

Nevertheless, once the request bit is in the request table for a particular electrical circuit line the executive program energizes the relay coil of the electrical circuit line, thus energizing relay coil 73 (see FIG. 9), step 254. This relay coil will be energized until the print request has been satisfied. Once the relay coil has been energized the executive program returns to the logic solver, step 256.

The next time the executive program comes to line 201 in its sweep through all the electrical circuit lines, decisional block 249 will indicate that this particular line's request bit is in the ON state. The executive program will then proceed to search the interface table for this line's particular number, step 258 (see FIG. 12B). The interface table contains information with respect to every "PRINTER" data transfer line that has requested a print operation. If information relating to ·lectrical circuit line 201 is not found in the interface able the executive program searches the interface able for the PRINTER called for in the D-node of elecrical circuit line 201, step 260. If the particular printer alled for in the D-node is not found in the interface able the executive program will search the interface able for an empty slot where information regarding the articular "PRINTER" line can be stored, step 262.

If an empty slot is found, the executive program will roceed to determine if the B-node refers to an acceptble register, step 264. If the register is unacceptable, e computer program goes to an A connection, step 66 which in turn goes to the CLEAR REQUEST BIT unctional block, step 268. At this point the request by is particular electrical circuit line for a print operaon to be initiated will be removed since the B-node of is particular electrical circuit line is unacceptable for e transfer of data to the printer. The executive proram will proceed to the non-relay return connection, ep 270 where the relay coil of line 201 will be denergized and the executive program will return to the gic solver for solving the remainder of the relay elecical circuit lines, step 272.

If however the B-node is acceptable the information this B-node is stored in a scheduler's set of tables, ep 274. The scheduler, as will be discussed later in is description, is the subroutine that passes control etween the foreground executive program and the ackground PRINTER DRIVER subroutine.

Following the storing of the B-node data in the schedler's set of tables the executive program determines if e inferred input register of the D-node is acceptable, ep 276. The inferred input register is a register inrred by the executive program from the number in e D-node and, as mentioned earlier, is used by the executive program for the receipt of commands from the ogrammable printer. If the register inferred by the -node is not acceptable, the executive program proeds to step 266 and then clears the request bit in the quest table with regards to this particular circuit line. however the inferred input is acceptable the address this particular register is also stored in the scheduls set of tables, step 278.

Next the executive program determines if the C-node acceptable, step 280. The executive program is erely determining if the remaining three numbers in e C-node call out a particular type of printer request at is acceptable to the executive program. Thus if a is found to be in the second most significant digit of e C-node, the function is unacceptable since no inter subtype exists with a 3 code in the second most gnificant digit of the C-node (see Table 2). In this se the executive program again clears the request bit the request table with regard to this particular circuit e's request for a print operation. If however the numr in the C-node is acceptable,—as in the example own in FIG. 9, the 4121 is an acceptable number — e executive program proceeds to store in the scheduls set of tables the information contained in the C-de as well as the line number (201) and the informan in the D-node with regard to the register where inrmation is to be deposited, step 282. The executive ogram then proceeds to energize relay coil 73 (see G. 9), step 284 and then returns to the logic solver, p 286.

Every subsequent sweep through this particular eleccal circuit line the executive program will check to e if the PRINTER DRIVER has completed the print quest made by this particular electrical circuit line. Thus the executive program comes to step 258 and finds that the interface table contains this particular line number and then determines if the printer has completed the request made by electrical circuit line 201, step 288. If the printer has completed the request, the executive program proceeds to clear the line number from the scheduler's list, step 290 and then clears the request bit in the request table, step 268. The executive program then turns the relay coil 73 of line 201 to the OFF position and proceeds to return to the logic solver, step 272.

If however the printer has not completed the print request, the executive program continues to decisional block 292 to ascertain if the coil RAM bit is ON. This bit is stored in a random access memory and is "ON" when the relay coil is energized. If the RAM bit is not ON, indicating an error function, the executive program proceeds to clear the D-node register address from the scheduler's list, step 294, then clears the line number from the scheduler's list, step 90, and then finally clears the request bit from the request table, step 268. Following this clearing of the request bit, the executive program will turn off the relay coil of this line, step 270 and return to the logic solver, step 272.

If however the coil RAM is ON, indicating that no error has occurred, the executive program will maintain coil 73 in the energized state, step 296 and will return to the logic solver, step 286. This sequence will continue until the PRINTER DRIVER has completed the print request made by electrical circuit line 201.

Once a particular electrical circuit line's request for a print operation to be performed by the programmable printer is accepted by the non-relay logic subroutine of the executive program, it is up to the printer scheduler to transfer control from the executive program to the PRINTER DRIVER subroutine, where the print request is performed. The flow diagram for the printer scheduler subroutine is shown in FIG. 13 and the program listing for the scheduler is given on page A-41 of Table 3.

The printer scheduler transfers control of the central processor from the executive program or foreground program to the PRINTER DRIVER or background program. The scheduler does this during free times in the main sweep of the executive program through the electrical circuit lines. Thus the PRINTER DRIVER subroutine is time-shared to the executive program and since the amount of time that this subroutine takes before returning to the executive program is always less than 4 milliseconds, the total sweep time of the executive program in the controlling of electrical circuit lines of the computer controller system is not appreciably affected.

More particularly, the printer scheduler first determines if the printer "ABORT" switch is activated, step 300, by ascertaining if relay coil 398 (see FIG. 10) is energized. If the ABORT switch is energized the printer scheduler clears all the information in the PRINTER DRIVER and turns the PRINTER DRIVER OFF.

If the ABORT switch is not energized, indicating that the printer is capable of printing the desired information, the printer scheduler next determines if the printer is busy, step 302. If the printer is not busy, indicating that the printer is unable to perform any printing operation at this particular time, the scheduler initializes the program counter of the PRINTER DRIVER, step 304, and returns control to the foreground or executive program, step 306.

If however, the printer is busy the printer scheduler knows that the printer is ready and willing to accept further information from the PRINTER DRIVER background subroutine. The executive program then initializes variable memory bits for the PRINTER DRIVER, step 308. Then the machine pointer that was performing the foreground executive program is switched to the printer scheduler program counter that is assigned to the particular programmable printer that is to print the desired information, step 310. At this point, the program counter of the executive program is no longer being used but the program counter of the PRINTER DRIVER is to be used. At this point, the printer will be driven by information generated by the background PRINTER DRIVER subroutine.

The actual transfer from the executive program to the PRINTER DRIVER is performed by a load machine pointer instruction, referred to generally as a LMP instruction, step 312. The LMP instruction is used by the PRINTER DRIVER subroutine whenever an input/output request is to be performed by the executive program. It is the method used to switch control back to the foreground program.

If the PRINTER DRIVER has completed the print request, step 314, the scheduler's subroutine initializes the program counter of the PRINTER DRIVER and returns to the main sweep, step 304 and 306. If the PRINTER DRIVER is not completed, the scheduler's subroutine returns to the main sweep without reinitializing the PRINTER DRIVER program counter. Thus the next time the scheduler transfers control to the PRINTER DRIVER the program counter in the PRINTER DRIVER is able to send control to the portion of the DRIVER where it had last been.

If during any time when a print request has been accepted, the computer controller system shuts down, and is then re-energized, the information stored in the scheduler's set of tables is cleared. The flow diagram for this power up-reset sequence is shown in FIG. 14 and the program listing is given on page A-21 of Table 3. As best seen in FIG. 14, if a power up of the computer controller system has occurred, the executive program will first initialize the logic solver program counter, step 320. Next, the data transfer line numbers and the D-node address list in the scheduler's set of tables are cleared, step 322. At this point, the interrupt return machine pointer is set to perform the solving of logic electrical circuit lines, step 324. The central processor then exits from the interrupt machine via the return machine pointer, step 326. The remaining blocks are used to update the timing functions of the central processor with regard to timer non-relay functions, step 328 and step 330.

Once the printer scheduler has switched control from the executive program to the PRINTER DRIVER subroutine, the PRINTER DRIVER generates information necessary to drive the programmable printer in the manner desired by the information stored in the C-node of the printer data transfer line. Since all input and output commands to and from the programmable printer must be received and transmitted by the foreground or executive program of the central processor, all input and output requests of the PRINTER DRIVER switch the machine pointer of the central processor from the background PRINTER DRIVER subroutine to the foreground executive program. After completion of an input/output request, which must occur within one sweep of the executive program through the electrical circuit line, the PRINTER DRIVER resumes its generation of information at the point where the input/output request was made. Thus the program counter for the PRINTER DRIVER is not reset when an input/output request is made by the PRINTER DRIVER.

Figure 16A:
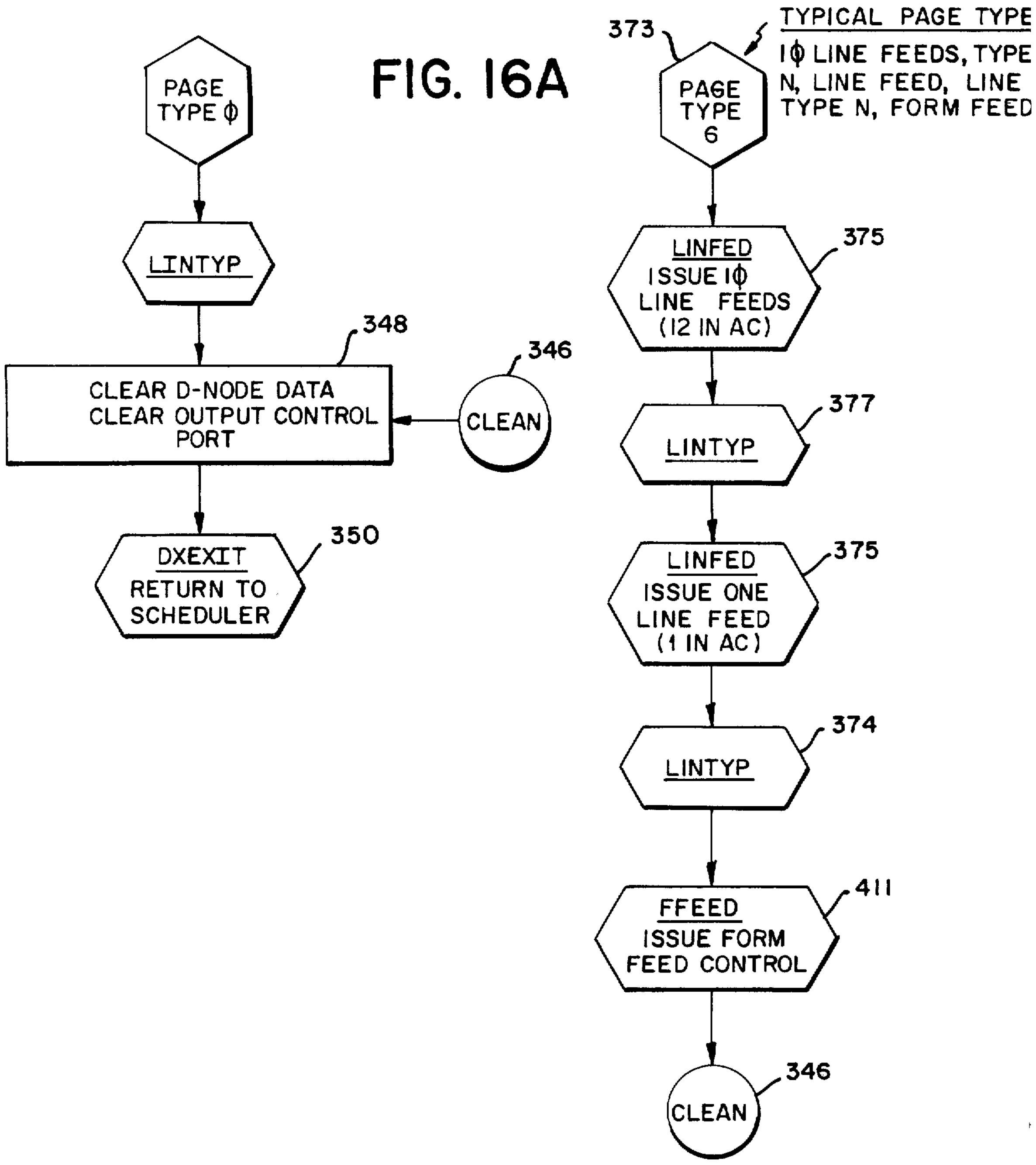
Figure 16B:
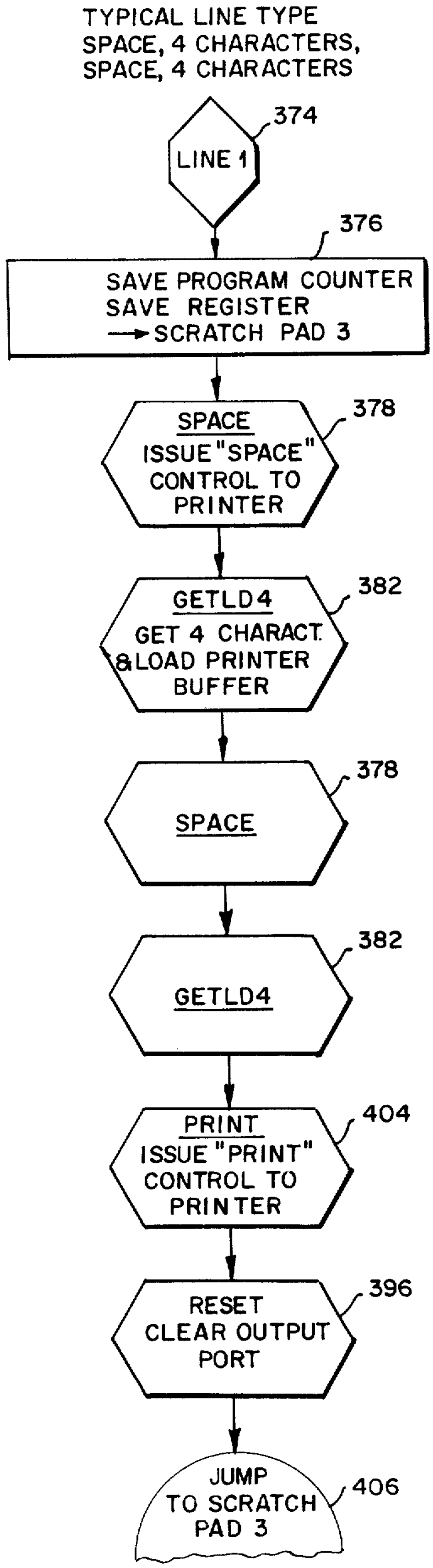
Figure 16C:
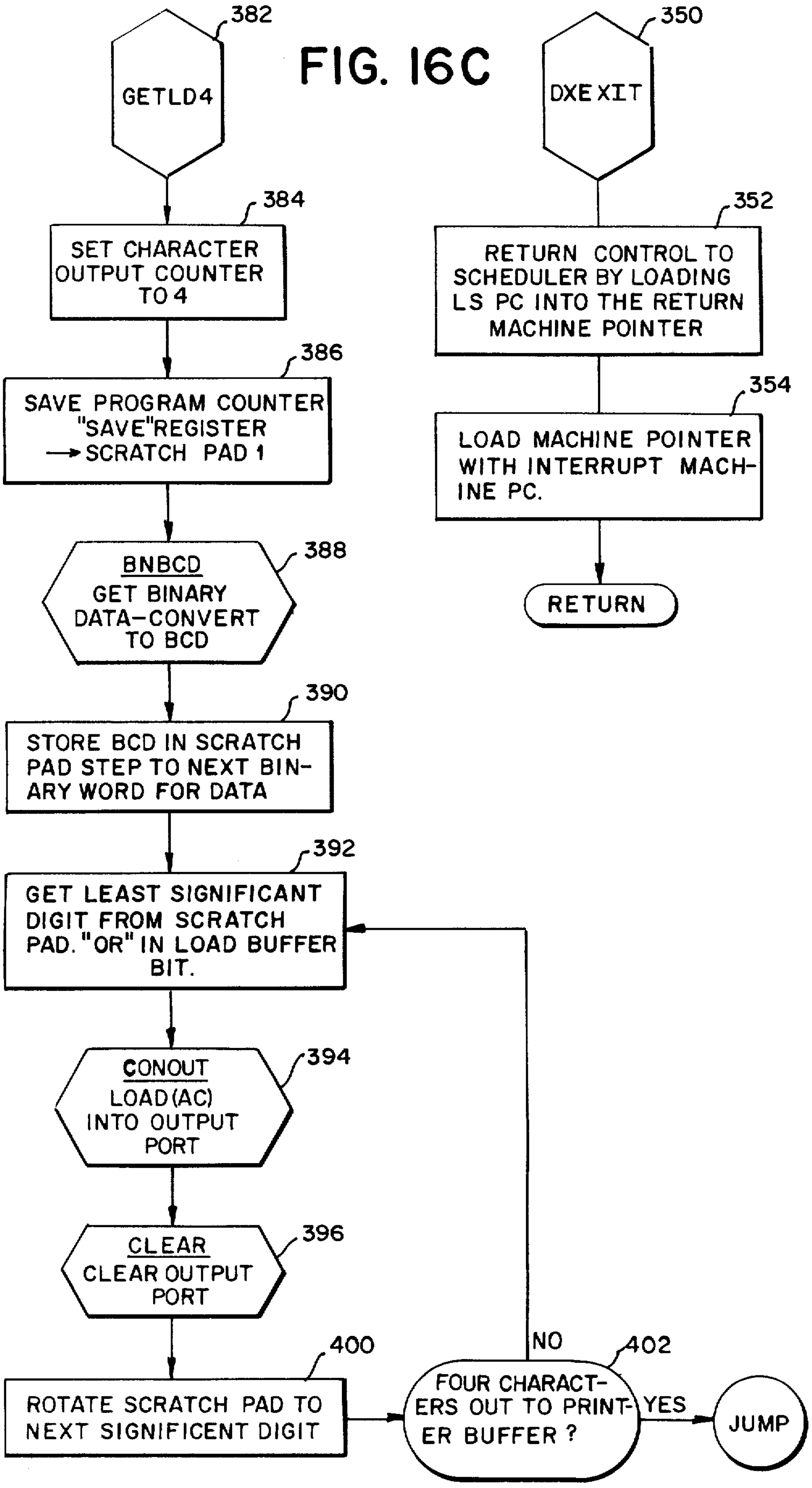
Figure 16D:
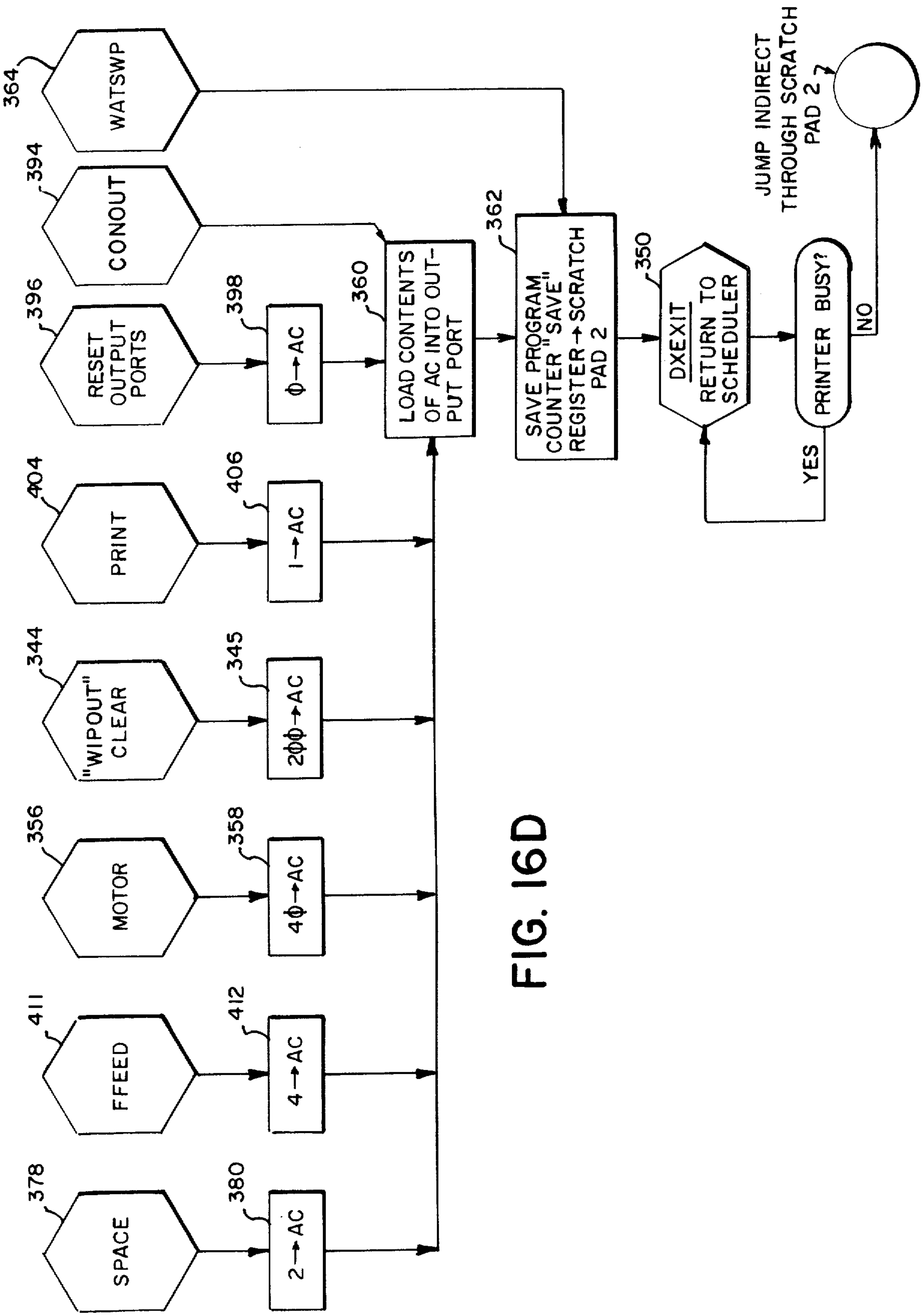

The main flow of the PRINTER DRIVER subroutine is shown in FIGS. 15A and 15B, and the program listing for the entire PRINTER DRIVER subroutine is given on pages A-42 through A-50 of Table 3. As best seen in FIG. 15A, when the printer scheduler transfers control to the PRINTER DRIVER, step 340 the DRIVER first determines if the ABORT switch is energized, step 342. If the ABORT switch is energized, indicating that the programmable printer does not desire to print out any information from this particular data transfer line, the subroutine moves to the WIPOUT subroutine, step 344. As seen in FIG. 16D, this subroutine issues a CLEAR command to the printer by placing an octal 200 in the accumulator, step 345, which is transferred to the output port, step 360.

Following this subroutine the PRINTER DRIVER subroutine goes to a CLEAN connection, step 346. As best seen in FIG. 16B the CLEAN connection goes to a block where the D-node data is cleared from the scheduler's list of tables as well as clearing the output control port (register) that communicates with the programmable printer, step 348. Following this step, the PRINTER DRIVER goes to subroutine DXEXIT, step 350, where the DRIVER returns to the scheduler. As best seen in FIG. 16C, subroutine DXEXIT returns control to the scheduler, step 352 and then loads the machine pointer with the interrupt machine program counter, step 354, so as to return to the executive program at the point where the executive program had last been.

As best seen in FIG. 15A, if the "ABORT" switch is not energized, indicating that the programmable printer is capable of printing, the PRINTER DRIVER subroutine issues a "MOTOR ON" command to the programmable printer, step 356. As best seen in FIG. 16D, this subroutine causes the octal number 4 to be transferred to the accumulator of the central processor, step 358 and then the contents of the accumulator are transferred to the output port communicating with the programmable printer, step 360. At this point the program counter of the PRINTER DRIVER is saved in a memory location denoted by "SCRATCH PAD 2", step 362. Following this step, the subroutine goes to the DXEXIT subroutine 350 (see FIG. 16C) where control is given to the printer scheduler.

Since it takes a finite length of time for the programmable printer's motor to reach operating speed, the next time control is switched to the PRINTER DRIVER subroutine by the printer scheduler, the DRIVER goes to the WATSWP subroutine, step 364 where one sweep will be delayed before the PRINTER DRIVER performs any additional generation of information. As seen in FIG. 16D, the WATSWP subroutine saves the program counter of the PRINTER DRIVER in memory location "SCRATCH PAD 2".

On the next transfer of control to the PRINTER DRIVER the program counter of the DRIVER is pointing to decisional block 366 where the DRIVER determines if form data or variable data is to be printed by the programmable printer.

As it is well described in U.S. patent application Ser. No. 443,329, the programmable printer is capable of printing pre-stored messages from within the programmable printer wherein these messages may contain spaces where variable data is to be inserted. The programmable printer is also capable of printing purely variable data from an external source wherein the format of this variable data is governed by commands from the external source. If a zero is in the C-node of the printer data transfer line, the PRINTER DRIVER subroutine knows that variable data is to be printed by the programmable printer. At this time the subroutine reads the two least significant digits of the numbers stored in the C-node to ascertain the page type and line type formats for printing the variable data, step 368. The subroutine then generates addresses for the particular line and page types received from the C-node, step 370. At this point the PRINTER DRIVER subroutine jumps to the particular page and line type subroutines as defined by the two least significant digits of the C-node, step 372.

As shown in Table 6, there are various line and page types for the printing of variable data. A typical page type is shown in FIG. 16B in subroutine PAGE TYPE 6, step 373. As seen in FIG. 16A, this particular page type causes 10 line feeds to be generated, then the printing of variable data as designated in the format of line type N, where N contains a particular line type number, then another line feed and then another printing of data in accordance with the format of line type N, and finally a FORM FEED which causes the printer paper to be moved up to the next fold in the paper.

More particularly, the PAGE TYPE 6 subroutine goes to a LINFED subroutine 375 where 10 line feeds are generated by placing an octal 12 into the accumulator, which corresponds to the decimal 10. Following the generation of line feeds to the programmable printer, the PAGE TYPE 6 subroutine goes to the LINTYP subroutine, step 374. This particular subroutine jumps to the particular line type chosen by the least significant digit of the C-node of the printer data transfer line.

As best seen in FIG. 16B a typical LINTYP subroutine is a LINE TYPE 1 subroutine, step 374, which generates one space, four characters of variable data, one more space and four more characters of variable data on one line of printout of the programmable printer.

Thus upon entering LINE TYPE 1, step 374, the PRINTER DRIVER saves the program counter locations in memory location SCRATCH PAD 3, step 376. Next, a SPACE command is given to the programmable printer, step 378. This subroutine, as seen in FIG. 16D, transfers an octal number 2 to the accumulator and then loads this number in the output port communicating with the programmable printer, step 360. The program counter is then saved, step 362 and the control of the machine pointer is transferred to the executive program by the scheduler, subroutine DXEXIT, step 350.

The next time control is transferred to the PRINTER DRIVER by the printer scheduler, the program counter causes the GETLD 4 subroutine to be undertaken, step 382. This subroutine retrieves four numerical characters from the register area denoted by the number in the B-node of the printer data transfer line and then issues a load printer command to the programmable printer to store this information within the printer. More particularly, as best seen in FIG. 16C, the GETLD 4 subroutine first sets the character output counter to equal four numerical characters, step 384. Next, the program counter of the PRINTER DRIVER is saved in SCRATCH PAD 1, step 386. Following this operation, the binary data from the registers denoted by the B-node is converted to a binary coded decimal number, step 388. Following this subroutine, the binary coded decimal information is stored in the SCRATCH PAD or memory area reserved for variable data information, step 390. At this point, the next binary data word is ready to be retrieved. Following this step, the least significant digit of data in the SCRATCH PAD area reserved for variable data is retrieved followed by an "OR" in of a load buffer bit, step 392. At this point, the PRINTER DRIVER subroutine moves to the CONOUT subroutine, step 394, where the information in the accumulator is transferred to the output port communicating with the programmable printer.

The CONOUT subroutine is best seen in FIG. 16D and causes control to be shifted back to the executive program since an output request to the programmable printer is being made. The next time the PRINTER DRIVER RECEIVES CONTROL, THE RESET OUTPUT PORT subroutine is initiated, step 396. This subroutine, as best seen in FIG. 16D, clears the output port communicating with the programmable printer by generating an octal 0 into the accumulator, step 398.

The next time the PRINTER DRIVER receives control, the memory location containing the variable data is rotated to receive the next significant digit of information in the scratch pad, step 400 (FIG. 16C). Next, the DRIVER determines if four characters of variable data have been sent to the printer buffer, step 402. If four characters have not been sent to the print buffer, indicating that more characters are needed, the DRIVER returns to step 392 to get the next digit from the SCRATCH PAD area. If however four characters have been sent to the printer buffer, the PRINTER DRIVER shifts to the program counter saved in SCRATCH PAD 1 and thus goes to the second SPACE subroutine shown in FIG. 16B, step 378. At this point the LINE TYPE 1 subroutine issues another space command and then goes to another GETLD 4 subroutine so as to transfer another space and four more characters of variable data to the printer. Following the transfer of the last variable data to the programmable printer, the LINE TYPE 1 subroutine issues a PRINT command, step 404. The PRINT subroutine is shown in FIG. 16D where an octal 1 is transferred to the accumulator, step 406, and the contents of the accumulator

TABLE NO. 6

C NODE CODE: 40PL
P IS THE PAGE FORMAT
L IS THE LINE FORMAT NUMBER.

LINE FORMATS

| | |
|---|---|
| L = 1 | XXXX |
| = 2 | XXXX XXXX |
| = 3 | XXXX XXXX XXXX |
| = 4 | XXXX XXXX XXXX XXXX |
| = 5 | XXXXXXXX XXXX |
| = 6 | XXXXXXXX XXXXXXXX |

PAGE FORMATS

| | |
|---|---|
| P = 0 | PRINT 1 LINE |
| = 1 | PRINT 1 LINE, LINE FEED |
| = 2 | 12 LINE FEEDS, PRINT 1 LINE, FORM FEED. |
| = 3 | 11 LINE FEEDS, PRINT 2 LINES, FORM FEED. |
| = 4 | 10 LINE FEEDS, PRINT 3 LINES, FORM FEED. |
| = 5 | 9 LINE FEEDS, PRINT 4 LINES, FORM FEED. |
| = 6 | 10 LINE FEEDS, PRINT 1 LINE, LINE FEED, PRINT 1 LINE, FORM FEED. |
| = 7 | 8 LINE FEEDS, PRINT 2 LINES, LINE FEED, PRINT 2 LINES, FORM FEED. |

are transferred to the output register communicating with the programmable printer, step 360. Following the issuance of the PRINT command to the programmable printer the LINE TYPE 1 subroutine issues a RESET command to the programmable printer, step 396, wherein the output port is cleared.

The next time the PRINTER DRIVER has control, the LINE TYPE subroutine jumps to the program counter saved in SCRATCH PAD 3, step 406. At this point, the PRINTER DRIVER returns to the PAGE TYPE subroutine for further information, step 375 (see FIG. 16A). The program counter then performs another LINFED subroutine which issues a line feed to the programmable printer. Following this subroutine, the PAGE TYPE 6 subroutine goes to another LINE TYPE 1 subroutine, step 374 where that subroutine is repeated. Upon return to the PAGE TYPE 6 subroutine, a FFEED subroutine is initiated, step 411. This subroutine, as best seen in FIG. 16D, is a FORM FEED command to the programmable printer which causes the programmable printer to advance the printer's paper to the next fold in the printing paper. The FFEED subroutine performs this function by transferring an octal 4 to the accumulator, step 412, and transferring this number from the accumulator to the output port of the computer controller system, step 360, which in turn communicates with the programmable printer.

When the FFEED command is completed, the PAGE TYPE 6 subroutine goes to the CLEAN connection 346 where the information in the D-node as well as the output control port communicating with the programmable printer is cleared and where control is returned to the scheduler. It is at this point that the printer data transfer line non-relay logic subroutine, as shown in FIGS. 12A and 12B, clears all the information relating to this particular data transfer line and turns the relay coil of this line to the de-energized state.

PRINTING PRE-STORED MESSAGES

Referring again go FIG. 15A, if FORM data (pre-stored message) is to be generated by the programmable printer, the PRINTER DRIVER subroutine retrieves the two least significant digits in the C-node, step 410. These two digits represent the address in the programmable printer of the particular pre-stored message to be printed. In order for this form address to be received by the programmable printer a "START FORM" bit must be "OR" into the programmable printer, step 410. At this point the PRINTER DRIVER moves to the CONOUT subroutine, step 394 where the contents of the accumulator are transferred to the output port communicating with the programmable printer.

After this information is transferred to the programmable printer and control is returned to the PRINTER DRIVER background subroutine a RESET OUTPUT port subroutine, step 396, is generated so as to clear the information in the output port communicating with the programmable printer.

Once the FORM ADDRESS and the START FORM commands have been given to the programmable printer by the central processor, the PRINTER DRIVER subroutine waits for the printer to make a request for variable data from within the central processor. This request, if any, is sensed on the "BUSY" electrical circuit line 396, (see FIG. 10), and when this line is de-energized by a signal from the programmable printer, the PRINTER DRIVER subroutine is activated to transfer variable data to the programmable printer.

More particularly the RESET OUTPUT PORT command is only released when the "BUSY" signal from the programmable printer has gone to the de-energized state. Once the RESET OUTPUT PORT command has been released the PRINTER DRIVER subroutine proceeds to transfer data to the programmable printer. Thus the DRIVER sets the character output counter ob 4, step 412, since there are four characters of variable data in every 16 bit register. Next the DRIVER converts the binary data in the data registers to binary coded decimal characters, step 414. Following this step, the DRIVER stores this variable data in a SCRATCH PAD memory location and steps to the next binary word for the next data character, step 416.

If the "FORM BUSY" line from the programmable printer as sensed by electrical circuit line 397 (see FIG. 10) is in a low state, step 419, the PRINTER DRIVER goes to the CLEAN connection so as to clear this particular data transfer line.

The de-energization of the "FORM BUSY" line tells the DRIVER that the programmable printer has completed the printing of the requested pre-stored message and therefore no further activity by this particular data transfer line is desired. However, if the "FORM BUSY" line is energized the PRINTER DRIVER knows that the programmable printer is still in the process of printing the pre-stored message and because by definition the "BUSY" signal is de-energized, variable data is desired by the printer. At this point the PRINTER DRIVER subroutine retrieves the least significant digit from the SCRATCH PAD location and "OR" ins a load buffer bit with this retrieved least significant digit, step 420. The DRIVER then goes to the CONOUT subroutine, step 394, where this information is loaded into the accumulator and finally into the output port communicating with the programmable printer.

The information in the output port is then re-set, step 396, and the SCRATCH PAD is rotated to the next significant digit, step 422. At this point the PRINTER DRIVER is ready to transfer another digit of information if requested by the programmable printer.

The DRIVER subroutine must next decide if four characters of data have been transferred to the printer buffer, step 424. If four characters have not been transferred, the subroutine returns to the "FORM BUSY" decisional block, step 419. If however, four characters have been transferred, the subroutine returns to step 412 so as to be ready to retrieve the data in the next data register since all the information in the previous data register has been transferred to the printer buffer.

This transferral of variable data to the programmable printer continues so long as the "BUSY" signal from the programmable printer is de-energized. If the "BUSY" signal is energized, variable data is no longer transferred to the printer. Nevertheless, in the printing of a pre-stored message the printer may make several requests for variable data, interspersing this variable data with pre-stored information. When the "FORM BUSY" signal is de-energized, the PRINTER DRIVER realizes that the printer has completed the printing of the pre-stored message and therefore exits this particular data transfer line to the scheduler. The non-relay logic subroutine then de-energizes the relay coil of this particular data transfer line indicating to other electri- :al circuit lines or external devices communicating with this relay coil that this particular line's request for printing has been completed.

Thus, what has been described is a novel apparatus 'or generating non-relay logic data transfer and data nanipulation by a computer controller system. Data nanipulation and transfer modules have been disclosed hat transfer data from a single register to a table of registers, a table of registers to a single register, a table of egisters to a second table of registers, and the inputing and retrieving of data on a first-in/first-out basis. n addition a PRINTER DRIVER module has been dis:losed that is able to communicate with programmable orinters for the printing of variable data from within the :entral processor with or without pre-stored data in a orogrammable printer. It should be noted, however, hat other data transfer functions such as a data matrix ransfer, are obtainable using the techniques disclosed n the present description.

It will thus be seen that the objects set forth above, ımong those made apparent from the preceding de-cription, are efficiently attained and, since certain hanges may be made in the above system apparatus vithout departing from the scope of the invention, it is ntended that all matter contained in the above description or shown in the accompanying drawings will be inerpreted as illustrative and not in a limiting sense.

It is also to be understood that the following claims re intended to cover all of the generic and specific feaures of the invention herein described, and all statenents of the scope of the invention which, as a matter f language, might be said to fall therebetween.

Having described the invention, what is claimed is:

1. A programming panel for programming a comuter controller to perform data manipulation operaons, the computer controller having stored therein an xecutive program for communicating with the proramming panel and for simulating an electrical laddertype control circuit having a plurality of circuit lines, a lurality of spaces in each circuit line, a first of said paces providing for the inclusion of one type of a pluality of types of electrical elements comprising elenents the condition of which is a function of a refernced condition, a second of said spaces providing for ie inclusion of a first character set indicating a first nemory area within the controller where data may be etrieved, a third of said spaces providing for the incluon of a second character set indicating the type of ata manipulation to be performed on said retrieved ata, a fourth of said spaces providing for the inclusion f a third character set indicating a second memory rea within the controller where data may be deposed, at least one of said characters also indicating a iird memory area within the controller where a number is stored related to the amount of data placed ithin said second area, each of said circuit lines furier providing circuit line condition specifying means ontrolled in accordance with the electrical condition f the electrical element within said first space, the executive program simulating the specified electrical element within said first space, retrieving data in said first nemory area, performing the data manipulation specied in said third space, depositing data in said second nemory area, and updating the number in said third nemory area, said programming panel comprising:

A. Manually operable means for specifying to the computer controller one of a plurality of circuit lines of the simulated ladder-type control circuit;

B. manually operable means for specifying to the computer controller one type of a plurality of types of electrical elements;

C. manually operable means for specifying to the computer controller a reference to the circuit line condition specifying means in the simulated ladder-type control circuit which is to control the condition of the said specified type of electrical element;

D. manually operable means for specifying to the computer controller said first space in the specified circuit line of the simulated ladder-type control circuit into which the specified type of electrical element is to be entered;

E. manually operable means for specifying to the computer controller said second space in the specified circuit line of the simulated ladder-type control circuit into which said first character set specifying said first memory area is to be entered;

F. manually operable means for specifying to the computer controller said third space in the specified circuit line of the simulated ladder-type control circuit into which said second character set specifying said desired data manipulation is to be entered; and G. manually operable means for specifying to the computer controller said fourth space in the specified circuit line of the simulated ladder-type control circuit into which said third character set specifying said second memory area is to be entered.

2. A programming panel, as defined in claim 1, further comprising a switch mounted on the programming panel for specifying a data manipulation function.

3. A programming panel as defined in claim 1 further comprising manually operable means for generating said first, second, and third character sets.

4. A programming panel as defined in claim 1, wherein there is provided the same predetermined fixed number of spaces in each circuit line of the simulated ladder-type control circuit, a first space providing for the inclusion of one electrical element, a second space providing for the inclusion of said first character set, a third space providing for the inclusion of said second character set, and a fourth space providing for the inclusion of said third character set, and wherein said manually operable means for specifying to the computer controller one of the spaces in a specified circuit line comprises a plurality of switches mounted on the programming panel, each of said switches corresponding to one of the predetermined fixed number of spaces.

5. A programming panel as defined in claim 1, further comprising:

A. Readout means for indicating which type of electrical element has been entered in a specified space in a circuit line;

B. Readout means for indicating in which space in the specified circuit line of the simulated ladder-type control circuit the specified type of electrical element has been entered;

C. Readout means for indicating to what condition the electrical element entered in the specified space in the specified line is referenced;

D. Readout means for indicating in which space in the specified circuit line of the simulated laddertype control circuit said first character set has been entered;

E. Readout means for indicating said first character set;

F. Readout means for indicating in which space in the specified circuit line of the simulated ladder-type control circuit said second character set has been entered.

G. Readout means for indicating said second character set;

H. Readout means for indicating in which space in the specified circuit line of the simulated ladder-type control circuit said third character set has been entered; and I. Readout means for indicating said third character set.

6. A programming panel as defined in claim 1, further comprising a readout means for indicating errors in information transferred to said executive program from said manually operable means.

7. A programming panel as defined in claim 1, wherein a plurality of types of electrical elements specifiable by said manually operable means comprise normally open and normally closed switches and wherein said manually operable means for specifying to the computer controller one type of a plurality of types of electrical elements comprises:

1. A first switch mounted on the programming panel specifying a normally open switch;
2. A second switch mounted on the programming panel for specifying a normally closed switch.

8. A programming panel as defined in claim 1, wherein said first, second and third character sets are manually specified by switches mounted on the programming panel.

9. A programming panel as defined in claim 8, wherein said set of switches also specify the specifying means in the simulated ladder-control circuit which is to control the condition of said specified type of electrical element.

10. A programming panel as defined in claim 1, wherein said second character set represents the transfer of data from a first portion of the central processor to a second portion of the central processor.

11. A programming panel as defined in claim 10, wherein said first portion is one register within the central processor and said second portion is a table of registers in the central processor.

12. A programming panel as defined in claim 11, wherein the size of said table is defined by said second character set.

13. A programming panel as defined in claim 10, wherein said first portion is a table of registers and said second portion is one data register.

14. A programming panel as defined in claim 13, wherein the size of said table is defined by said second character set.

15. A programming panel as defined in claim 10, wherein said first portion is a first table of registers and said second portion is a second table of registers.

16. A programming panel as defined in claim 15, wherein said first table and said second table are equal in size and are determined by said second character set.

17. A programming panel as defined in claim 1, wherein said second character set indicates the transfer of data from one data register to a table of registers in a first-in/first-out basis.

18. A programming panel as defined in claim 17, wherein the size of said table is determined by said second character set.

19. A programming panel as defined in claim 1, wherein said second character set indicates the removal of data from a table of registers to one data register on a first-in/first-out basis.

20. A programming panel as defined in claim 19, wherein the size of said table is determined by said second character set.

21. A programming panel as defined in claim 1, wherein said second character set indicates the transfer of data from a first portion of the central processor to a second portion of the central processor; whereby a programmable printer intercommunicating with the computer controller system is able to display at least a portion of said data transferred to said second area.

22. A programming panel as defined in claim 21, wherein said computer controller further comprises a background program time sharing with said executive program, for the generation of information to be transferred to said programmable printer.

23. A programming panel as defined in claim 21; wherein said second character set indicates a request to the programmable printer to print pre-stored messages.

24. A programming panel as defined in claim 23, wherein said pre-stored messages command the retrieval of data from said first portion of the central processor.

25. A programming panel as defined in claim 21, wherein said second character set indicates a request for the programmable printer to print variable data generated by the computer controller system.

26. A programming panel as defined in claim 1, wherein a predetermined number of said circuit lines are dedicated to the performance of data manipulation operations.

27. A programming panel for programming a computer controller to perform data transfer and data manipulation operations, the computer controller having stored therein an executive program for communicating with the programming panel and for simulating an electrical ladder-type control circuit having a plurality of circuit lines, a plurality of spaces in each circuit line, a first of said spaces providing for the inclusion of a first character set indicating a first memory area within the controller where data may be retrieved, a second of said spaces providing for the inclusion of a second character set indicating the type of data transfer and manipulation to be performed on said retrieved data, a third of said spaces providing for the inclusion of a third character set indicating a second memory area within the controller where data may be deposited, at least one of said character sets also indicating a third area within the controller where a number is stored related to the amount of data placed within said second area, the executive program retrieving data in said first memory area, performing the data transfer and manipulation specified in said second space, depositing data in said second memory area, and up-dating the number in said third memory area, said programming panel comprising:

A. manually operable means for specifying to the computer controller said first space in the specified circuit line of the simulated ladder-type control circuit into which said first character set specifying said first memory area is to be entered;

B. manually operable means for specifying to the computer controller said second space in the specified circuit line of the simulated ladder-type control circuit into which said second character set specifying said desired data manipulation is to be entered; and C. manually operable means for specifying to the computer controller said third space in the specified circuit line of the simulated ladder-type control circuit into which said third character set specifying said second memory area is to be entered.

28. A programming panel as defined in claim 27, further comprising manually operable means for specifying said first, second, and third character sets.

29. A programming panel as defined in claim 27 wherein said circuit lines further provide circuit line condition specifying means controlled in accordance with the state of the data transfer and manipulation operation.

30. A programming panel as defined in claim 27, wherein said second character set indicates a data transfer and manipulation function of transferral of data from said first memory area to said second memory area.

31. A programming panel as defined in claim 30, wherein said second character set indicates the size of said first memory area and said second memory area.

32. A programming panel as defined in claim 27, wherein said first memory area comprises a multiplicity of registers and said second memory area comprises one register, and where said second character set indicates the data transfer and manipulation operation of sequentially transferring data from the registers of said first memory area into the register of said second memory area.

33. A programming panel as defined in claim 27, wherein said first memory area comprises one register and said second memory area comprises a table of registers, and where said second character set indicates the data transfer and manipulation operation of sequentially transferring data from the register of said first memory area into the table of registers of said second memory area.

34. A programming panel as defined in claim 27, wherein said first memory area comprises a multiplicity of registers and said second memory area comprises a second multiplicity of registers, and where said second character set indicates the data transfer and manipulation operation of sequentially transferring data from said first set of registers of said first memory area into said second set of registers of said second memory area.

35. A programming panel as defined in claim 34, wherein said first set of registers is equal in number to said second set of registers.

36. A programming panel as defined in claim 27, wherein said second character set indicates a data transfer and manipulation function of transferral of information to an interconnected programmable printer.

37. A programming panel as defined in claim 36, wherein said computer controller further comprises a background program time sharing with said executive program, for the generation of information to be transferred to said programmable printer.

38. A programming panel as defined in claim 36, wherein said second character set indicates a request to the programmable printer to print pre-stored messages.

39. A programming panel as defined in claim 38, wherein said pre-stored messages command the retrieval of data from said second memory area.

40. A programming panel as defined in claim 27, wherein a predetermined number of said circuit lines are dedicated to the performance of data transfer and manipulation operations.

* * * * *

UNITED STATES PATENT AND TRADEMARK OFFICE
CERTIFICATE OF CORRECTION

PATENT NO. : 3,930,233

DATED : December 30, 1975

INVENTOR(S) : Richard E. Morley and Charles C. Schelberg, Jr.

It is certified that error appears in the above-identified patent and that said Letters Patent are hereby corrected as shown below:

Column 8, line 53, cancel "ciruit" and substitute therefor
--circuit--

Column 87, line 20, cancel "histoy" and substitute therefor
--history--

Column 92, line 54, cancel "foes" and substitute therefor
--goes--

Column 95, line 20, cancel TAble" and substitute therefor
--Table--

Column 97, line 54, cancel "restraits" and substitute therefor
--restraints--

Column 98, line 44, cancel first "by" and substitute therefor
--but--

Column 98, line 55, cancel second "the" and substitute therefor
--this--

Column 105, line 40, cancel "go" and substitute therefor
--to--

Column 106, line 9, cancel "ob" and substitute therefor
--to--

Column 107, line 36, after "perform" insert
--data transfer and--

Column 107, line 43, after "comprising" insert
--an--

Column 107, lines 43 and 44, cancel "elements" and substitute therefor --element--

Column 107, line 51, before "data" insert
--data transfer and--

UNITED STATES PATENT AND TRADEMARK OFFICE
CERTIFICATE OF CORRECTION

PATENT NO. : 3,930,233
DATED : December 30, 1975
INVENTOR(S) : Richard E. Morley and Charles C. Schelberg, Jr.

It is certified that error appears in the above-identified patent and that said Letters Patent are hereby corrected as shown below:

Col. 107, lines 55-57, cancel "at least one of said characters also indicating a third memory area within the controller where a number is stored related to the amount of data placed within said second area,"

Col. 107, line 60, cancel "electrical"

Col. 107, line 61, cancel "electrical element within said first space," and substitute therefor --circuit line--

Col. 107, line 64, before "data" insert --data transfer and--

Col. 107, line 65, before "depositing" insert --and--

Col. 107, lines 66 and 67, cancel "and updating the number in said third memory area,"

Col. 108, line 1, cancel "Manually" and substitute therefor --manually--

Col. 108, line 35, before "data" insert --data transfer and--

Col. 110, line 36, before "data" insert --data transfer and--

Col. 110, lines 53-57, cancel "at least one of said character sets also indicating a third area within the controller where a number is stored related to the amount of data placed within said second area,"

UNITED STATES PATENT AND TRADEMARK OFFICE
CERTIFICATE OF CORRECTION

PATENT NO. : 3,930,233

DATED : December 30, 1975

INVENTOR(S) : Richard E. Morley and Charles C. Schelberg, Jr.

It is certified that error appears in the above-identified patent and that said Letters Patent are hereby corrected as shown below:

Col. 110, lines 60-61, cancel "and up-dating the number in said third memory area,"

Please add the following claims:

41. A programming panel as defined in Claim 1, wherein the second character set further indicates that the retrieval of data in said second memory area, the performing of data transfer and data manipulation specified in the third space, and the depositing of data in said second memory area is initiated when the condition of the selected element in the first of said spaces is closed.

42. A programming panel as defined in Claim 1, wherein the second character set further indicates that the retrieval of data in said second memory area, the performing of the data transfer and data manipulation specified in the third space, and the depositing of data in said second memory area is initiated when the condition of the selected element in the first of said spaces changes from a first state to a second state.

UNITED STATES PATENT AND TRADEMARK OFFICE

CERTIFICATE OF CORRECTION

PATENT NO. : 3,930,233

DATED : December 30, 1975

INVENTOR(S) : Richard E. Morley and Charles C. Schelberg, Jr.

It is certified that error appears in the above-identified patent and that said Letters Patent are hereby corrected as shown below:

43. A programming panel as defined in Claim 1, wherein at least one of said character sets also indicates a third memory area within the controller where a number is stored related to the amount of data placed in said second area and wherein the executive program updates this number in the third memory area.

44. A programming panel as defined in Claim 43, wherein a portion of said second character set indicates the total amount of data to be transferred from the first memory area to the second memory area.

45. A programming panel as defined in Claim 44, wherein the performing of the data transfer and data manipulation specified in said third space is completed when the number in the third memory area is equal to the number specified in the second character set indicating the total amount of data to be transferred.

46. A programming panel as defined in Claim 1, wherein the data transferred to the second memory area is transferable to said external device communicating with the computer controller.

UNITED STATES PATENT AND TRADEMARK OFFICE
CERTIFICATE OF CORRECTION

PATENT NO. : 3,930,233
DATED : December 30, 1975
INVENTOR(S) : Richard E. Morley and Charles C. Schelberg, Jr.

It is certified that error appears in the above-identified patent and that said Letters Patent are hereby corrected as shown below:

47. A programming panel as defined in Claim 1, wherein the retrieving of data in said first memory area, the performing of the data transfer and data manipulation specified in said third space, and the depositing of data in said second memory area by the executive program is halted when the condition of the electrical element simulated by the executive program is of an open condition.

48. A programming panel as defined in Claim 1, wherein said computer controller further comprises a background program time sharing with said executive program for performing at least a portion of the retrieving of data in said first memory area, the performing of the data transfer and data manipulation specified in said third space, and the depositing of data in said second memory area.

49. A programming panel as defined in Claim 27, wherein at least one of said character sets also indicates a third memory area within the controller where a number is stored related to the amount of data placed in said second area and wherein the executive program updates this number in the third memory area.

CERTIFICATE OF CORRECTION

PATENT NO. : 3,930,233

DATED : December 30, 1975

INVENTOR(S) : Richard E. Morley and Charles C. Schelberg, Jr.

It is certified that error appears in the above-identified patent and that said Letters Patent are hereby corrected as shown below:

50. A programming panel as defined in Claim 49, wherein a portion of said second character set indicates the total amount of data to be transferred from the first memory area to the second memory area.

51. A programming panel as defined in Claim 50, wherein the performing of the data transfer and data manipulation specified in said third space is completed when the number in the third memory area is equal to the number specified in the second character set indicating the total amount of data to be transferred.

52. A programming panel as defined in Claim 27, for programming a computer controller communicating with an external device wherein the data transferred to the second memory area is transferable to said external device communicating with the computer controller.

53. A programming panel as defined in Claim 27, wherein said computer controller further comprises a background program time sharing with said executive program for performing at least a portion of the retrieving of data in said first memory area, the performing of the data transfer and data manipulation specified in said third space, and the depositing of data in said second memory area.

UNITED STATES PATENT AND TRADEMARK OFFICE
CERTIFICATE OF CORRECTION

PATENT NO. : 3,930,233

DATED : December 30, 1975

INVENTOR(S) : Richard E. Morley and Charles C. Schelberg, Jr.

It is certified that error appears in the above-identified patent and that said Letters Patent are hereby corrected as shown below:

54. A programming panel as defined in Claim 1, for programming a computer controller communicating with an external device, wherein the retrieving of data in said first memory area, the performing of the data transfer and data manipulation specified in the third space, and the depositing of data in said second memory area by the executive program is halted when a signal from the external device is received by the computer controller.

55. A programming panel as defined in Claim 27, for programming a computer controller communicating with an external device, wherein the retrieving of data in said first memory area, the performing of the data transfer and data manipulation specified in the third space, and the depositing of data in said second memory area by the executive program is halted when a signal from the external device is received by the computer controller.

56. A programming panel as defined in Claim 10, wherein the condition of the circuit line that controls the circuit line condition specifying means is the completion of the data transfer from said first portion of the central processor to said second portion of the central processor.

UNITED STATES PATENT AND TRADEMARK OFFICE

CERTIFICATE OF CORRECTION

PATENT NO. : 3,930,233

DATED : December 30, 1975

INVENTOR(S) : Richard E. Morley and Charles C. Schelberg, Jr.

It is certified that error appears in the above-identified patent and that said Letters Patent are hereby corrected as shown below:

57. A programming panel as defined in Claim 21, wherein the condition of the circuit line that controls the circuit line condition specifying means is the execution of data manipulation and data transfer operation by the executive program.

58. A programming panel as defined in Claim 1, wherein the circuit line condition specifying means is a simulated relay coil.

Signed and Sealed this

*fifteenth* Day of *June 1976*

[SEAL]

*Attest:*

RUTH C. MASON
*Attesting Officer*

C. MARSHALL DANN
*Commissioner of Patents and Trademarks*